INVENTOR
KARL K. WOMACK
BY Ronald J. Clark
ATTORNEY

April 22, 1969 K. K. WOMACK 3,440,612

PROGRAM MODE SWITCHING CIRCUIT

Filed Feb. 23, 1966 Sheet 14 of 53

April 22, 1969 K. K. WOMACK 3,440,612

PROGRAM MODE SWITCHING CIRCUIT

Filed Feb. 23, 1966 Sheet 21 of 53

CF, CG DECODERS

CB SOURCE DECODE

April 22, 1969 K. K. WOMACK 3,440,612

PROGRAM MODE SWITCHING CIRCUIT

Filed Feb. 23, 1966 Sheet 30 of 53

April 22, 1969 K. K. WOMACK 3,440,612

PROGRAM MODE SWITCHING CIRCUIT

Filed Feb. 23, 1966 Sheet 38 of 53

United States Patent Office 3,440,612

Patented Apr. 22, 1969

3,440,612

PROGRAM MODE SWITCHING CIRCUIT

Karl K. Womack, Endwell, N.Y., assignor to International Business Machines Corporation, Armonk, N.Y., a corporation of New York Filed Feb. 28, 1966, Ser. No. 530,634
Int. Cl. G06f *1/00;* H04l *11/00*
U.S. Cl. 340—172.5 10 Claims

ABSTRACT OF THE DISCLOSURE

A program mode switching circuit in a data processing system for switching between two modes of operation of the data processing system, a normal mode and a substituted mode, comprising a first storage means for storing a plurality of programs associated with either the normal mode or substitute mode of operation, a second storage unit for storing a plurality of control signals to direct a data processing system in the normal mode of operation, a third storage unit for storing a plurality of control signals to direct the data processing system in a substituted mode of operation and a first addressing means for selecting the mode of operation under which the data processing system will operate.

Figure 1:
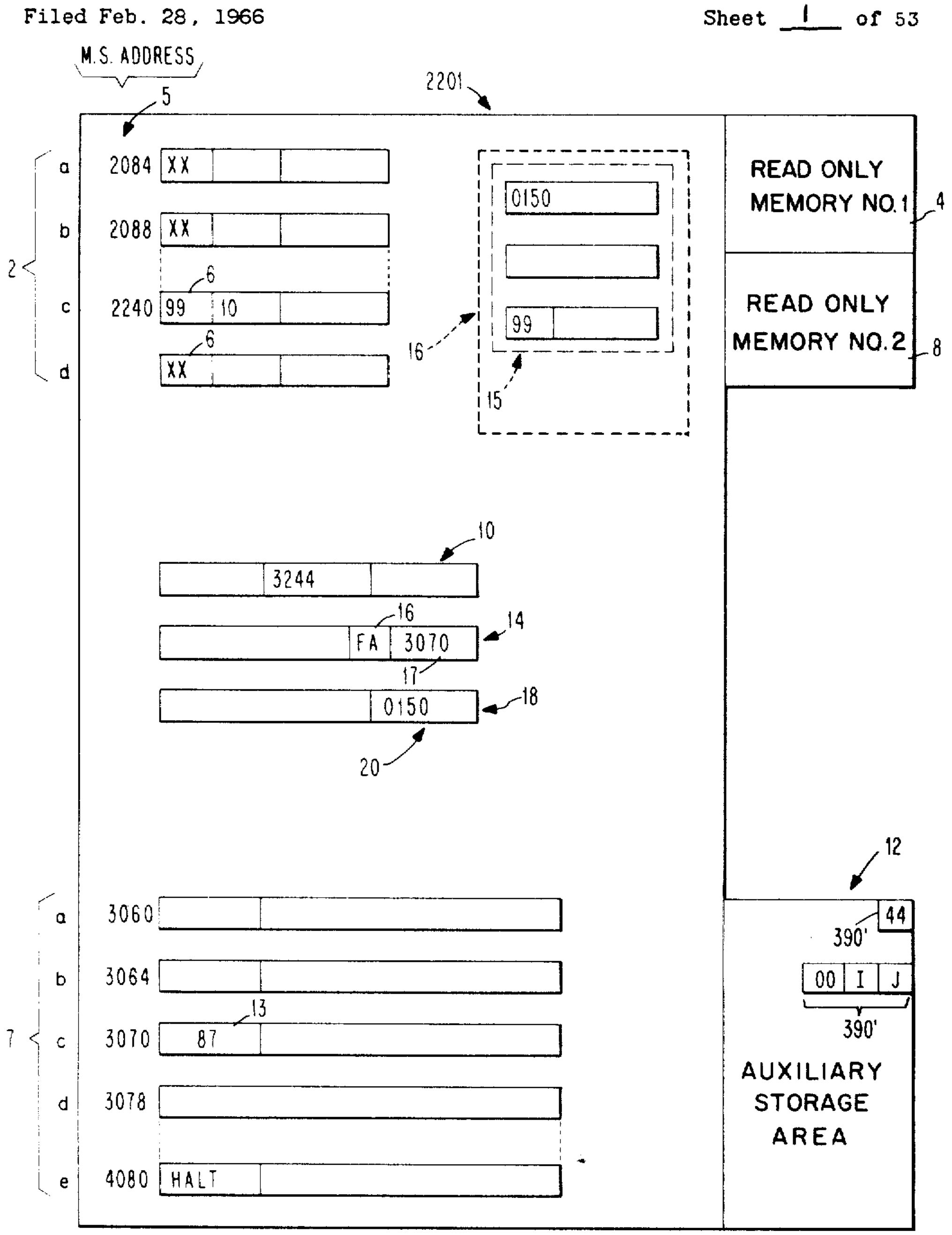

This invention relates in general to an apparatus for switching between a plurality of programs and, more particularly, to a program mode switching apparatus responsive to stored indicia whereby the operation of a first program is curtailed and sufficient indicia are stored away before entering into the operation of a second program whereby the interrupted program can be resumed after termination of the second program.

In a data processing system operating in response to both a first stored program, directing the operation of the processor in a natural mode of operation, and operating in response to a second stored program directing the operation of the processor in a substituted mode of operation, it is necessary to employ an efficient means for switching the control of the system between the two programs. It is advantageous that the processor can successively or alternately or in any other combination automatically switch between either or all of its stored programs. The necessity for manual intervention obviously reduces the time during which the processor can be advantageously working to complete its scheduled task.

A processing system operating in response to such diverse programs is described generally in a U.S. patent application entitled, "Data Processing System," by K. K. Womack et al., Ser. No. 454,325, filed May 30, 1965, and assigned to the assignee of the present invention, now Patent No. 3,374,466.

Accordingly, it is an object of the instant invention to provide a program mode switching circuit for automatically exiting from a first class of stored programs written for the natural mode of operation of a processor into a second class of stored programs written for the substituted mode of operation of the same processor.

It is another object of the instant invention to provide a program mode switching circuit for automatically exiting from the performance of a stored program written for the substituted mode of operation of a processor into a second stored program written for the natural mode of operation of the processor.

It is a further object of the instant invention to provide a program mode switching circuit which includes storage areas for storing indicia indicating the exit point of a first stored program whereby the second stored program can be completed and the associated processor can automatically return to the exit point of the first program.

It is another object of the instant invention to provide a data processing system employing a program mode switching circuit for allowing a complex data processing system to operate with I/O or external units, some of which are programmed to operate in response to a first type of program and others which operate in response to a second type of stored program.

It is a still further object of the instant invention to provide a program mode switching circuit for use in a data processing system, whereby the data processing system interleaves the processing of a multiportion processing function by using the program directing the operation of the processor in its natural mode of operation for certain distributed portions of said function and by using a program directing the operation of the processor in its substituted mode of operation for the remaining intervening portions of the function.

Figure 3:
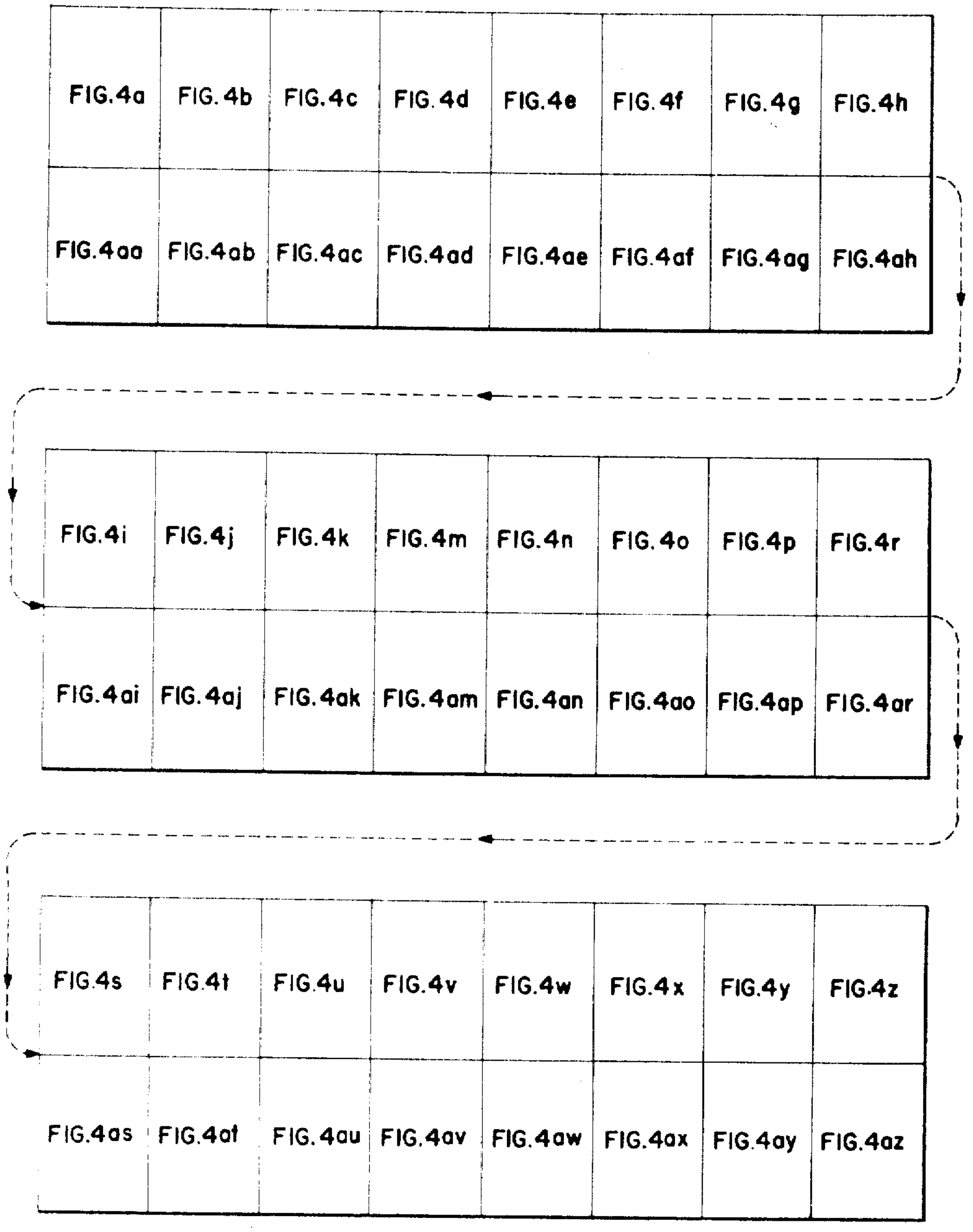

The foregoing and other objects, features and advantages of the invention will be apparent from the following more particular description of a preferred embodiment of the invention, as illustrated in the accompanying drawings; wherein FIG. 1 is a schematic view of the main functional elements comprising the instant invention;

FIGS. *2a* to *2c* show a generalized block diagram of the instant invention;

FIG. 3 shows the manner of connecting together the various portions of FIG. 4; and FIGS. *4a* to *4z* and *4aa* to *4az* excepting FIGS. 1 and *q*, and FIGS. *al* and *aq* show a detailed schematic view of the instant invention.

*General description*

A basic key to the achievement of high operating efficiency in a computing or data processing installation is a comprehensive control program for manipulating the entire data processing installation while completing all the desired data processing functions. This comprehensive control program exists at several levels of complexity. For example, a control program performs the over-all operations control of an installation and its resulting workflow Such a control program includes issuing instructions to the computer operator, receiving instructions from the operator, the preparation of administrative records, the maintenance of system operation logs, and the control over library programs.

Other control programs exercise control over the workflow, including input-output interrupts during the execution of a program. Oftentimes an electronic data processor equipped to operate not only in its natural mode of operation, but also in a substituted mode of operation, while the main program is being executed in the substituted mode of operation and the interrupt must be serviced in the natural mode of operation. More specifically, various segments of an over-all processing function or an entire processing function may be performed in response to various problem program languages. The control program establishes the link between the various types of programs. In greater detail, one type of program is written for the natural mode of operation of the subject data processing system, while a second type of program is of the substituted type as is fully described in the previously identified U.S. patent application, Ser. No. 454,325.

The transitional act of going from one type of program to another is referred to as program mode switching and occurs not only when switching between the various complete programs, but also between portions of a single program. For example, the processor while operating in its compatibility mode, i.e., operating in response to a substituted program, recognizes an input-output (I/O) interrupt which is foreign to the substituted program but which is serviced in the natural mode of operation of the processor. In this case, the substituted program exits to the control program and the processor renews processing in response to a program capable of executing the I/O interrupt. At the completion of the processing function in the natural mode of operation, a second exit is made to the control program which continues the execution of the substituted program.

Referring to FIG. 1, a main storage area 2201 is shown subdivided into several smaller portions. The portions later fully described and identified are not exclusive of other possible portions in a complete system but are the only portions which enter into the operation of the invention. Additionally, the same numbers are used throughout the several views to identify similar elements.

The associated electronic data processor (EDP), for example the IBM type 2030, is operating in response to a series of OP codes 2*a* through 2*d* written to reflect the natural mode of operation of the EDP. A first read only memory (ROM) 4 supplies the required microinstructions to execute the operation specified by its corresponding OP code 2. The OP code 2*c* having a corresponding main storage address field 5 of 2240 calls for a program mode switching operation by a unique OP code 99 in an OP code field 6. A second group of related signals 7*a* through 7*e* is stored in the main storage area 2201. The signals 7*a* through 7*e* resemble the OP codes 2*a* through 2*d* in that they comprise a program. However, since they are written in a separate programming language, they do not comprehensively instruct the EDP. A second ROM 8 contains groups of control words which correspond to each of the signals 7*a* through 7*e* and causes the EDP to emulate the operation of the second EDP, for example the IBM type 1401, for which the signals 7*a* through 7*e* were devised.

In exiting from the first program or series of OP codes 2, a program status word (PSW) 10 is saved at a unique address in the memory 2201, which among other things contains the address of the next sequential OP code in the series 2. That address is 3244 and may relate to the beginning of a new program or at least to a remaining step or series of steps written for execution in the normal mode of operation.

The program mode switching routine, completely described with reference to FIG. 4, retrieves from an auxiliary storage area 12 the beginning address 3060 of the corresponding substituted program, which address identifies the first OP code 7*a* of the substituted program 7. If entry is made at any other part of the program 7, the proper address indicia must previously have been entered in supplemental storage area 12 at K addressable storage locations zero (0) and one (1) completely identified with reference to FIG. 3.

The EDP is executing the substituted program 7 using its ROM 8 when an OP code 7*c* includes a write on disk file OP 87 in its OP code field 13. The OP code 87 is to be executed by a program in a normal mode of operation. Hence a program mode switch operation is initiated to switch from compatibility mode to normal mode. An OLD PSW 14 is stored containing an interrupt code, FA, in a field 16, which code locates a write routine 15 within an entire supervisory program 16. Also, an address field 17 of the OLD PSW 14 contains the address 3070 of the OP code that caused the mode switch. The address of the next instruction in the substituted program 3078 is stored in the auxiliary storage area 12 in K addressable storage locations 0 and 1. A NEW PSW 18 is retrieved which includes address indicia in a field 20 which contains an address for accessing the supervisory program 16 which controls the write on disk operation in the natural mode of operation of the EDP. When the write on disk operation 13 is completed the last OP code in the series 13*c* calls for a mode switch by again giving the unique OP code 99 so that the substituted mode of operation may be resumed at the address previously saved in the auxiliary storage area 12. Finally, the last OP code 7*e* is reached which specifies a halt operation and the program mode switching routine recognizes this OP code as one of those requiring a switch back to the normal mode of operation. The OLD PSW 14 is stored as described previously but this time an interrupt code of F1 in position 16 of the OLD PSW. The supervisory program 16 now recognizes that a halt condition has occurred in the substituted program and resumes normal mode processing in program 2.

Figure 2A:
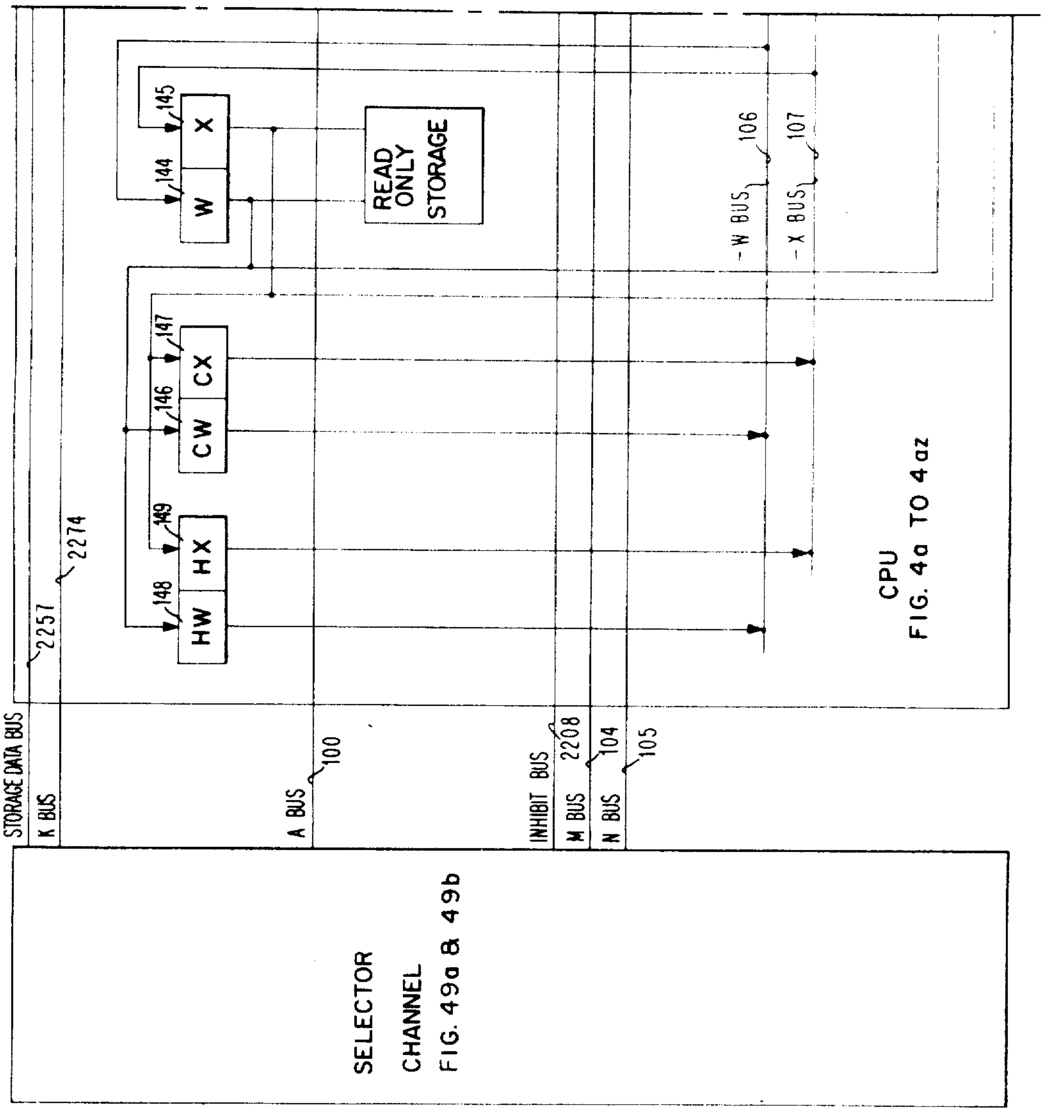

FIGS. 2 and 4, and their identified subfigures, of U.S. patent application "Data Processing System," S.N. 387,443, filed Aug. 4, 1964, by R. J. Carnevale et al. now Patent No. 3,315,235, are included by reference to the present application. This application is referred to hereinafter as application A. FIGS. 2 and 4 have been changed to operate in an improved manner but not beyond the scope and equivalence of the previous patent application. Although the device taught in the above described patent application operates satisfactorily, the hereinafter described changes have been made to improve the efficiency of the data processing device. The changes to FIGS. 2 and 4 are now described in detail. Any reference to figure numbers greater than 4 refer to a U.S. patent application entitled "Data Processing System," S.N. 357,372, filed Apr. 4, 1964 by G. M. Amdahl et al., now Patent No. 3,400,371, which application is included by reference into the present patent application. This application is referred to hereinafter as application B.

*Changes of the drawings*

The identifying numerals employed in the aforementioned patent application A have not been changed. However, the changes are identified by using numbers raised to the prime.

Figure 2B:
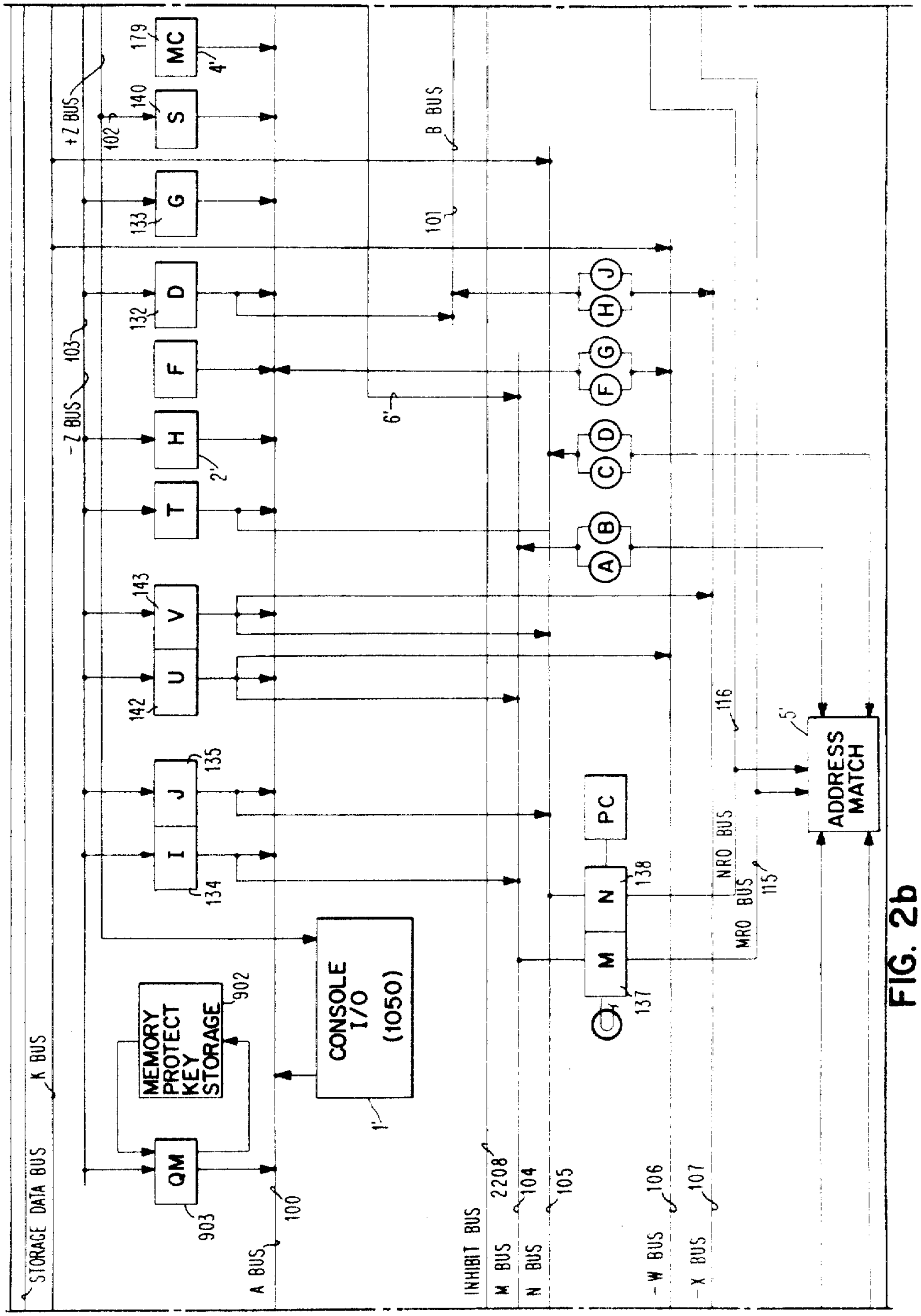
Figure 2C:
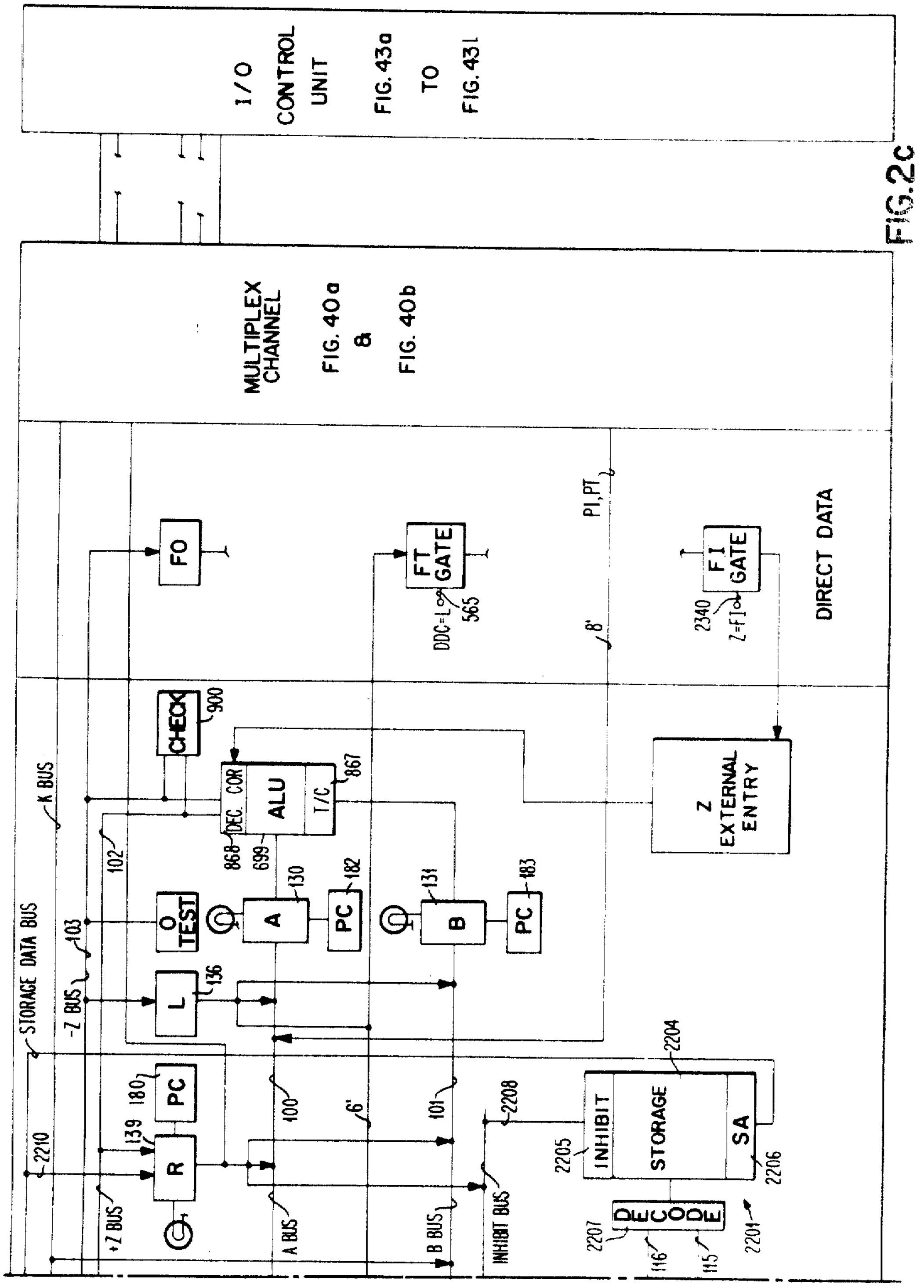

Referring to FIG. 2*b*, an Input-Output console 1 receives data from the +Z bus 102 and applies its output to the A bus 100. An H register 2' receives its input signals from the —Z bus 103. The output of the H register 2' is applied to the A bus 100. The E register 179 is now identified as a MC register 4'. The A and B console switches are now connected in parallel between the M bus 104 and the address match circuit 5'. The C and D console switches are now connected in parallel between the N bus 105 and the address match circuit 5'. The E and F switches have been relabeled the F and G switches, respectively, and are connected in parallel between the A bus 100 and the —W bus 106. The G and H console switches have been relabeled the H and J switches, respectively, and are connected in parallel between the B bus 101 and the —X bus 107. The L register 130, shown in FIG. 2*c*, is additionally connected to the M bus 104, shown in FIG. 2*b*, by a line 6'. A line 8' now furnishes the A bus 100 with signals identified on a PI signal and a PT signal.

Figure 4A:
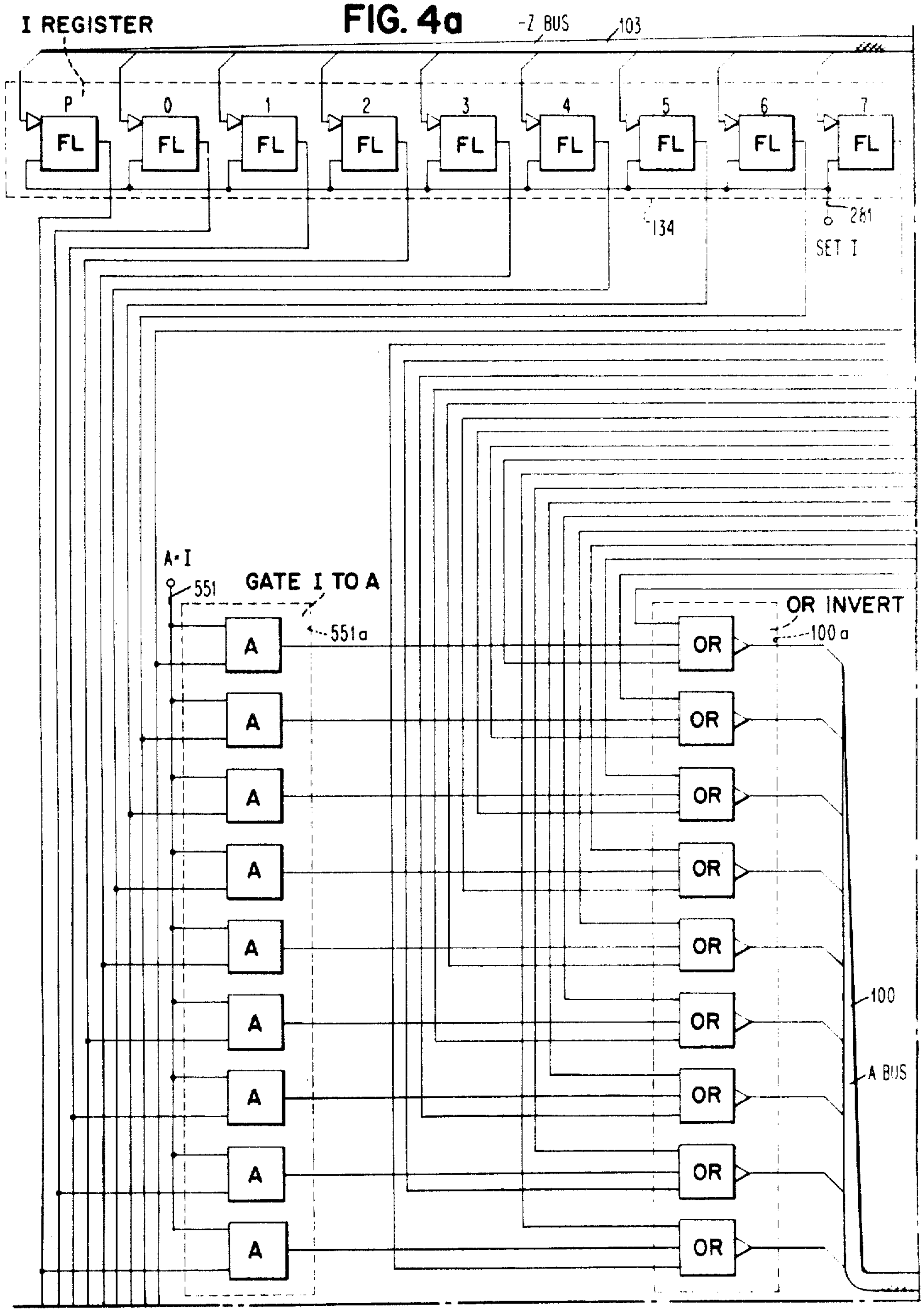
Figure 4B:
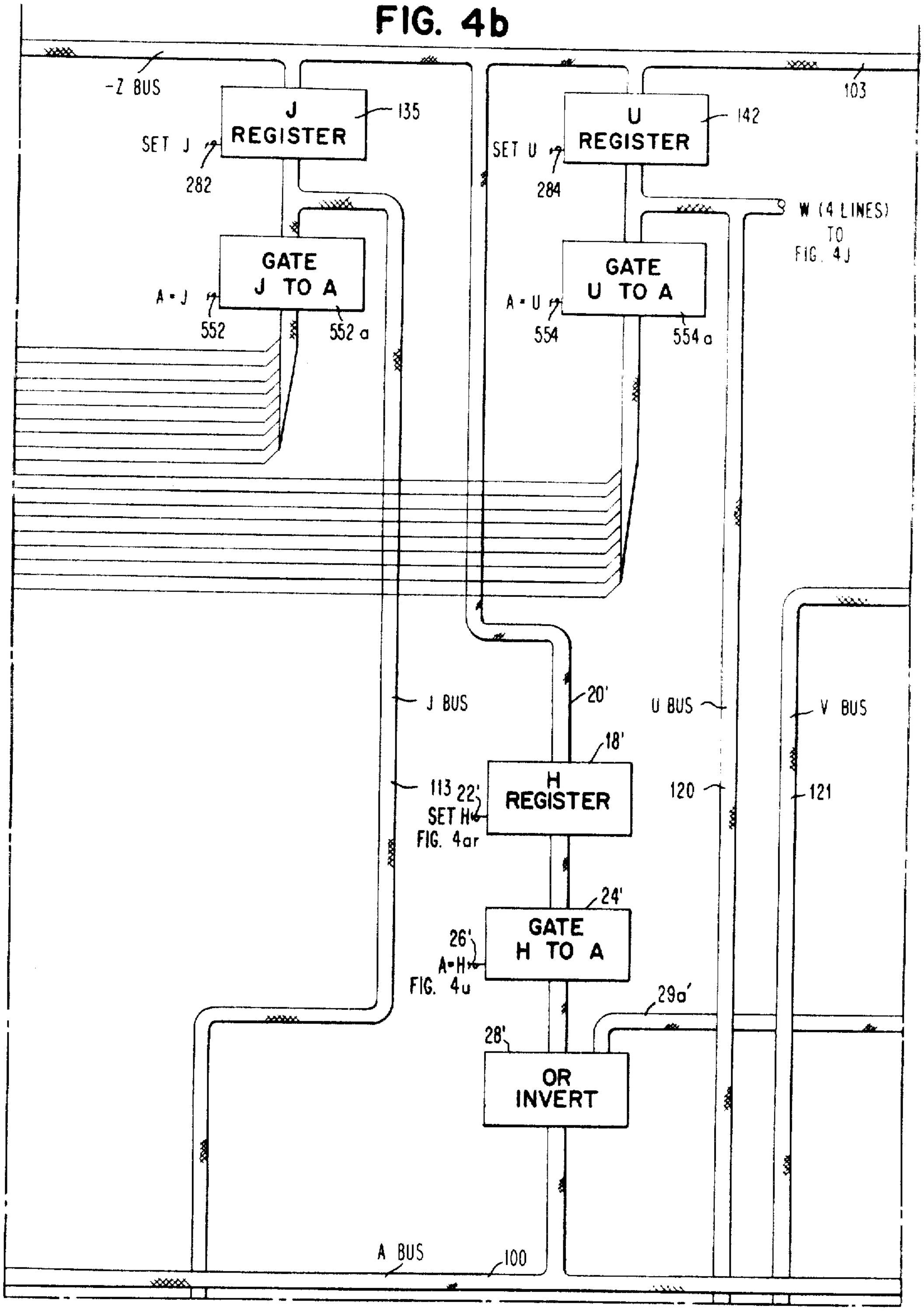
Figure 4C:
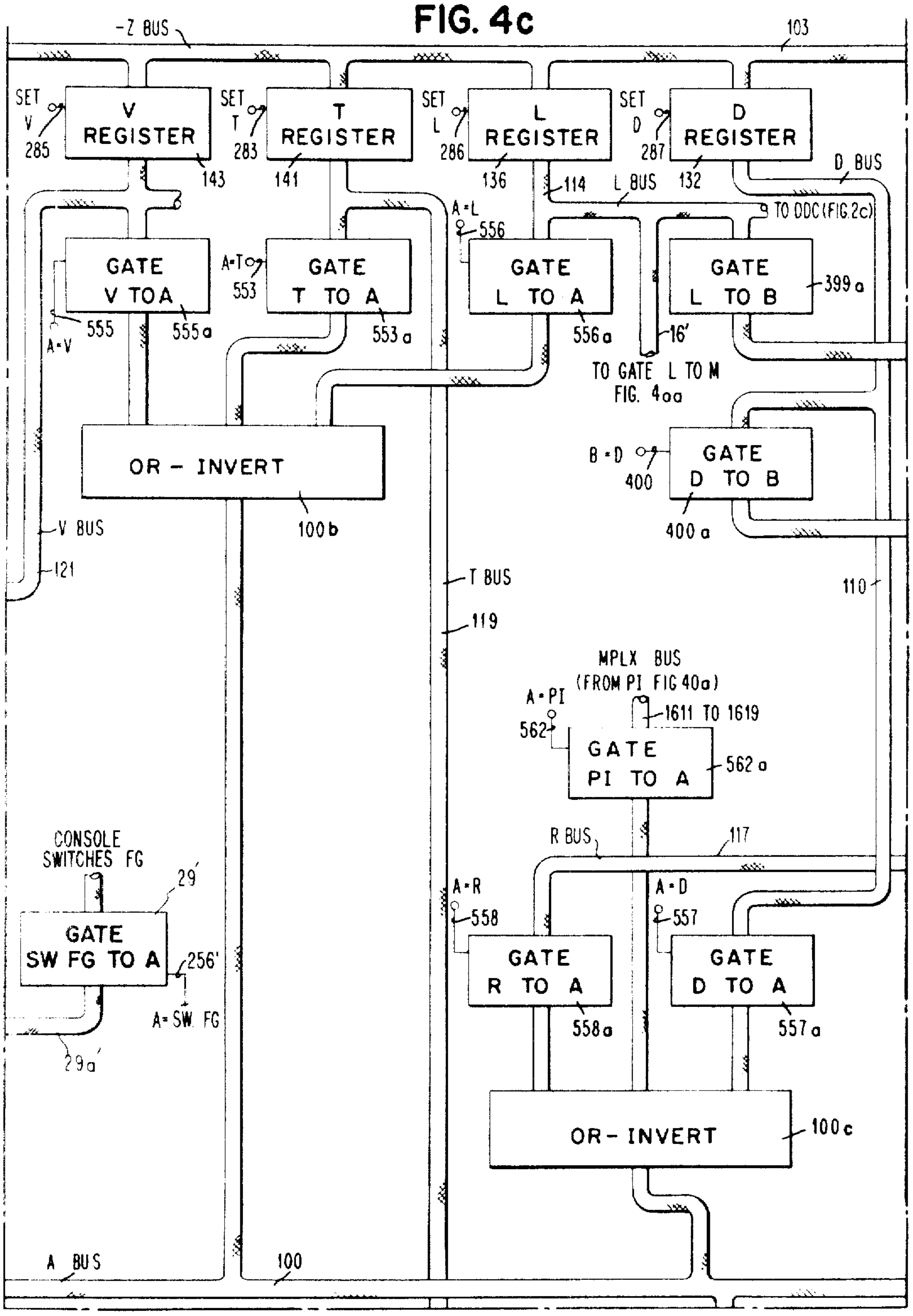
Figure 4D:
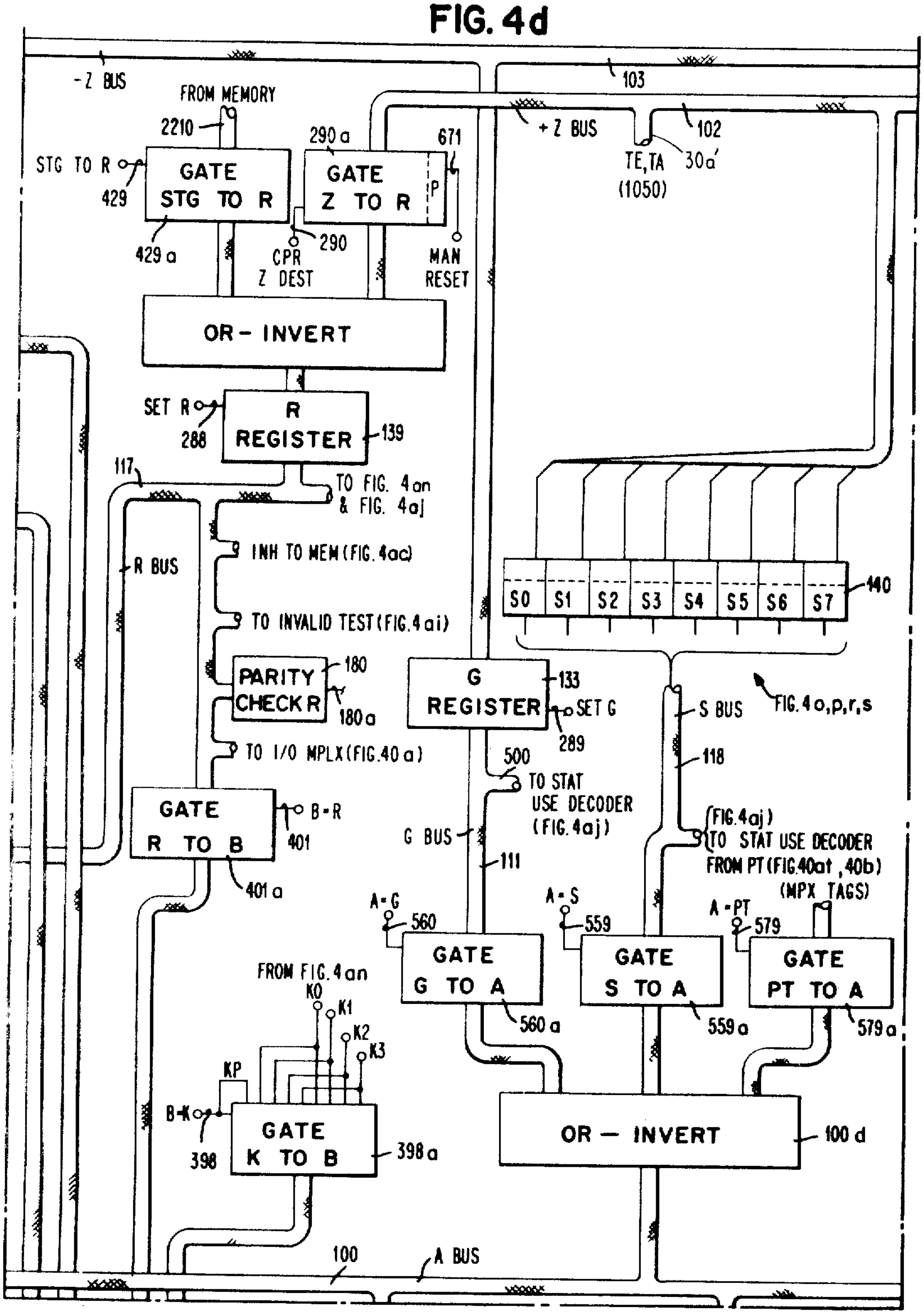
Figure 4E:
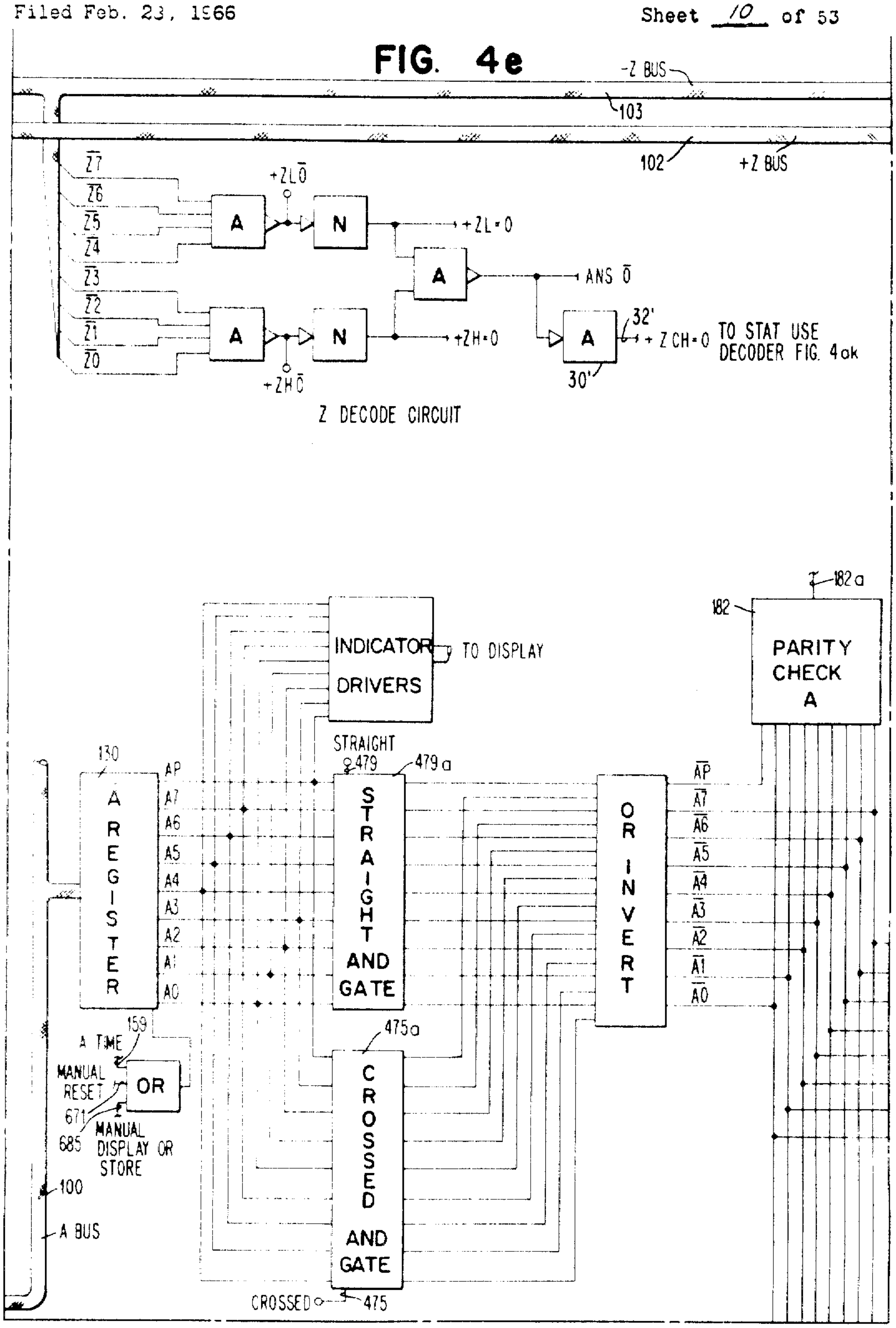
Figure 4F:
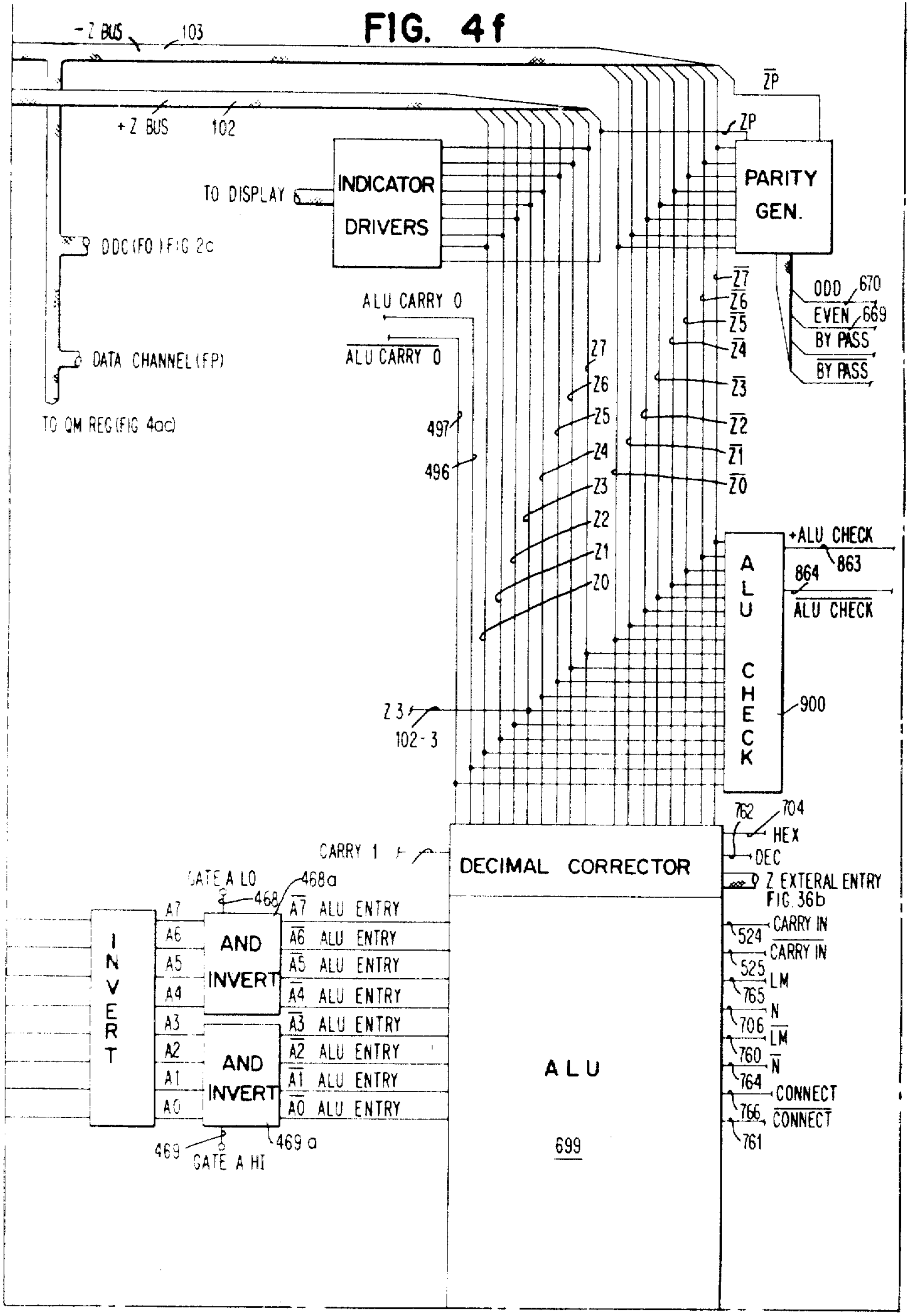
Figure 4G:
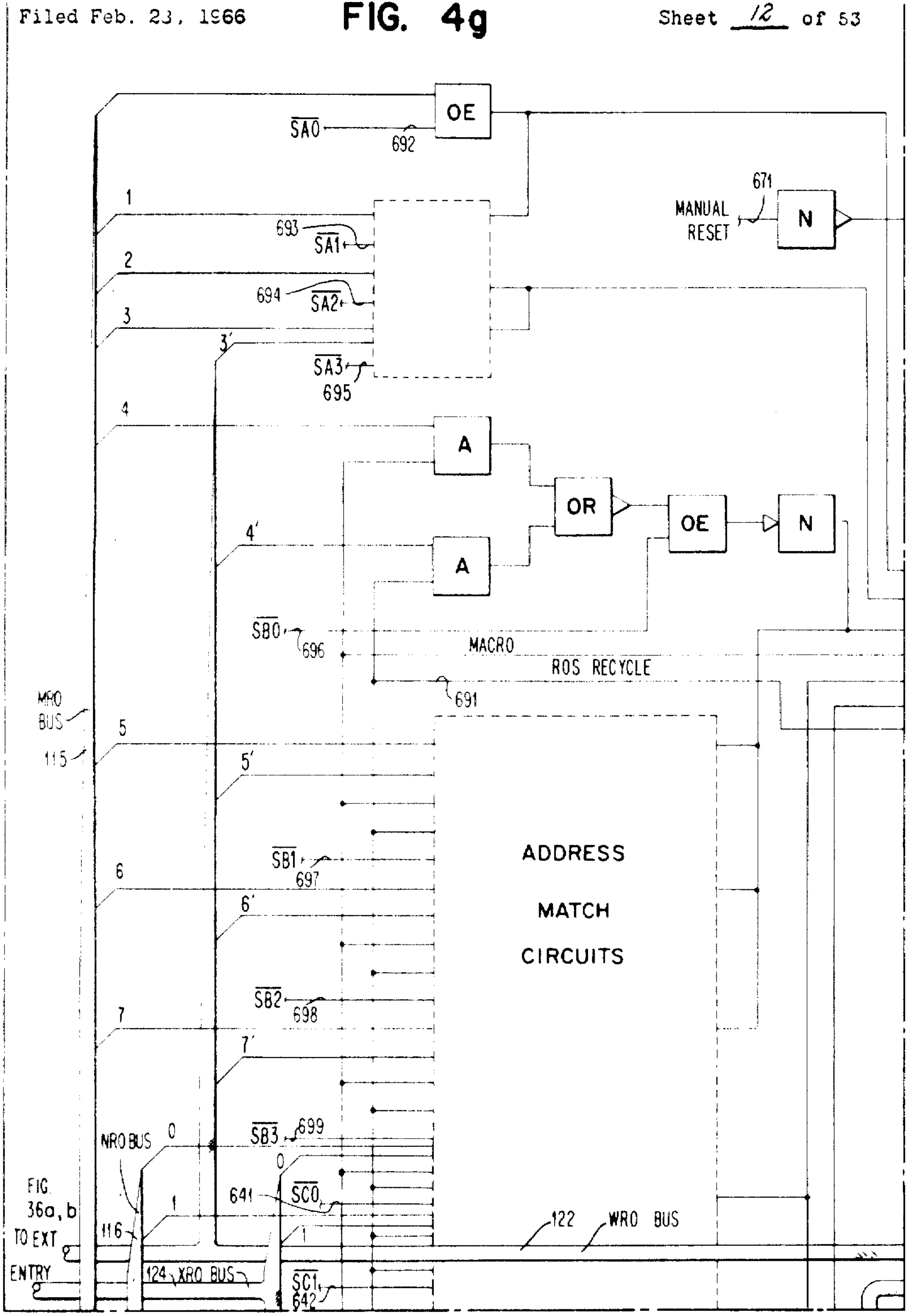
Figure 4H:
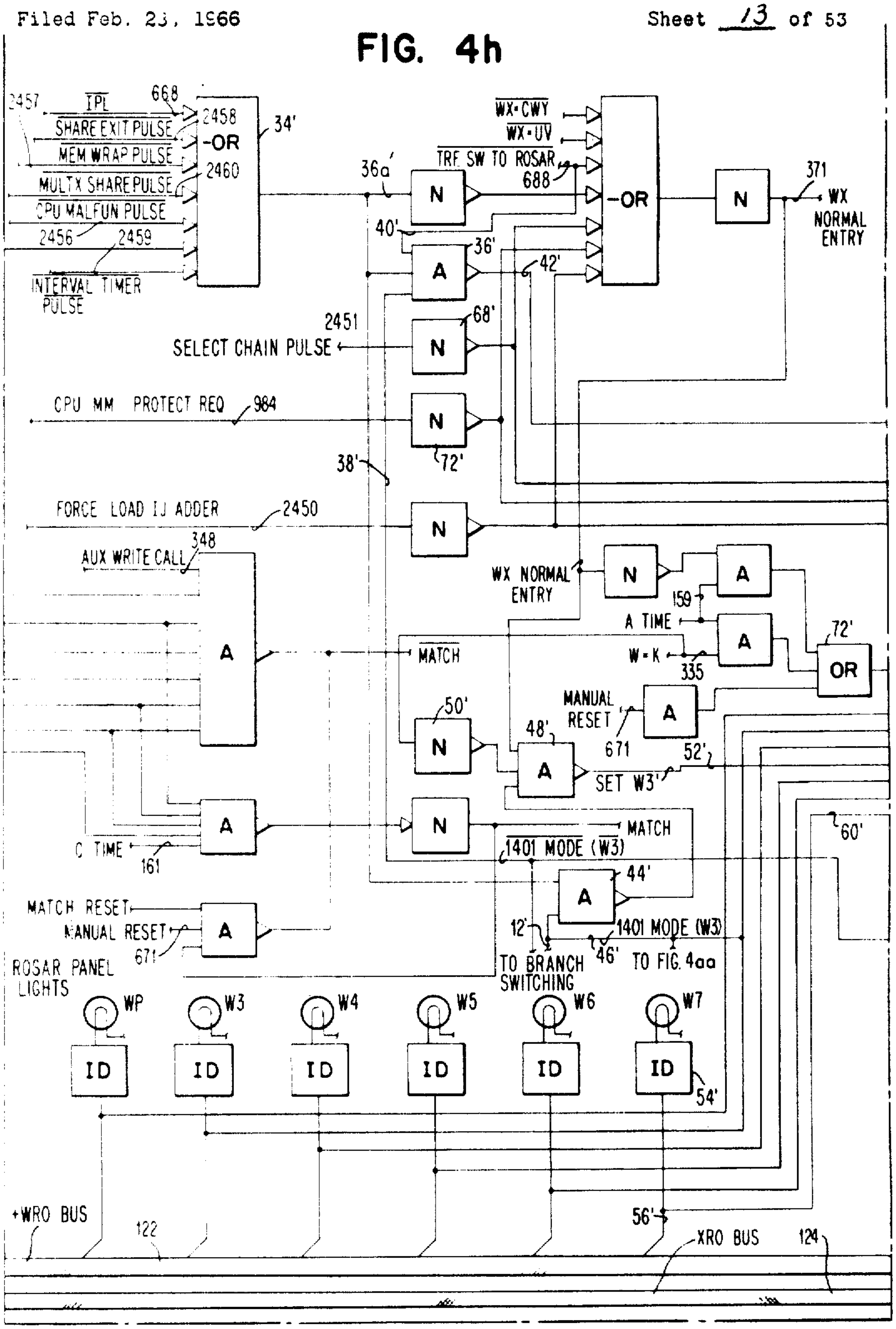
Figure 41:
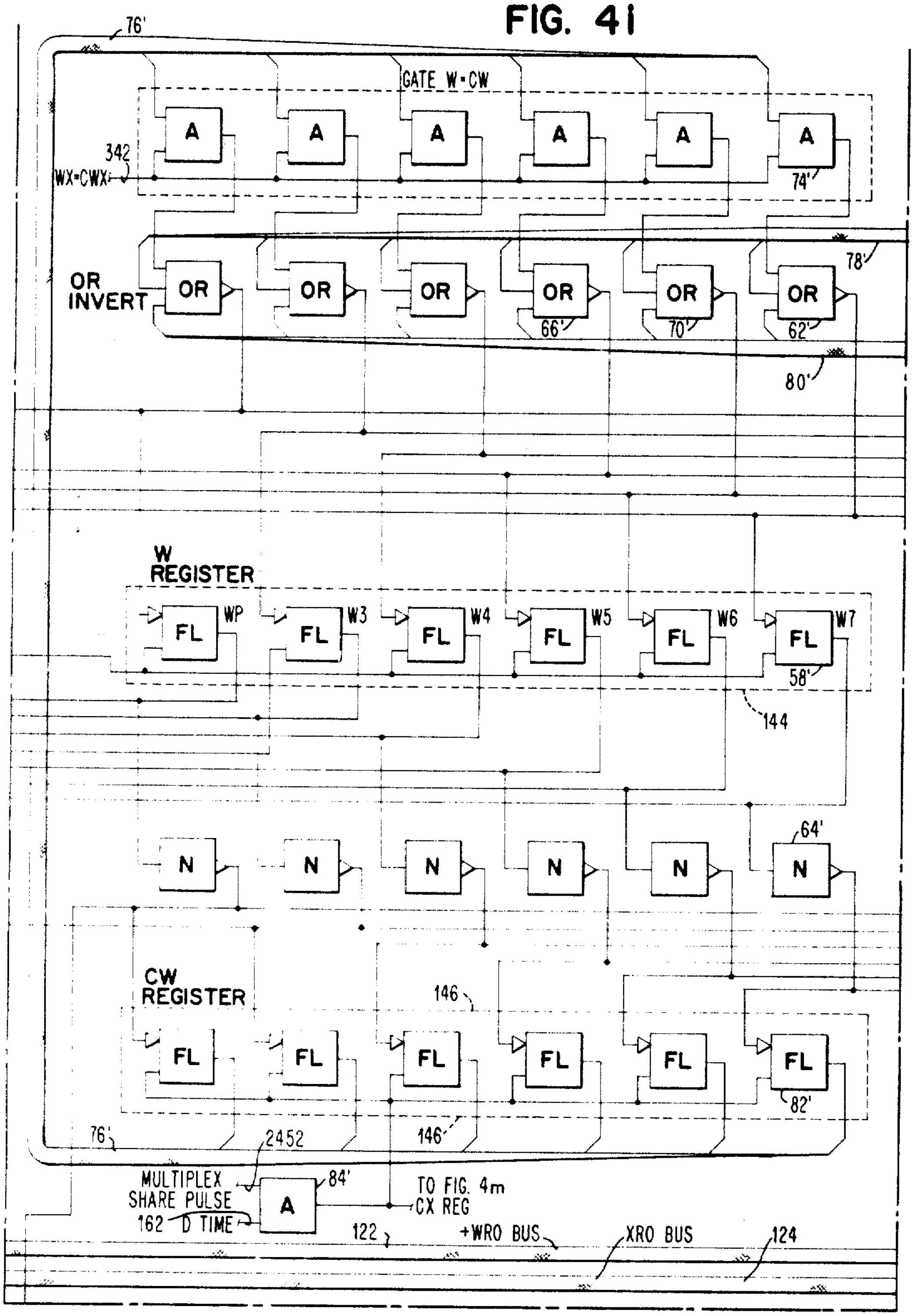
Figure 4J:
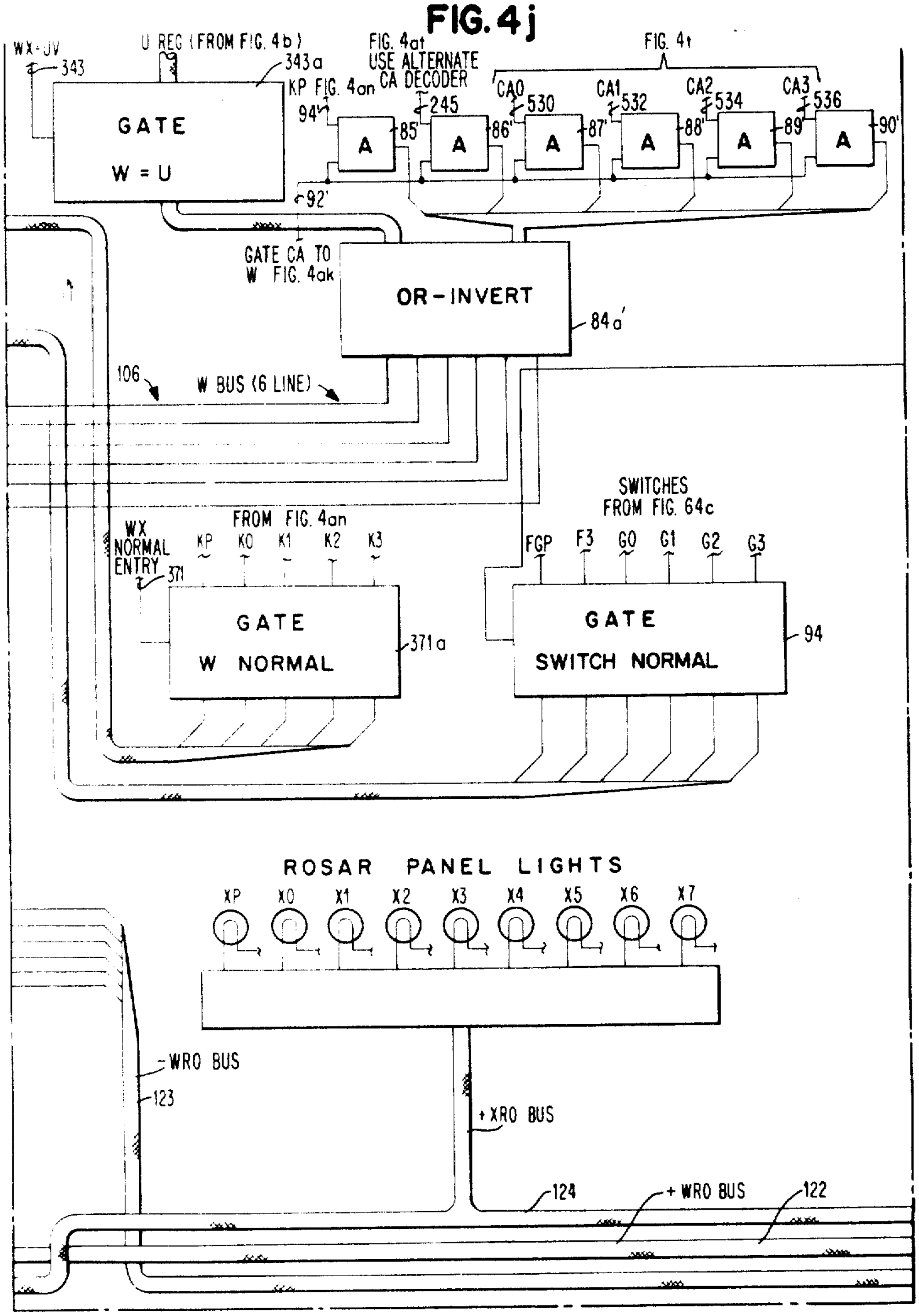

Referring to FIG. 4*aa*, an AND gate 10' is equipped with 2 input signals; the first of which is the $MN=T$ signal on a line 338, the second of which is the MODE SUBSTITUTION enabling signal on a line 12' from FIG. 4*h*. The output of the AND gate 10' is applied to a gate 14'. The gate 14' has as its input signal the output of the L register shown in FIG. 4*c* on a bus 16'. The output of the gate 14' is applied to an OR-INVERT circuit **104*b* in parallel with the existing signal applied to the OR-INVERT circuit 104*b*. The line 686** has been renamed SW-ABCD, and the entry from the console switches, shown in FIG. 64*c* of the B application, is from the AB switch.

Referring to FIG. 4*b*, the Z bus 103 is connected to an H register 18' by a bus 20'. The H register has a second input enabling signal on a line 22' from the FIG. 4*ar*, and labeled SET H. The enabling signal on the line 22' is operative to gate the contents from the −Z bus into the H register 18'. The output of the H register is applied to a gate H to A circuit 24'. A second input signal to the gate 24' is an enabling signal on a line 26' from FIG. 4*u* and labeled $A=H$. The functioning of the enabling signal on the line 26' is to gate the contents of the H register to the A bus 100 by an OR-INVERT circuit 28'.

Referring to FIG. 4*c*, a line 16' is shown connected to the output of the L register 136 and is further identified as TO GATE L to M, FIG. 4*aa*. A gate SW FG to A circuit 29' is enabled by an $A=SW$ FG signal on a line 256'. The input to the circuit originates at the console switches FG, and the output is applied to the OR-INVERT circuit 28' in FIG. 4*b* by a bus **29*a*'**.

The circuit **686*a***, shown in FIG. 4*ab* is now identified as a GATE SW GH ENTRY with an input from console switches CD and an enabling signal from the SW ABCD entry.

Figure 4K:
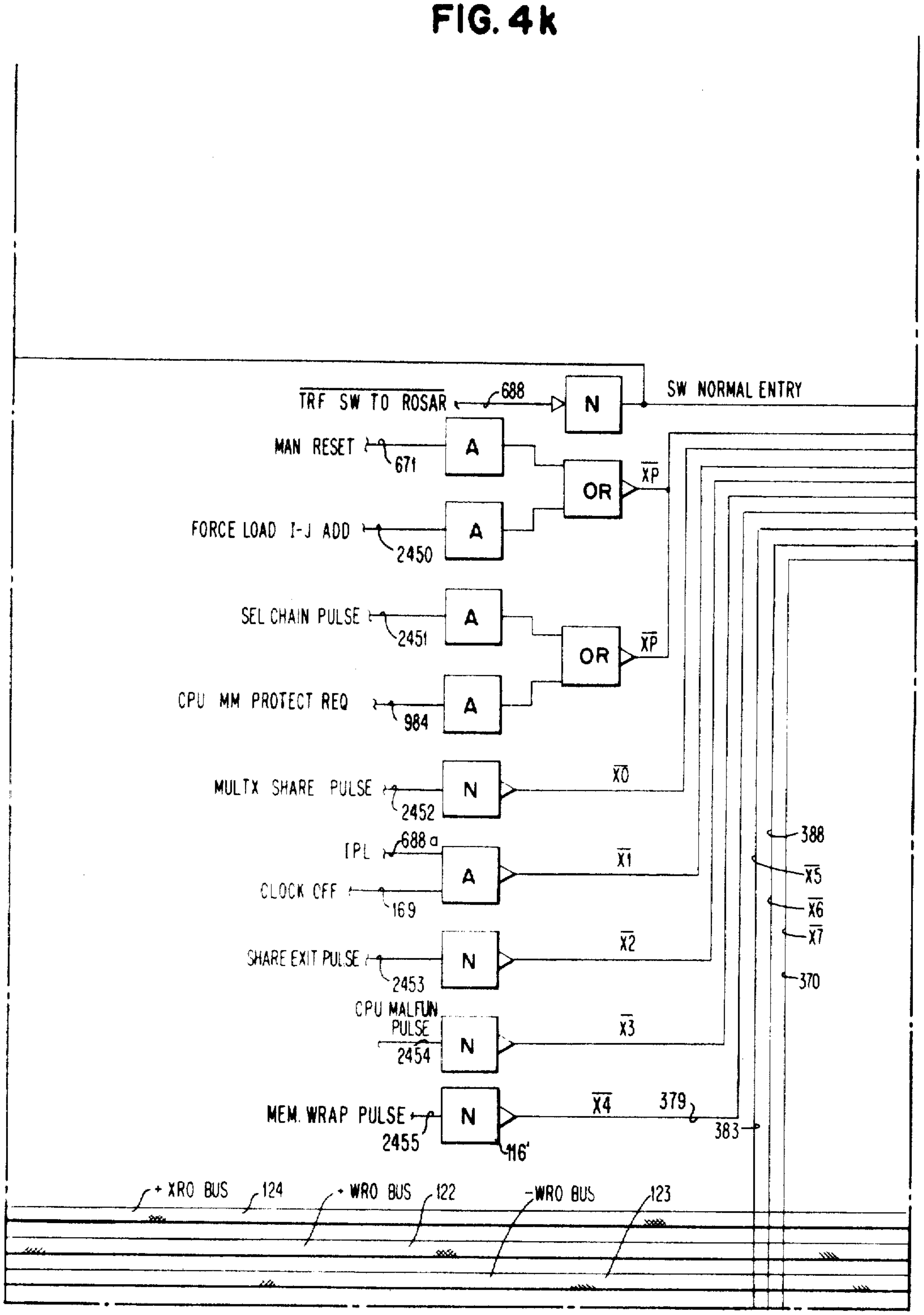
Figure 4M:
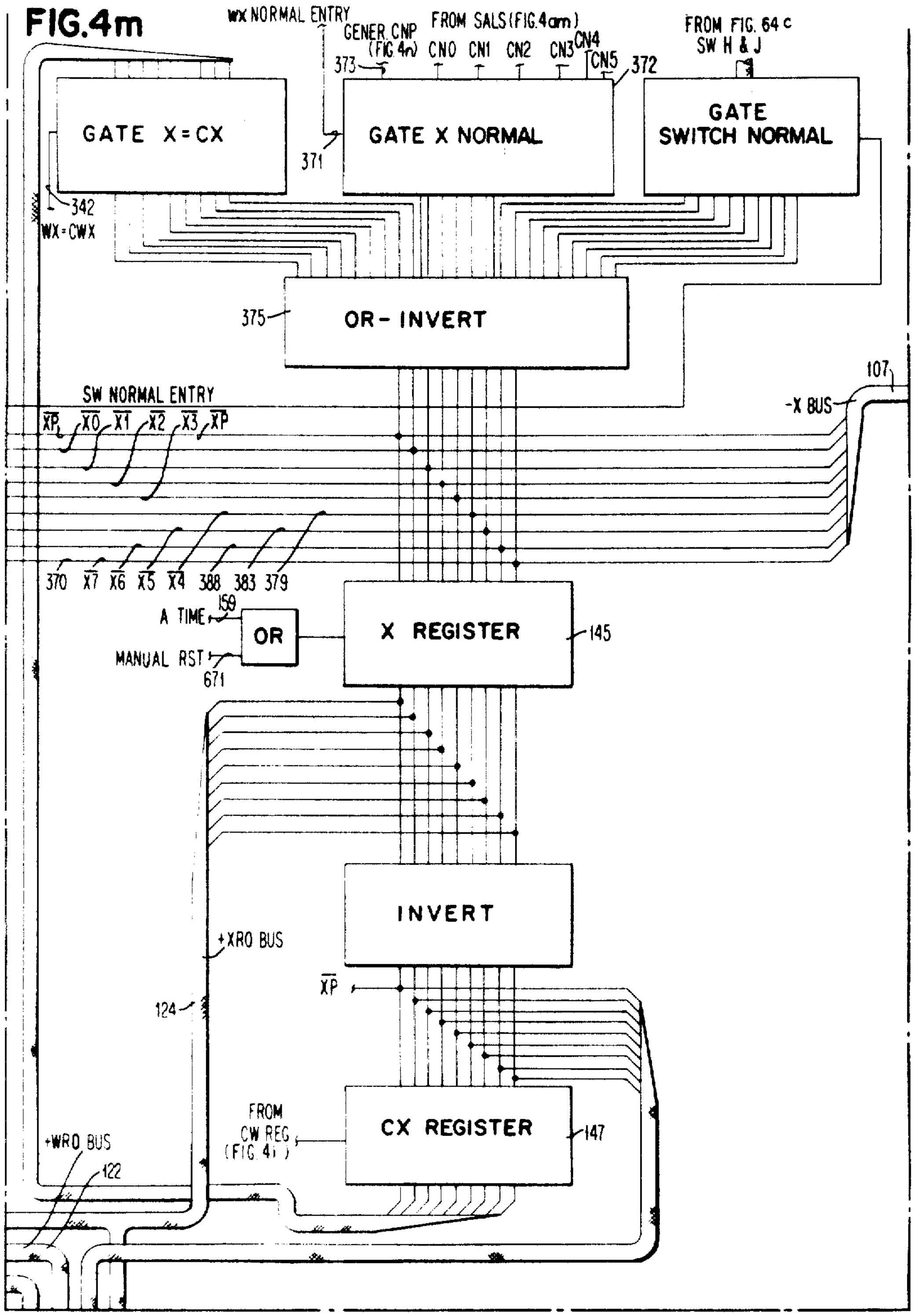
Figure 4N:
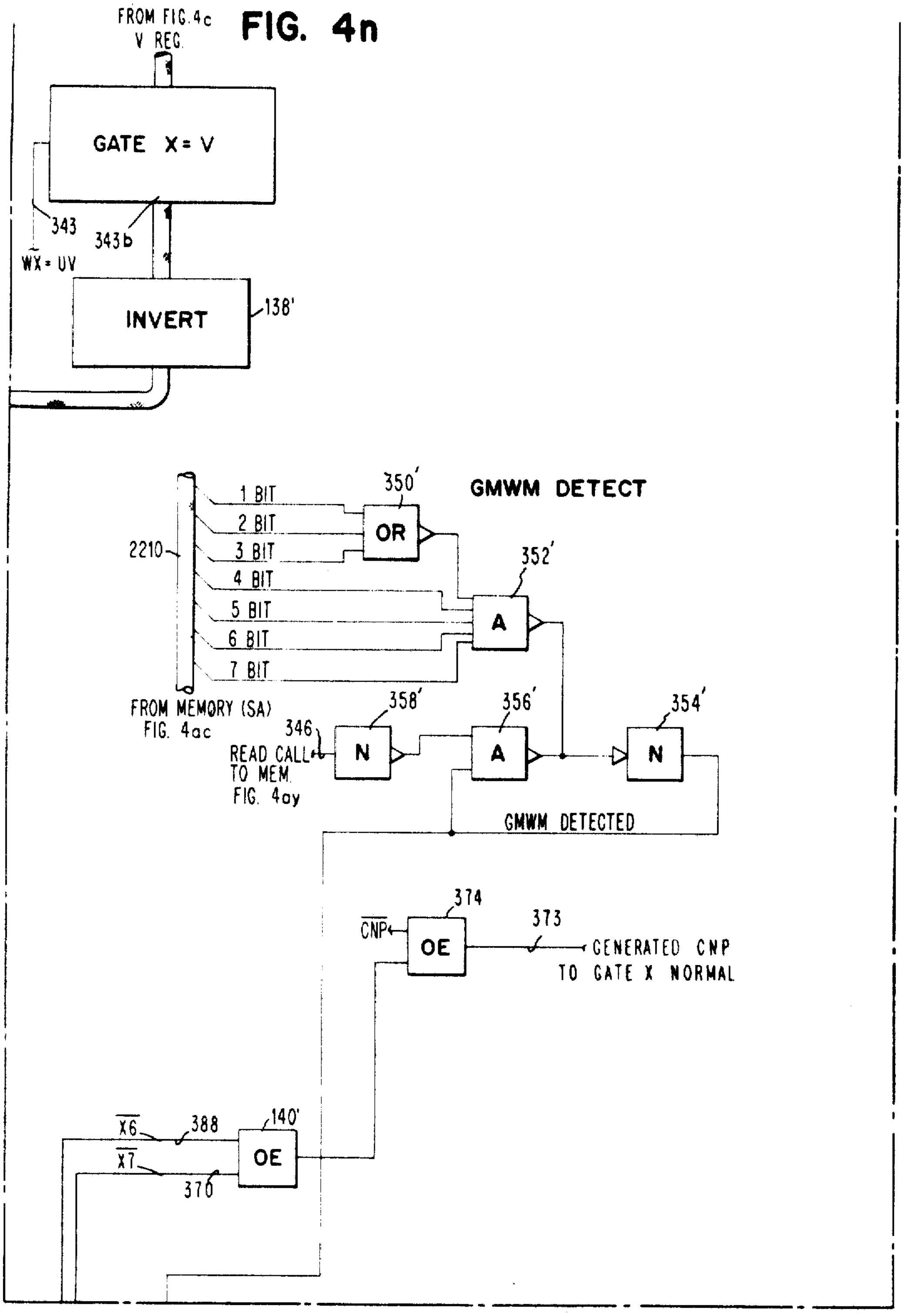

Referring to FIG. 4*ac*, the bus 2210 is also connected to a GROUP MARK WORD MARK (GMWM) detect circuit shown in FIG. 4*n*.

Referring to FIG. 4*d*, the R bus 117 is also connected to the branch switching network shown in FIGS. 4*an* and 4*aj*. An entry is made to the +Z bus 102 from console switches TE and TA by a bus **30*a*'**.

Referring to FIG. 4*ad* the identification of the line 580 now reads as $A=MC$ and the gate **580*a* now reads as the gate MC to A. The register 179 is now identified as the MC register. The gate 564*a*' is now identified as the GATE TT to A circuit having an enabling signal on the line 564 labeled $A=TT$. A GATE SW HJ to B circuit 30*b* is equipped with input signals from the console switches HJ and an enabling signal on a line 30*c*'** labeled $B=SW$ HJ shown originating from the K decode circuit, in FIG. 4*an*. The output of the gate 30' is applied to the OR-INVERT circuit **101*b* by a bus 30'*d***.

Referring to FIG. 4*e*, an AND gate 30' previously identified as connected to the $+ZCH=0$ line is now connected to the STAT USE decoder shown in FIG. 4*ak* by a line 32'.

Referring to FIG. 4*ae*, a GATE TI to A circuit 33' receives its input signals from the TI console, switches and receives its enabling signal on a line 266' labeled $A=TI$.

Referring to FIG. 4*g*, the WRO bus 122 is now identified as having five branch lines used in the figure. The line previously identified as 3 is now labeled 7'. The line previously identified 2 is now labeled 6'. The line previously identified as 1 is now labeled 5'. The line previously identified as 0 is now identified as 4'. A fifth line identified as 3' is now connected in parallel with the line 695. The following labeling is changed for the correspondingly identified lines: line 692 is labeled $\overline{SA0}$; 693, $\overline{SA1}$; 694, $\overline{SA2}$; 695, $\overline{SA3}$; 696, $\overline{SB0}$; 697, $\overline{SB1}$; 698, $\overline{SB2}$; 699, $\overline{SB3}$; 641, $\overline{SC0}$; and 642, $\overline{CS1}$.

Referring to FIG. 4*ag*, the following labeling is changed for the correspondginly identified lines: line 643 is now labeled $\overline{SC2}$; line 644, $\overline{SC3}$; 645, $\overline{SD0}$; 646, $\overline{SD1}$; 647, $\overline{SD2}$; and 648, $\overline{SD3}$.

Referring to FIG. 4*h*, the OR gate 34' is now completely identified as a minus OR gate. The output of the OR gate 34' is additionally applied to an AND gate 36'. The AND gate 36' is equipped with two additional input signals; the first of which is from a line 38' and is identified as the $\overline{1401}$ MODE enabling signal ($\overline{W3}$), the second of which is from the line 40'. The line 40' is connected to the line 688. The output of the AND gate 36' is connected to a line 42'. The output from the INVERT circuit **36*a*' is no longer connected to the line 42'. The output from the OR gate 34' is also connected to a second AND gate 44'. The AND gate 44' has a second input enabling signal on the line 46'. The line 46' is identified as the 1401** MODE enabling signal (W3) and is connected to the ouput of the W3 flip-flop shown in FIG. 4*i*. The output of the AND gate 44' is applied to an AND gate 48'. The AND gate 48' has two additional input signals; one of which is from an inverter gate 50' and the other of which is from the line 371. The inverter gate 50' receives its input signal from the line 335. The output of the AND gate 48' is connected as one of the input signals to the flip-flop W3 shown in FIG. 4*i* by a line 52' to set the W3 flip-flop to its first stable condition. The ROSAR parallel lights previously identified as the W0, W1, W2 and W3 are now identified as the W3, W4, W5 and W6 respectively An additional indicator light 54' is identified as a W7 light. The indicator 54' is connected to the XR0 bus by a line 56' and to a flip-flop 58' shown in FIG. 4*i* by a line 60'. The flip-flops W0, W1, W2 and W3, shown in FIG. 4*i*, are now identified as W3, W4, W5 and W6, respectively. The flip-flop 58' receives one of its setting input signals in parallel with the flip-flop W6. The second input enabling signal is applied thereto from an OR inverter gate 62' shown in FIG. 4*j*. The output of the flip-flop 58' is applied to an inverter gate 64'. The flip-flop W5 receives its input signal from an OR inverter gate 66' or an inverter gate 68' shown in FIG. 4*h*. The flip-flop W6 receives its input signal from the OR inverter gate 70' or the INVERT circuit 72' shown in FIG. 4*h*. The gate $W=CW$ has been expanded to show an additional AND gate 74'. The AND gate 74' receives one of its input signals from a bus 76' and its second input signal from the $WX=CWX$ line 342. The output from the AND gate 74' is applied to the inverter gate 62' shown in FIG. 4*i*. The inverter gate 62' receives two additional input signals; the first of which is from the bus 78' and the other of which is from the bus 80'. The output of the inverter gate 64' is applied to an additional flip-flop 82' in the CW register 146. The flip-flop 82' receives one of its inputs from the output of an AND gate 84' and receives its second input signal from the inverter gate 64'. The output of the inverter gate 64' as applied to the flip-flop 82' is also applied to the bus 123. The output from an inverter circuit **84*a*' comprises the W bus and consists of six individual lines. A plurality of AND gates 85' through 90' are employed to gate the input signals from the CA field of the ROM control signal to the W bus 106. The gating signal is available on a line 92'** and is labeled gate CA to W and originates in FIG. 4*ak*. The AND gate 85' receives its second input signal by a line 94' which is connected to the K decode 595 shown in FIG. 4*an*. The AND gate 86' receives its second input signal by line 245 shown in FIG. 4*at*. The AND gates 87' through 90' receive their second input signals respectively from the output of the CA decoder shown in FIG. 4*t*. The gate switch normal circuit 94' now receives its input signal from the switches shown in FIG. 64*c* labeled FGP, F3, G0, G1, G2, and G3.

Referring to FIG. 4*ah* the line **477*a* is connected directly to an OE circuit 96'**.

Referring to FIG. 4*ai*, the output of an OE circuit 98' is now connected to an additional OE circuit 100'. The output of the OE circuit 100' is connected to an OE circuit 102'. An OE circuit 104' is equipped with two input signals; the first of which is the $\overline{CM0}$ signal on the line 332 and the second of which is the $\overline{CM1}$ signal on the line 333. The output of the circuit 104' is connected to an OE circuit 106'. The circuit 106' receives a second input signal on the line 334 identified as the $\overline{CM2}$ signal. The output of the circuit 106' is applied as the second input signal to the circuit 100'. The output of the INVALID DECIMAL DIGIT TEST CIRCUIT 108' shown in FIG. 4*ai* is connected to the CL decoder circuit 122' shown in in FIG. 4*ak* by a line 110'.

Referring to FIG. 4*aj*, the CH decoder circuit has been equipped with a plurality of new input signals identified as follows: the first of which is on a line 112' connected to the V6, 7=00 or GMWM output signal shown in FIG. 4*an*. A second line 126' applies the S1 or R2 signal from FIG. 4*an* to the CH decoder. A STATUS-IN signal and OP-IN signal is available from the multiplex channel shown in FIG. 40. The ALU CARRY 0 is available on the line 496 and the S0 signal is available on the line 190. The signals S2 and S4 and S6 are available on the lines 192, 194 and 196 respectively. The signals G0, G2, G4 and G6 are available on the lines 500 respectively. The remaining of which are input signals previously employed with the CH decoder. The line 500 is connected to an AND gate 114' in the FIG. 4*y* by the line 409.

Referring to FIG. 4*k*, an inverter circuit 116' receives its input signal from the line 2455 and applies its output signal to the $\overline{X4}$ line 379.

Referring to the FIG. 4*ak*, the inverter gate 382 is now equipped with an INTERVAL TIMER PULSE signal on the line 2436. The AND gates 387 and 369 now receive their second input signal from the line 371. The CL decoder shown in FIG. 4*ak* has been furnished with a plurality of new input signals as shown in the figure. A CL bus 118' and 120' now comprise four individual lines. Therefore, each of the buses generates eight signals by the normal method of binary combination. Therefore sixteen AND gates are shown in a CL decoder 122'. Each of the AND gates is equipped with a separate signal which is gated through its respective AND gate whenever the combination of binary signals on buses 118' and 120' is available.

The CL decoder is shown having the enabling bus 118' equipped with four lines $\overline{CL0}$, $\overline{CL1}$, $\overline{CL2}$ and $\overline{CL3}$'. The line 120' is equipped with four constituent lines CL0, CL1, CL2 and CL3'. These eight signals from the buses 118' and 120' are combined with a plurality of additional control signals to gate the CA decoder to the W register by way of an inverter circuit 130'. Additionally, the output from the AND gate 128' is connected to a minus OR' circuit 367. The CL decoder 122' is equipped with a plurality of INPUT signals, ADDRESS IN signals, SERVICE IN signals, which are applied thereto from the multiplex channel shown in FIG. 40. An RVDD signal is available on the line 110'. An ALU CARRY 1 or R1 signal is available on a line 132' from FIG. 4*an*. $A+ZHC=0$ is available from the line 32' shown in FIG. 4*e*. The G7 signal is available on the line 500. The S3 signal is available on the line 193 from a register 134' shown in FIG. 4*p*. The S5 and S7 signals are available on the lines 195 and 196 respectively. A G1 or R3 signal is available on a line 136' from the FIG. 4*an*. The G3 and G5 signals are available on the line 500 respectively. A CH interrupt signal is available on line 2272 of FIG. 40*b*.

Referring to FIG. 4*m*, the gate X normal circuit 372 is equipped with two additional input signals, the first of which is a CN4 signal and the second of which is a CN5 signal. Additionally, the gate X normal circuit 372 is equipped with two extra output lines for connection to the INVERTER circuit 375 for extending the output capacity of the gate 372 to equal its input capacity. The GATE SWITCH NORMAL circuit **136*a*'** now receives its input signals from SW $H+J$ shown in FIG. 64*c*.

Referring to FIG. 4*am*, the bus 122 now comprises five individual lines labeled as follows: W7(256), W6(512), W5(1024), W4(2048) and W3. The bus 123 also comprises five additional output lines labeled as follows: $\overline{W7}$(256), $\overline{W6}$(512), $\overline{W5}$(1024), $\overline{W4}$(2048) and $\overline{W3}$. Read Only Memory (ROM) sense amplifier latches SA-1 through SA-60 have been changed in the following manner. The CL field is now equipped with four output signals. The extra storage capacity has been reduced to six-bit positions by adding an AA field having one-bit position, an AK field having one-bit position and an AS field having one-bit position.

Referring to FIG. 4*n*, the output of the gate X to V circuit **343*b* is now applied to an invert circuit 138'. The output of the invert circuit 138' is connected to the −X bus 107. The OE circuit 374 is now equipped with two new input signals; the first of which is the $\overline{CNP}$ signal and the second of which is the output signal of an OE circuit 140'**.

The output bus 2210 of the memory sense amplifier comprises a plurality of bit lines labeled one (1) through seven (7). An OR gate 350' has three input signals from the one bit line, the two bit line and the three bit line respectively. An AND gate 352' has five input signals; from the four bit line, the five bit line, the six bit line, the seven bit line, and the output of the OR gate 350' respectively. The output of the AND gate 352' is applied to an invert circuit 354' in parallel with the output of an AND gate 356'. The AND gate 356' has a pair of input signals; the first of which is the output of the invert circuit 354' and the second of which is the output of an invert circuit 358'. The input to the invert circuit 358' is the READ CALL TO MEMORY signal on the line 346.

Referring to FIG. 4*an*, the branch switching circuits are shown including a plurality of AND gates 360' through 367' and a plurality of OR gates 368' through 371'. The OR gate 368' has two input signals; the first of which is the output of the AND gate 360' and the second of which is the output of the AND gate 361'. The output of the OR gate 368' is the ALU CARRY 1 or R1 signal on a line 132'. The OR gate 369' has two input signals; the first of which is the output of the AND gate 362', and the second of which is the output of the AND gate 363'. The output of the OR gate 369' is the V6, $V7=00$ or GMWM signal on a line 112'.

The OR gate 370' has two input signals; the first of which is the output signal of the AND gate 364', and the second of which is the output signal of the AND gate 365'. The output signal of the OR gate 370' is the G1 or R3 signal on a line 136'. The OR gate 371' has two input signals; the first of which is the output signal of the AND gate 366', and the second of which is the output signal of the AND gate 367'. A $\overline{W3}$ signal is applied as an input signal to the AND gates 360', 362', 364' and 366'. A W3 input signal is applied as an input signal to the AND gates 361', 363', 365' and 367'. The remaining input signal to the AND gate 360' is the ALU CARRY 1 signal from FIG. 35*h*. The remaining input signal to the AND gate 361' is the R1 input signal from FIG. 4*d*. The remaining input signal to the AND gate 362' is the output signal from an OR gate 372', which gate has as its input signals the V6 and V7 signals from FIG. 4*c*. The remaining input signal to the AND gate 363' is the GMWM DETECTED signal from the inverter 354' shown in FIG. 4*n*. The remaining input signal to the AND gate 364' is the G1 signal. The remaining input signal to the AND gate 365' is the R3 signal. The remaining input signal to the AND gate 366' is the S1 signal. The remaining input signal to the AND gate 367' is the R2 signal.

In operation the GMWM detect circuit shown in FIG. 4*n* monitors the output of the memory sense amplifiers looking for a GMWM signal having the configuration of a positive bit in either of the first three bit positions and a positive bit in all of the last four positions. The branch switching circuits test for the presence of a positive input signal from the enumerated bit position of the R, V, G and S registers.

Figure 4O:
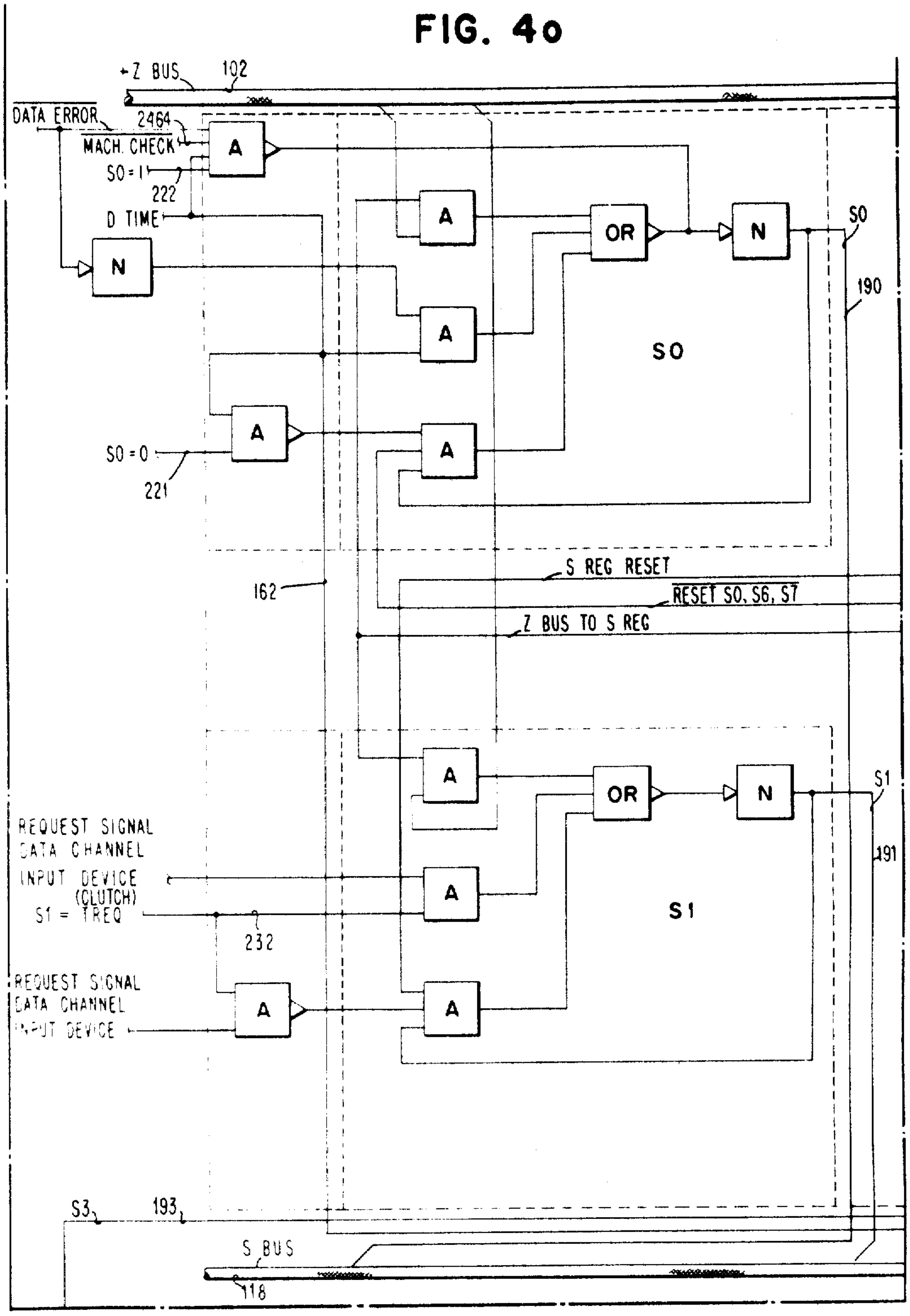
Figure 4P:
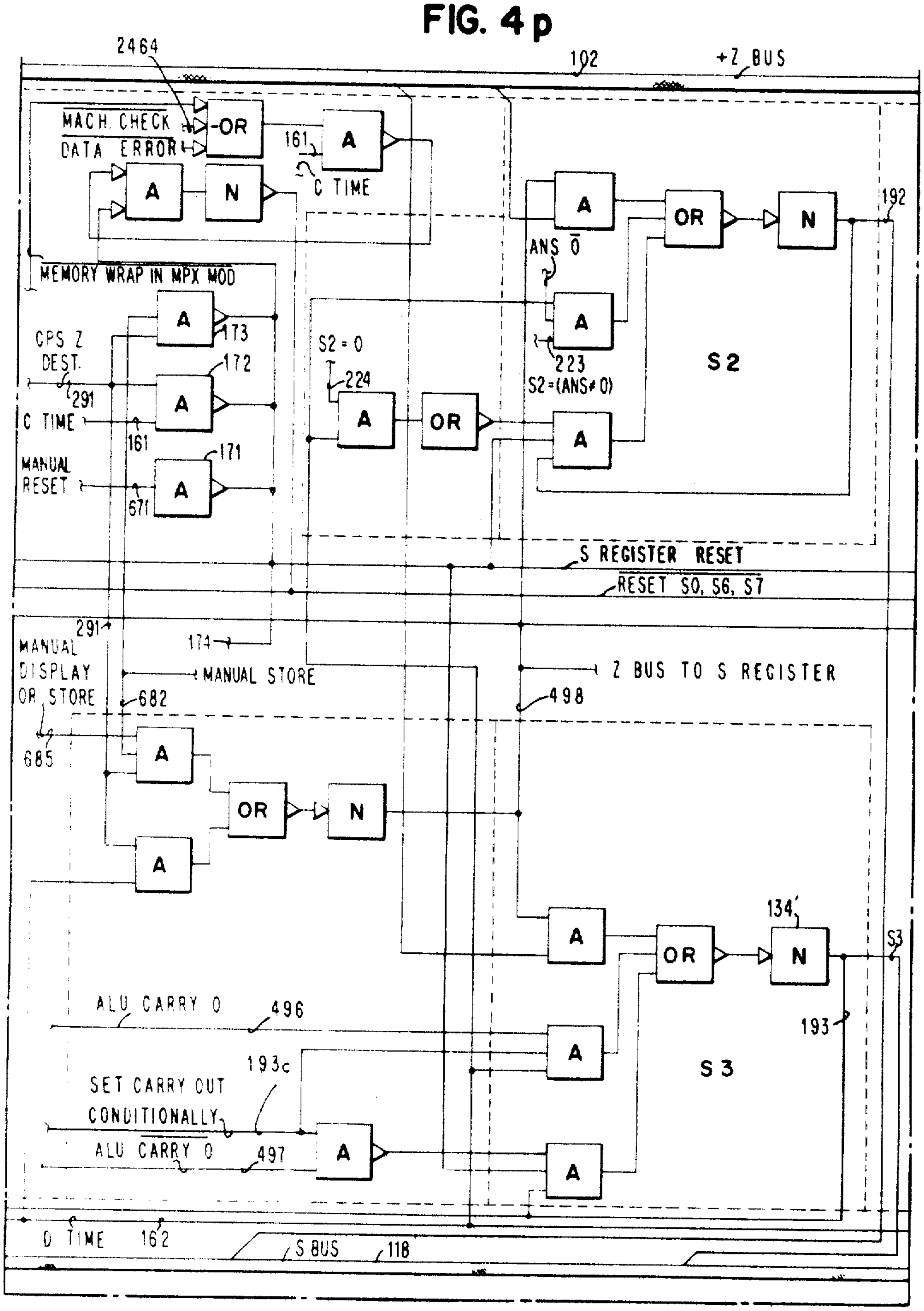
Figure 4R:
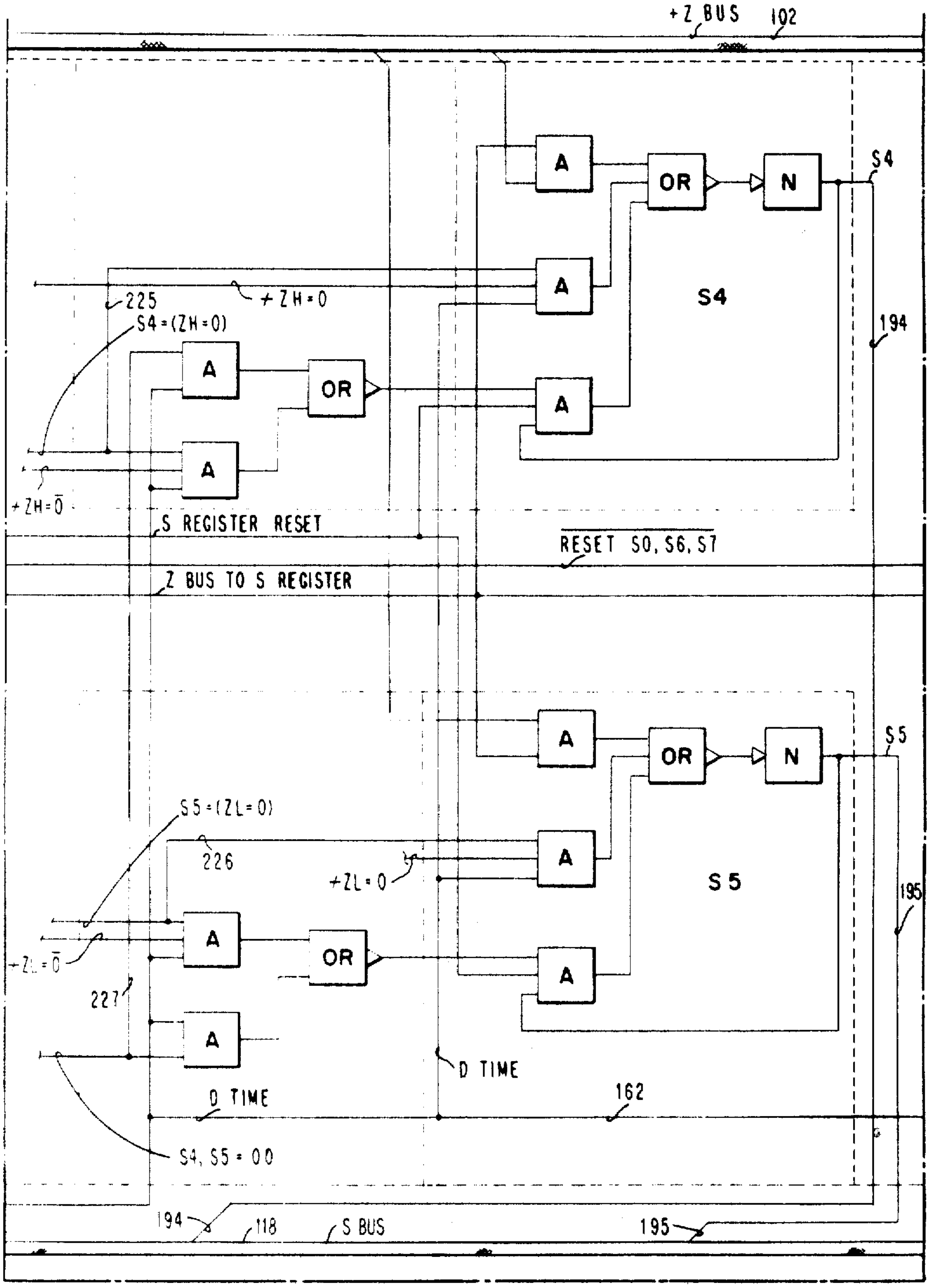
Figure 4S:
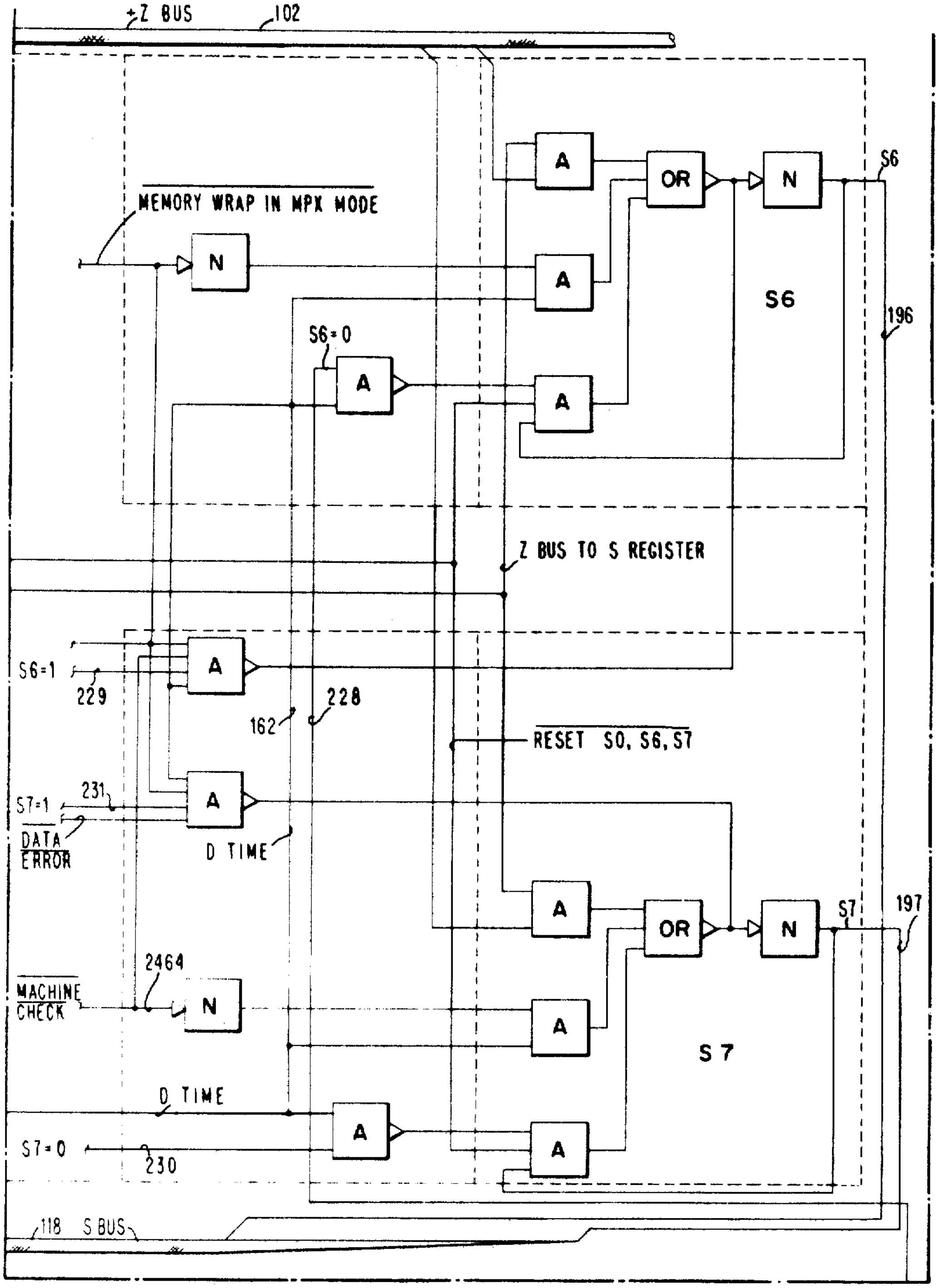

In FIG. 4*o*, line 162 has been renumbered 193 and its label now reads S3.

Referring to FIG. 4*ao*, the outputs of a plurality of AND gates 140′ through 143′ are labeled CD0, CD1, CD2 and CD3 respectively.

Referring to FIG. 4*ap*, a plurality of SPD circuits 144′ through 147′ are shown having new input signals. The SPD's are equipped with common input signals; the first of which is the D TIME signal on the line 162, the second of which is the MANUAL STORE signals on the line 682, and the third of which is the MANUAL RESET signal on the line 671. The SPD circuit 144′ has two additional input signals; the first of which is the output of an AND gate 148′ and the second of which is the SW T signal on the line 674. The SPD circuit 145′ has two additional input signals; the first of which is the output of an AND gate 149′ and the second of which is the SW V signal on the line 676. The SPD circuit 146′ is equipped with two additional input signals; the first of which is the output of the AND gate 150′ and the second of which is the SWU signal on the line 675. The SPD circuit 147′ is equipped with two additional input signals; the first of which is the output of the AND gate 151′ and the second of which is the SW J signal on the line 673. The final set pulse driver (SPD) 152′ is shown in greater detail comprising three AND circuits and an OR circuit. Each of the AND circuits is connected to one of the common signals applied to all the SPD circuits. The AND gate receiving the D TIME signal as one of its input signals is connected to the AND gate 153′. The AND gate receiving as one of its input signals the MANUAL STORE signal has as its second input signal the SW I signal on the line 672. The output from each of the AND gates is applied to the OR gate. The third AND gate has its enabling input signal permanently tied on so as to gate the MANUAL RESET signal to the corresponding OR circuit. The outputs of the SPD circuits 144′ through 147′ are available on the lines 283, 285, 284 and 282. The output of the SPD 152′ is available on the line 281.

Referring to FIG. 4*ar*, there is shown a plurality of set pulse drivers (SPD) circuits 154′ through 158′. All of the SPD circuits have three common input signals; the first of which is the D TIME signal on the line 162, the second of which is the MANUAL STORE signal on the line 682, and the third of which is the MANUAL RESET signal on the line 671. The SPD circuit 154′ has two additional input signals, the first of which is the output of the AND gate 160′ shown in FIG. 4*ao*, and the second of which is the SW G signal on the line 681. The output of the SPD circuit 154′ is the SET G signal on the line 289. The SPD circuit 155′ has two additional input signals; the first of which is from an AND gate 162′ shown in FIG. 4*ao* and the second of which is the SW L signal on the line 677. The output of the SPD circuit 155′ is the SET L signal on the line 286. The SPD circuit 156′ is equipped with two additional input signals; the first of which is the output of an AND gate 164′ shown in FIG. 4*ao* and the second of which is the SW D signal on the line 678. The output of the SPD circuit 156′ is the SET D signal on the line 287. The SPD circuit 157′ is equipped with two additional input signals, the first of which is the output of the AND gate 166′, shown in FIG. 4*ao*, and the second of which is the SW S signal on the line 680. The output of the SPD circuit 157′ is the SET S signal on the line 291. The SPD circuit 158′ is equipped with two additional input signals; the first of which is the output of AND gate 168′, shown in FIG. 4*ao*, and the second of which is the SW H signal on the line 159′. The output of the SPD circuit 158′ is the SET H signal on the line 22′. A plurality of AND gates 170′ through 172′ have their outputs connected in common with the input to an inverter 173′. The output of the inverter 173′ is connected in common to a pair of AND gates 174′ and 175′. The outputs of the AND gates 174′ and 175′ are connected to an inverter 176′. The AND gate 170′ has two input signals; the first of which is from an inverter 177′ which has as its input the protect location signal on the line 975 and the second of which is the output of the AND gate 178′ shown in FIG. 4*ao*. The AND gate 171′ has two input signals; the first of which is the clock off signal on the line 169 and the second of which is the SW R signal on the line 679. The AND gate 172′ is equipped with two input signals; the first of which is the SELECT MEMORY signal from FIG. 64 and the second of which is the MANUAL STORE signal on the line 682. The AND gate 175′ is equipped with an additional input signal from the D time line 162. The AND gate 174′ is equipped with an additional input signal from the MANUAL STORE line 682. The output of the inverter circuit 173′ is also the CPR Z DEST on the line 290. The OR gate 176′ is equipped with two additional input signals; the first of which is the MANUAL RESET signal on the line 671 and the second of which is the output of an AND gate 180′. The AND gate 180′ is equipped with two input signals; the first of which is the STG to R signal on the line 429 and the second of which is the MEMORY STROBE SET signal. The output of the inverter circuit 176′ is the SET R signal on the line 288. An AND gate 182 is equipped with two input signals; the first of which is the output of the AND gate 184′, shown on FIG. 4*ao*, and the second of which is the D TIME signal on the line 162. The output of the AND gate 182 is the $QM=Z$ signal on the line 2343. Three additional lines have been added to FIG. 4*ar*; the SET TE (FP) REG signal on a line 187′ from an AND gate 183′ shown in FIG. 4*ao*, the SET JE (FO) REG signal on a line 189′ from an AND gate 188′ shown in FIG. 4*ao* and SET TA REG signal on a line 185′ from the AND gate 186′ shown in FIG. 4*ao*.

A plurality of AND gates 190′ through 204′ are shown in FIG. 4*as*. These AND gates receive no CLOCK ON $\overline{S8B}$ on line 244 as their counterparts receive in the aforementioned application A. The output of the AND gate 190′ is applied to an OR gate 206′. The OR gate 206′ receives a second input signal from the AND gate 192′. The output of the OR gate 206′ is the $S5=(ZL=0)$ signal on the line 226. The output of the AND gate 191′ is applied to an OR gate 208′, which OR gate has as a second input signal the output signal from the AND gate 192′. The output signal of the OR gate 208′ is the $S4=(ZH=0)$ signal on the line 225. The output of the AND gate 193′ is the $S4—S5=00$ signal on the line 227. The output of the AND gate 194′ is the $S1=T\ REG$ signal on the line 232. The output of the AND gate 195′ is the $S0=0$ signal on the line 221. The output of the AND gate 196′ is the $S0=1$ signal on the line 222. The output of the AND gate 197′ is the $S2=0$ signal on the line 224. The output of the AND gate 198′ is the $S2=(ANS=0)$ signal on the line 223. The output of the AND gate 199′ is the $S6=0$ signal on the line 228. The output of the AND gate 200′ is the $S6=1$ signal on the line 229. The output of the AND gate 201′ is the $S7=0$ signal on the line 230. The output of the AND gate 202′ is the $S7=1$ signal on the line 231. The output of the AND gate 203′ is the $PB=K$ signal on the line 581′. The output of the AND gate 204′ is the $PA=K$ signal on the line 582.

Figure 4T:
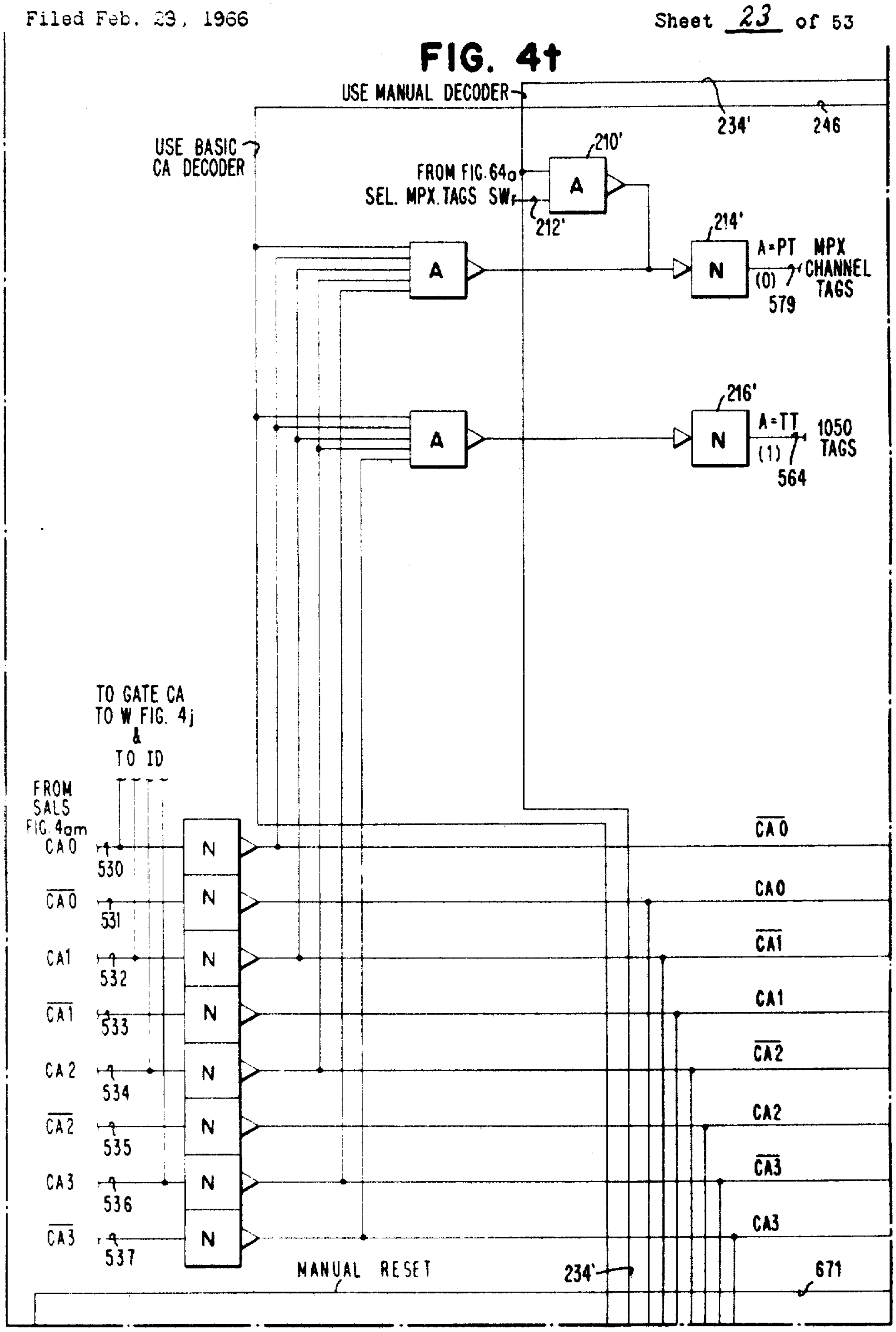

The line 169 in FIG. 4*t* is now identified as line 234′ and labeled USE MANUAL DECODER. The line 246 in FIG. 4*t* is now labeled USE BASIC CA DECODER. The input to an AND gate 210′ on a line 212′ is labeled SELECT MULTIPLEX TAGS SWITCH signal. The output of an inverter 214' is the $A=PT$ signal (Multiplex Channel Tags) on a line 579. The output of an inverter 216' is the $A=TT$ signal on th line 564. The CA signals from the SALS in FIG. 4*am* are now applied to both the ID and to the gate CA to W circuit in FIG. 4*j*.

Referring to FIG. 4*at*, an inverter 218' receives as its input signal a CLOCK ON signal on the line 167. The output of the inverter 218' is now connected to a plurality of AND gates 220', 222' and 224'. The AND gate 222' has as its second input the SX SHARE HOLD signal from FIG. 47. The output of the AND gate 222' is applied to an AND gate 226'. The AND gate START 226' has as its second input signal the MANUAL DISPLAY OR STORE signal on the line 685. The output of the AND gate 226' is applied to an OR gate 228'. The OR gate 228' has as its second input the output of the AND gate 224'. The AND gate 224' has as its additional input signals the output of the inverters 230' and 232'. The inverter 230' has as its input the MANUAL RESET signal on the line 671. The output of the OR circuit 228' is applied to the AND gate 220' by an inverter 233'. The output of the AND gate 220' is the USE MANUAL DECODER signal on a line 234'. An AND gate 236' has two input signals; one of which is the not ANY PRIORITY PULSE on the line 345 and the other of which is the AA SAL BIT signal on the line 238'. The line 238' is also connected to an inverter 240'. The output of the AND gate 236' is the USE ALTERNATE CA DECODER signal on the line 245. The output of the inverter 240' is the USE BASIC CA DECODER signal on the line 246.

Figure 4U:
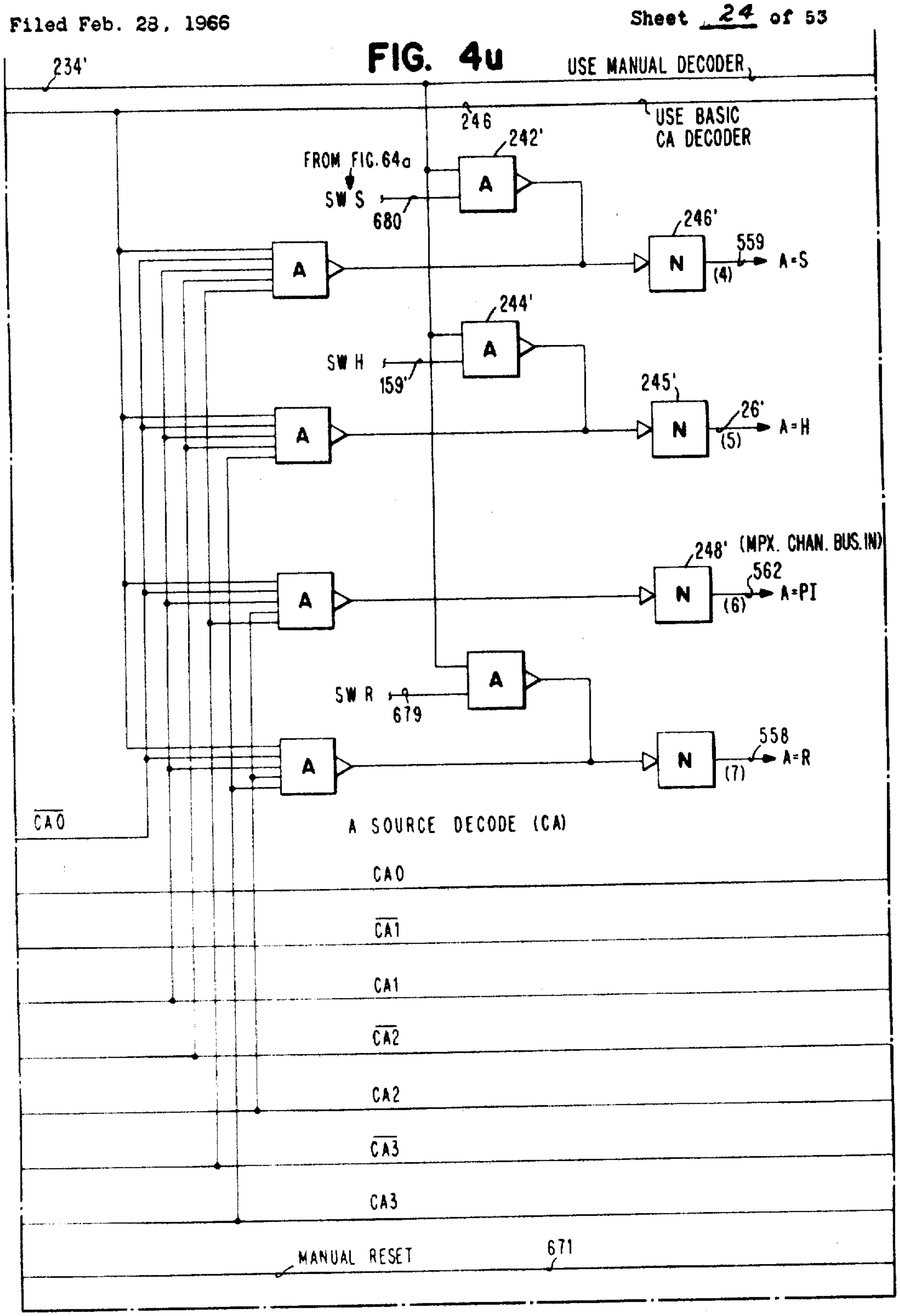

Referring to FIG. 4*u*, a SW S signal is applied to an AND gate 242' on the line 680. A SW H signal on the line 159' is applied to an AND gate 244'. The output of an inverter 246' is the $A=S$ signal on the line 559. The output of the inverter 245' is the $A=H$ signal on the line 26'. The output of an inverter 248' is the $A=PI$ signal on the line 562.

Referring to FIG. 4*au*, an AND gate 250 receives two input signals; the first of which is the USE MANUAL DECODER signal on the line 234' and the other of which is the $SW=F$ signal. The output of the AND gate 250' is applied to an inverter 252'. The output of the inverter 252' is the $A=F$ signal on the line 561. The output of an inverter 254' is the SW FG signal on a line 256'. The output of an inverter 258' is the $A=MC$ signal on the line 580. The output of an inverter 260' is the $A=QM$ signal on the line 563. The output of the inverter 262' is the $Z=FI$ signal on the line 2340. The output of an inverter 264' is the $A=TI$ signal on the line 266'.

Figure 4V:
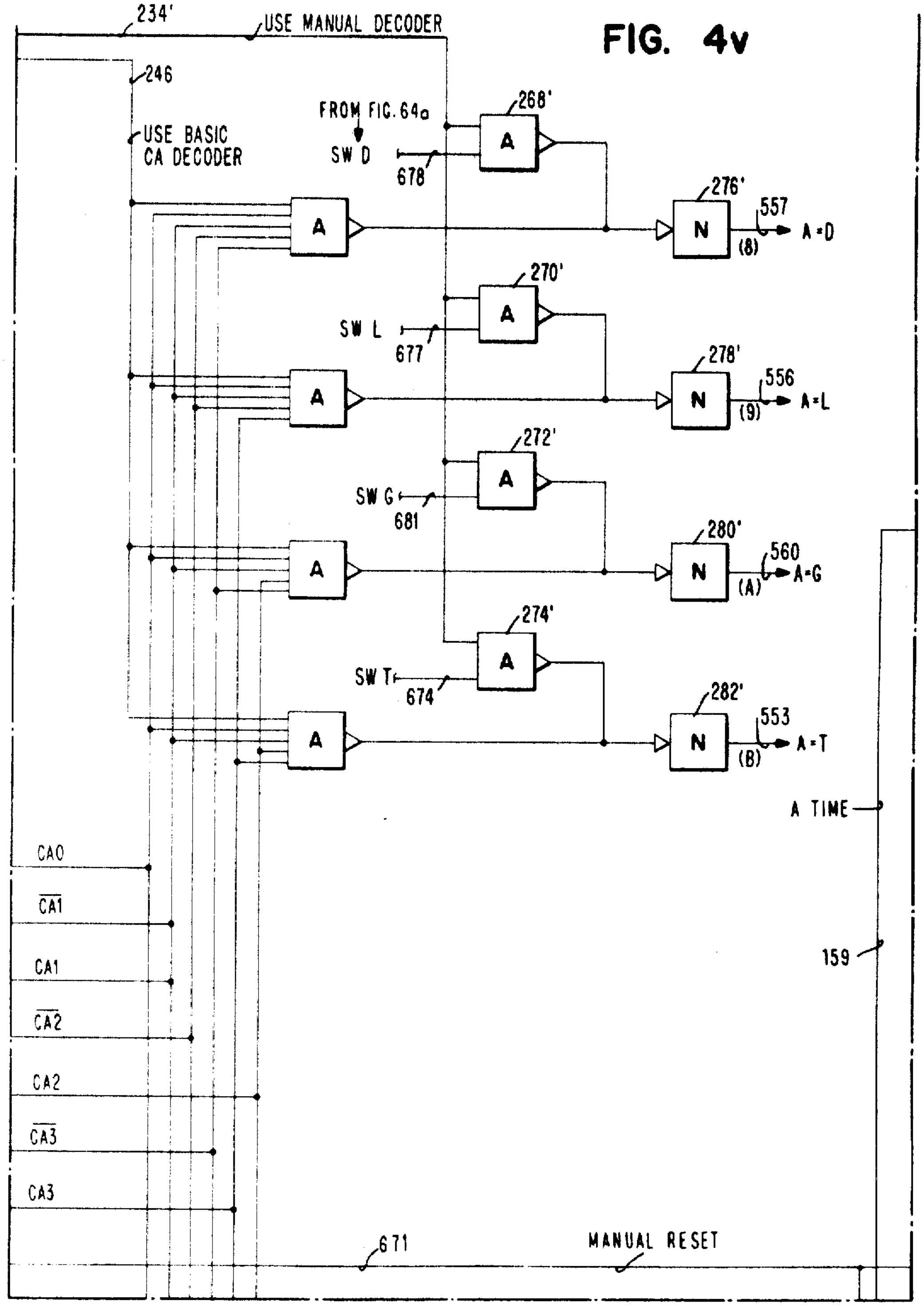
Figure 4W:
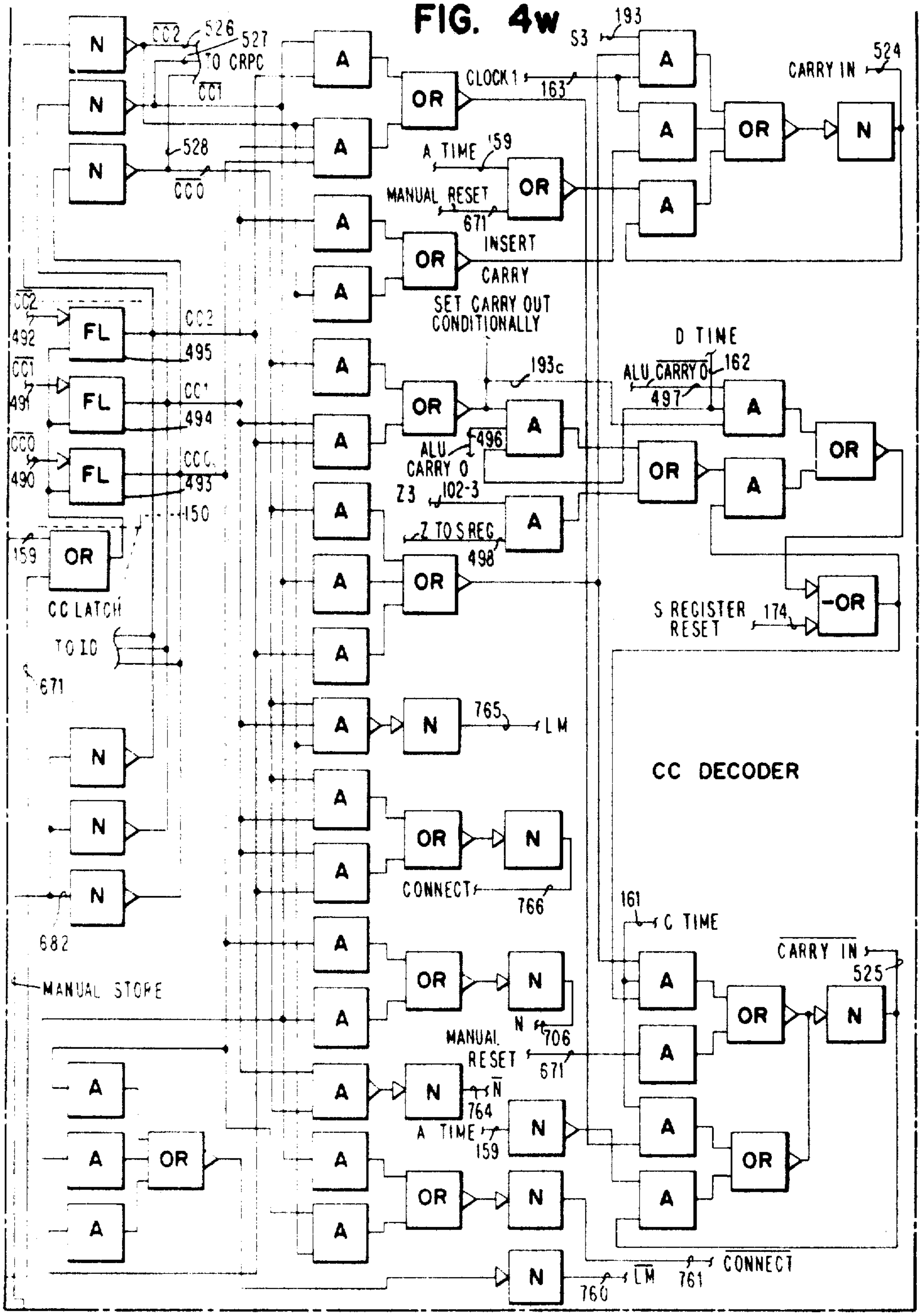
Figure 4X:
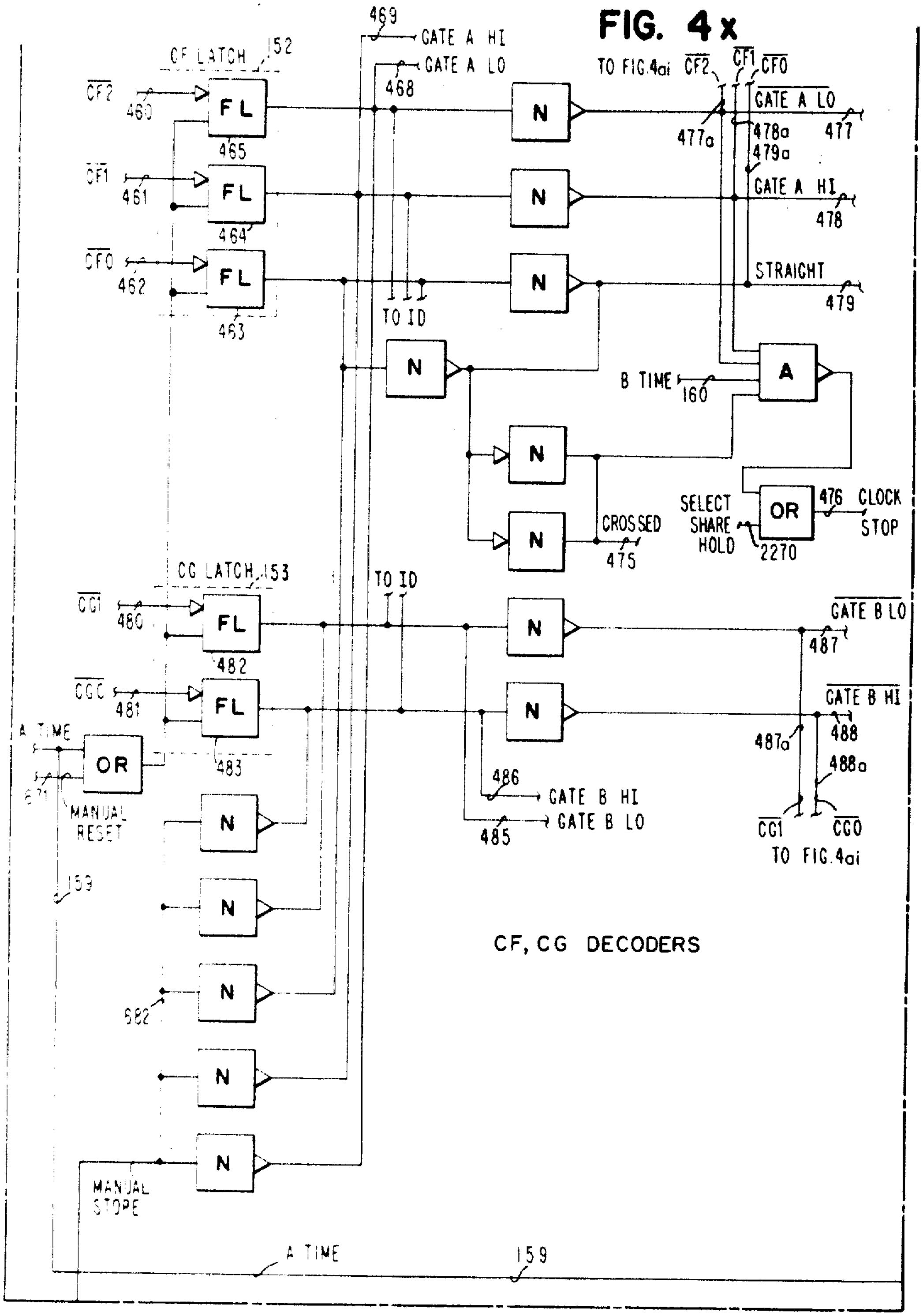

Referring to FIG. 4*v*, an AND gate 268' receives as its first input signal the USE MANUAL DECODER signal on the line 234', and as its second input signal the $SW=D$ signal on the line 678. The AND gate 270' is equipped with two input signals; the first of which is the USE MANUAL DECODER signal on line 234', and the second of which is the SW L signal on the line 677. An AND gate 272' is equipped with two input signals; the first of which is the USE MANUAL DECODER signal on line 234', and the second of which is the SW G signal on the line 681. The output of the AND gate 272' is applied as an input to an inverter 280'. An AND gate 274' has two input signals; the first of which is the USE MANUAL DECODER signal on the line 234', and the second of which is the SW T signal on the line 674. The output of the AND gate 274' is applied as an input to an inverter 282'. The output of the inverter 276' is the $A=D$ signal on line 557. The output of the inverter 278' is the $A=L$ signal on the line 556. The output of the inverter 280' is the $A=G$ signal on the line 560. The output of the inverter 282' is the $A=T$ signal on the line 553.

Referring to FIG. 4*av*, a plurality of AND gates 283' through 286' has been added to the figure. Each of these AND gates has as one of its input signals the USE MANUAL DECODER signal on the line 234'. The second input signal to the AND gate 283' is the SW V signal on the line 676. The second input signal to the AND gate 284' is the SW U signal on the line 675. The second input to the AND gate 285' is the SW J signal on the line 673. The second input to the AND gate 286' is the SW I signal on the line 672. The outputs of the AND gates 283' through 286' are connected to an equal plurality of inverters 287' through 290' respectively. The output of the inverter 287' is the $A=V$ signal on the line 555. The output of the inverter 288' is the $PA=U$ signal on the line 554. The output of the inverter 289' is the $PB=J$ signal on the line 552. The output of the inverter 290' is the $A=I$ signal on the line 551.

Figure 4Y:
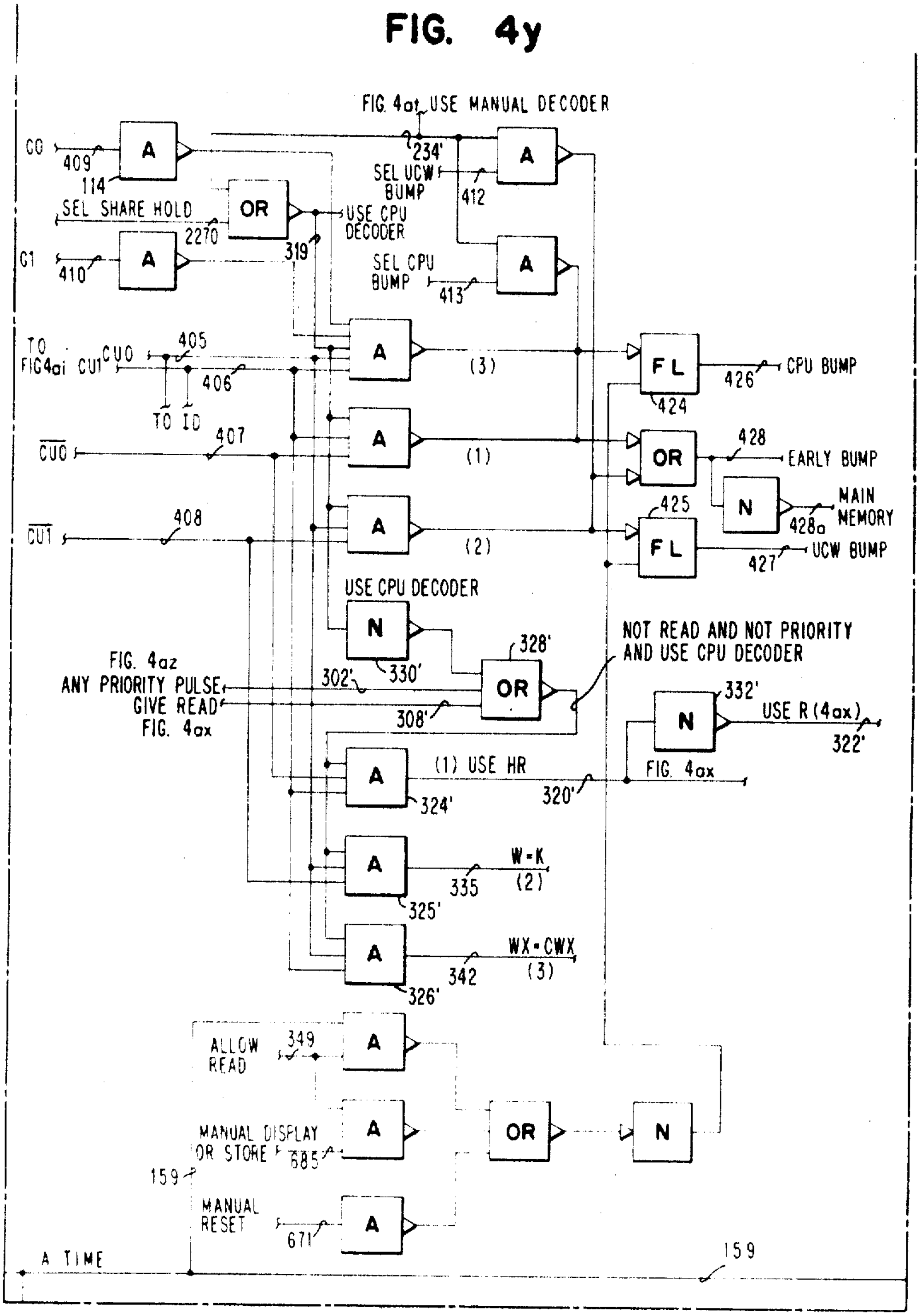

Referring to FIG. 4*ax*, an inverter 292' has as its output the $MN=IJ$ signal on the line 336. An inverter 294' has as its output the $MN=UV$ signal on the line 337. An inverter 296' has as its output the $MN=T$ signal on the line 338. An inverter 298' has as its output the $MN=K$ signal on the line 339. An OR gate 300' has three input signals; the first of which is the ANY PRIORITY PULSE signal on a line 302' from FIG. 4*az*, the second of which is the output of an AND gate 304' and the third of which is the output of an AND gate 306'. The AND gate 304' has two input signals; one of which is the $\overline{CM1}$ signal, the other of which is the $\overline{CM0}$ signal. The AND gate 306' has two input signals; one of which is the $\overline{CM0}$ signal and the second of which is the $\overline{CM2}$ signal. The output of the OR gate 300' is the GIVE READ signal on a line 308'. An OR gate 310' has two input signals; the first of which is the CM0 signal and the second of which is the CM2 signal. The output of the OR gate 310' is applied to a pair of AND gates 312' and 314', shown in FIG. 4*ay*, and to a pair of AND gates 316' and 318' in FIG. 4*ax*. The AND gate 316' has as its second input the USE HR signal on a line 320' as shown in FIG. 4*y*. The AND gate 318' has as its second input signal the USE R signal on the line 322' as shown in FIG. 4*y*.

Referring to FIG. 4*y*, a plurality of AND gates 324', 325' and 326' receives a common input signal from an OR gate 328'. The AND gate 324' has a pair of additional input signals from the lines 406 and 407. The AND gate 325' has a pair of additional input signals; one of which is on the line 405, and the other of which is on the line 408. The AND gate 326' has a pair of additional input signals; one of which is on the line 405 and the second of which is on the line 406. The OR gate 328' has three input signals; the first of which is from an inverter 330', the second of which is the ANY PRIORITY PULSE signal on the line 302', shown on FIG. 4*az*, and the third of which is the GIVE READ signal on the line 308', shown on FIG. 4*ax*. The inverter 330' has as an input the USE CPU DECODER signal from the line 319. The output of the AND gate 324' is the USE HR signal on the line 320', which line is connected to an inverter 332', the output of the inverter 332' is the USE R signal on the line 322', the output of the AND gate 325' is the $W=K$ signal on the line 335. The output of the AND gate 326' is the $WX=CWX$ on the line 342.

Figure 4Z:
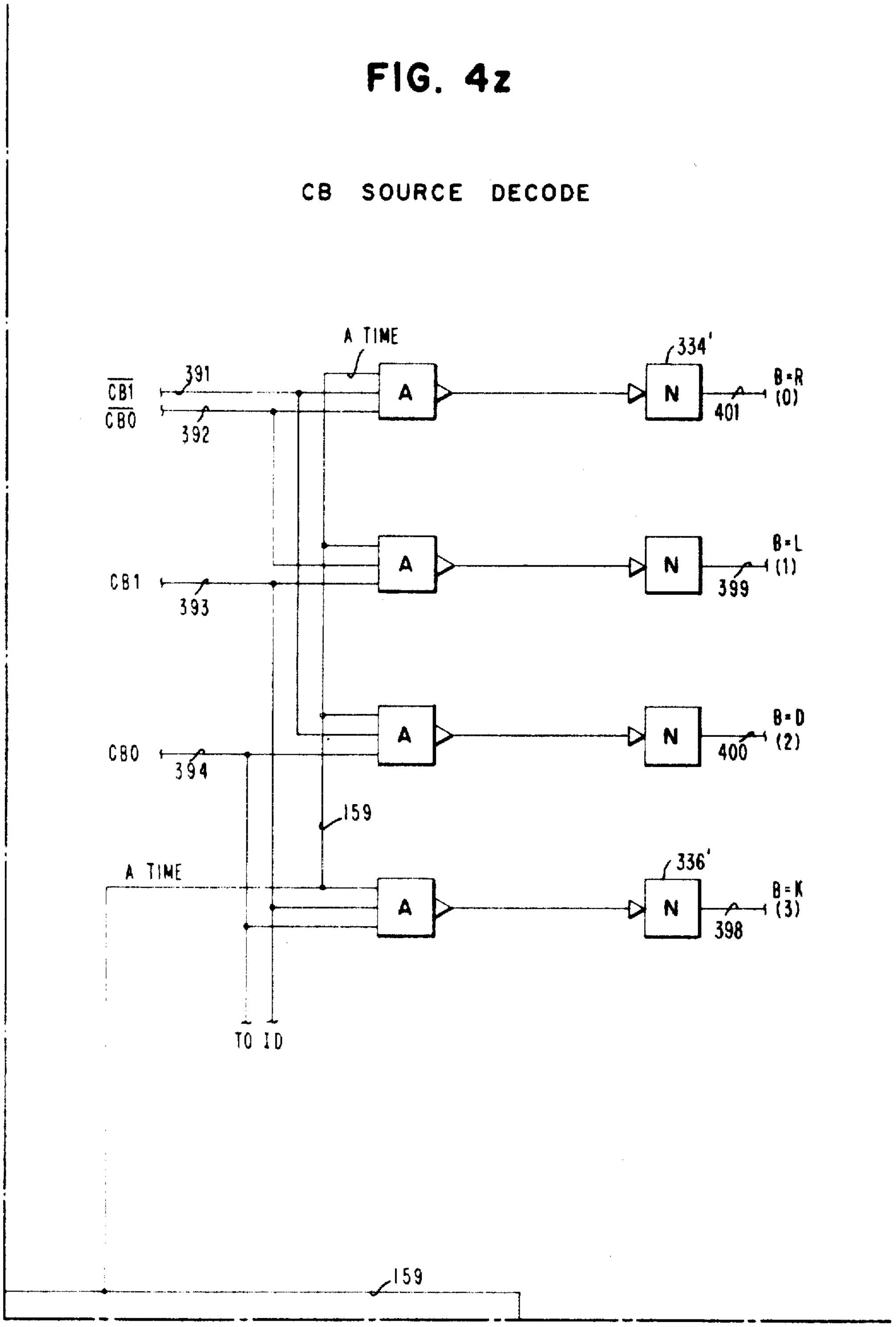
Figure 4A:
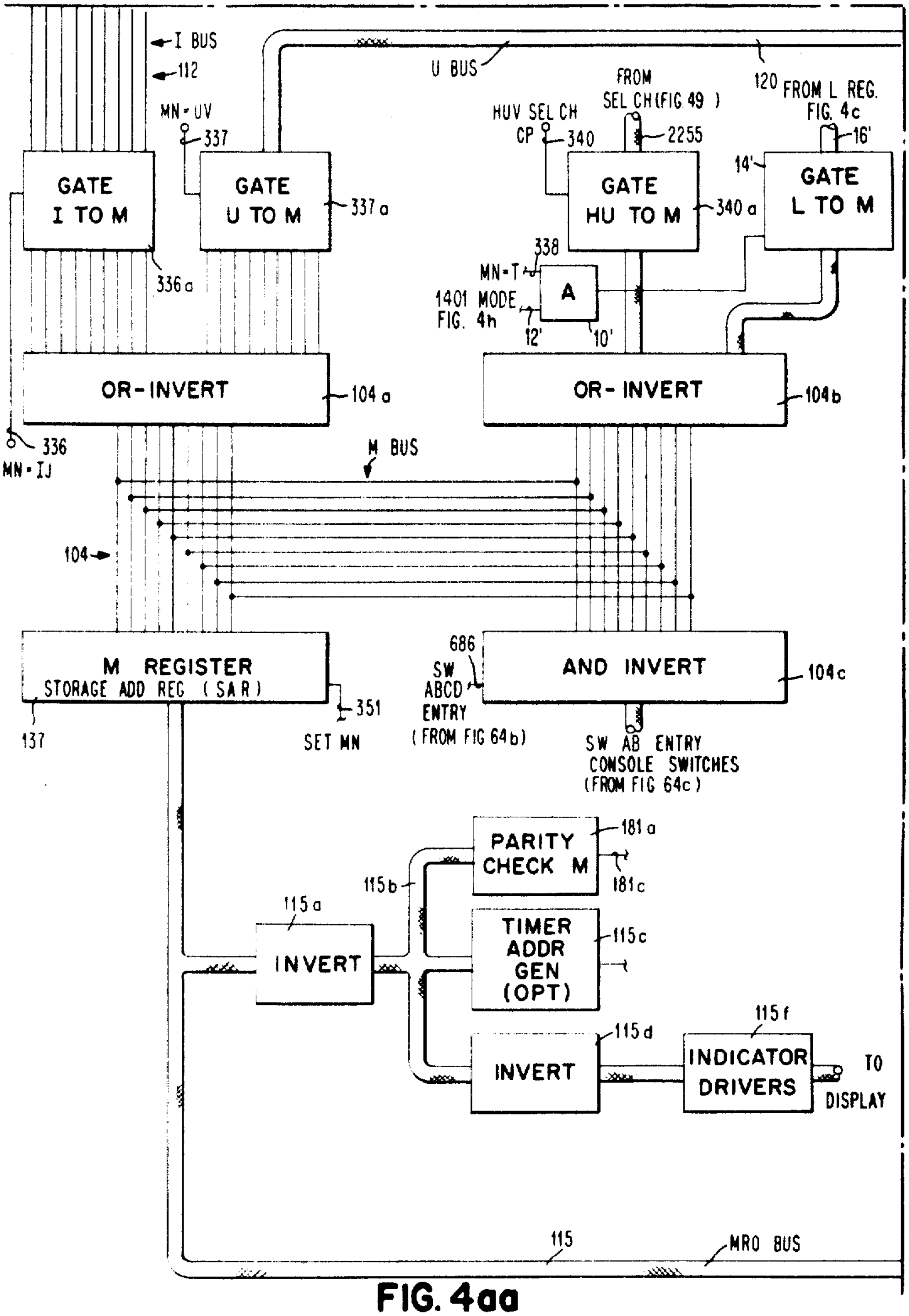
Figure 4A:
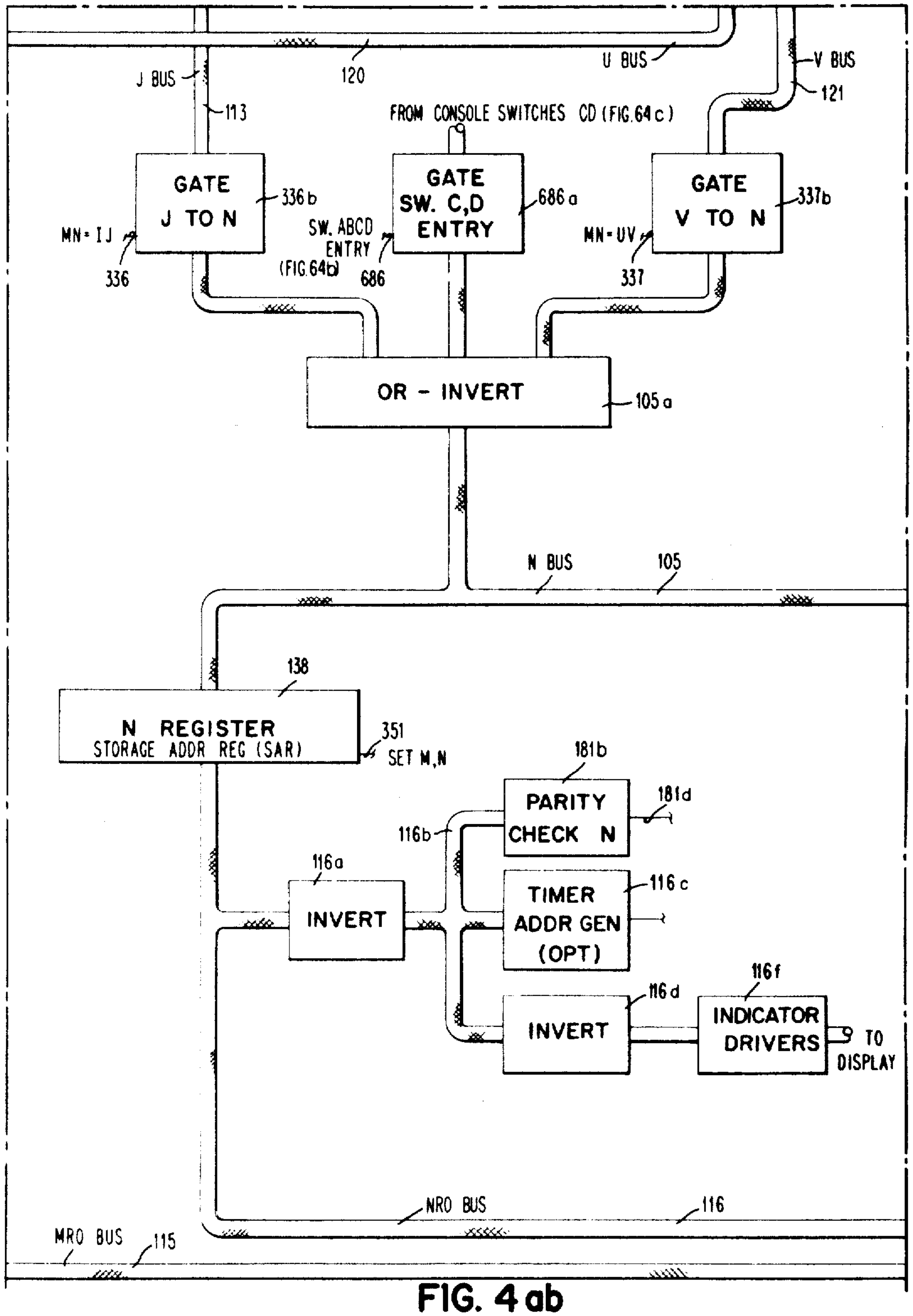
Figure 4A:
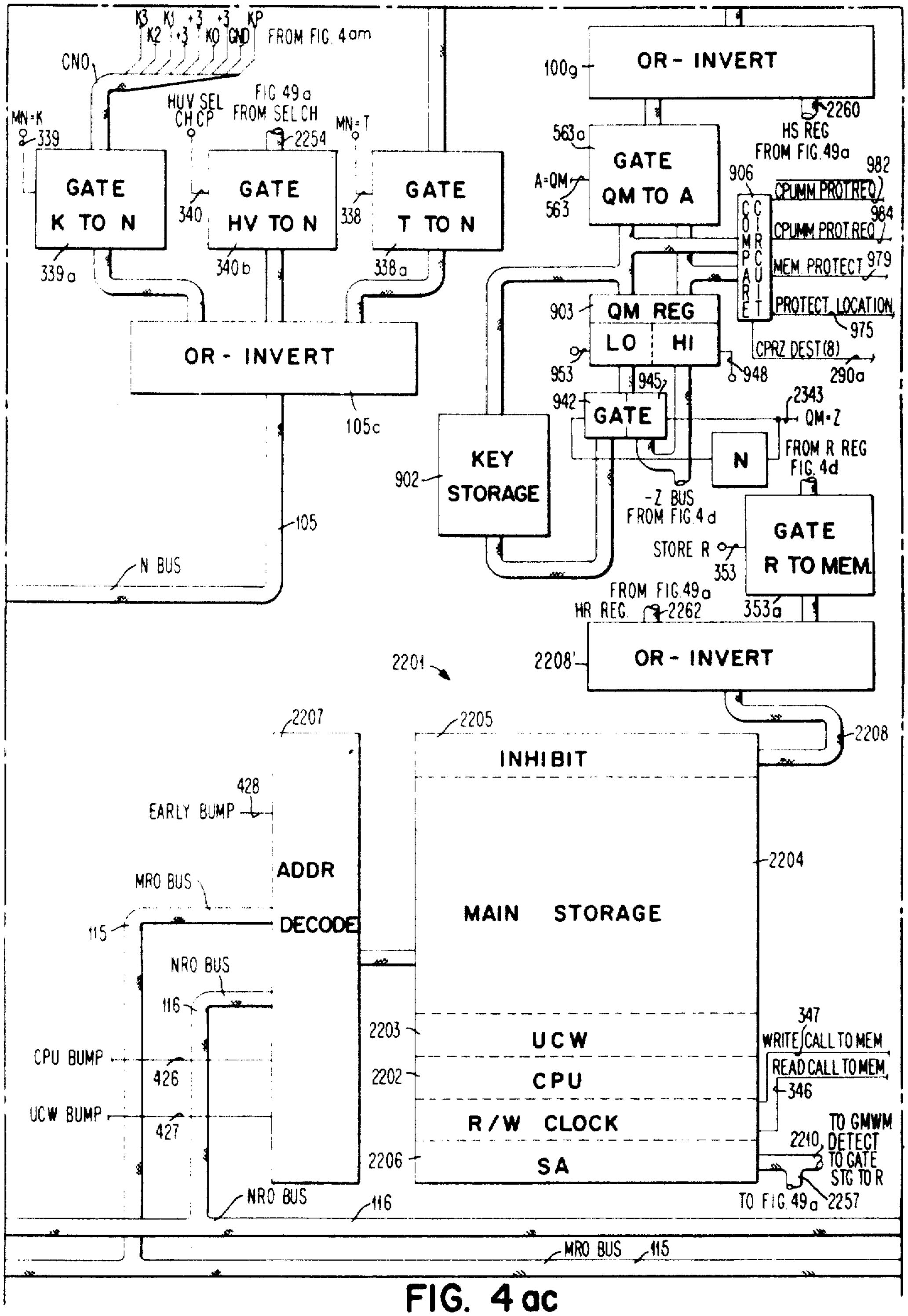
Figure 4A:
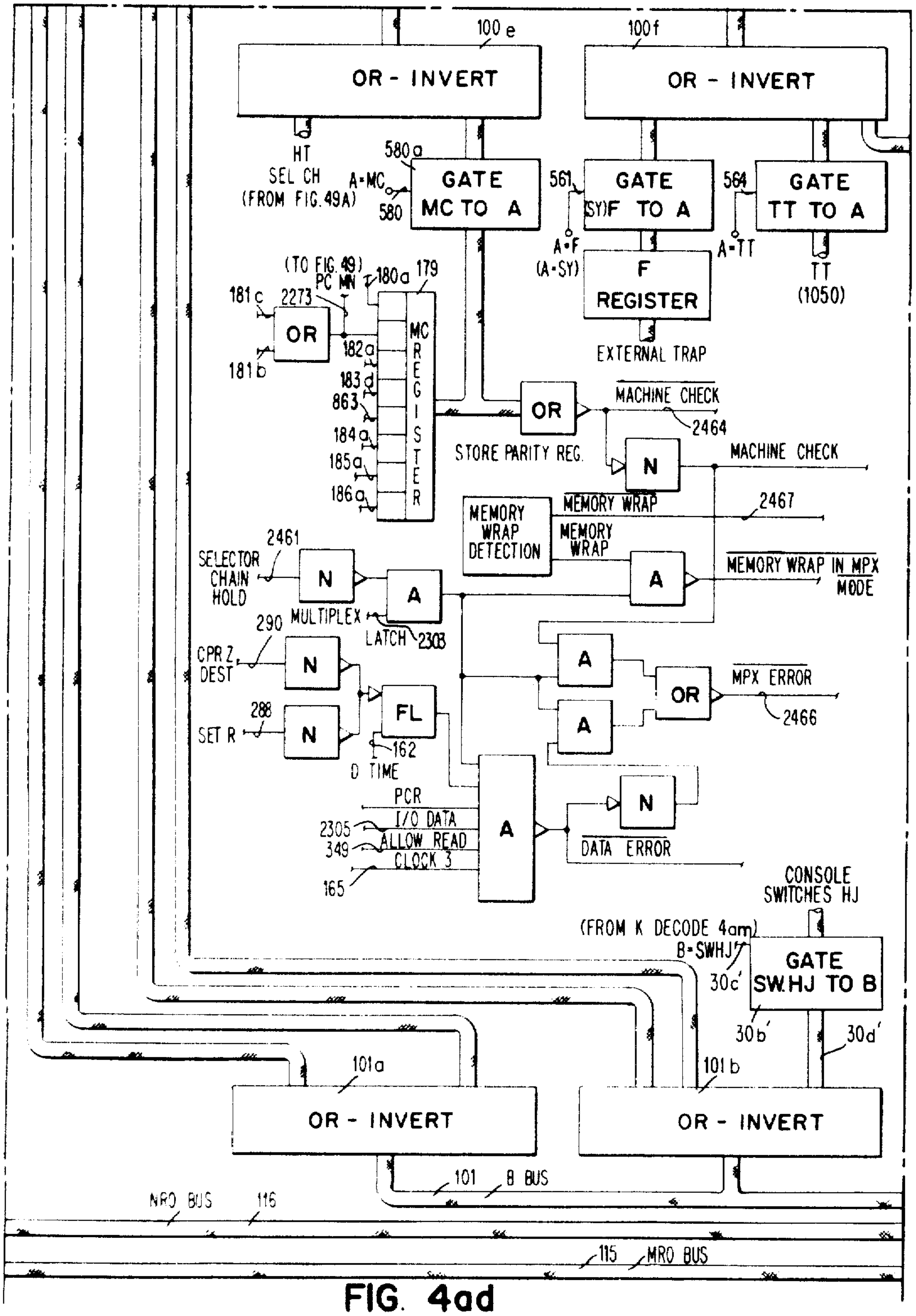
Figure 4A:
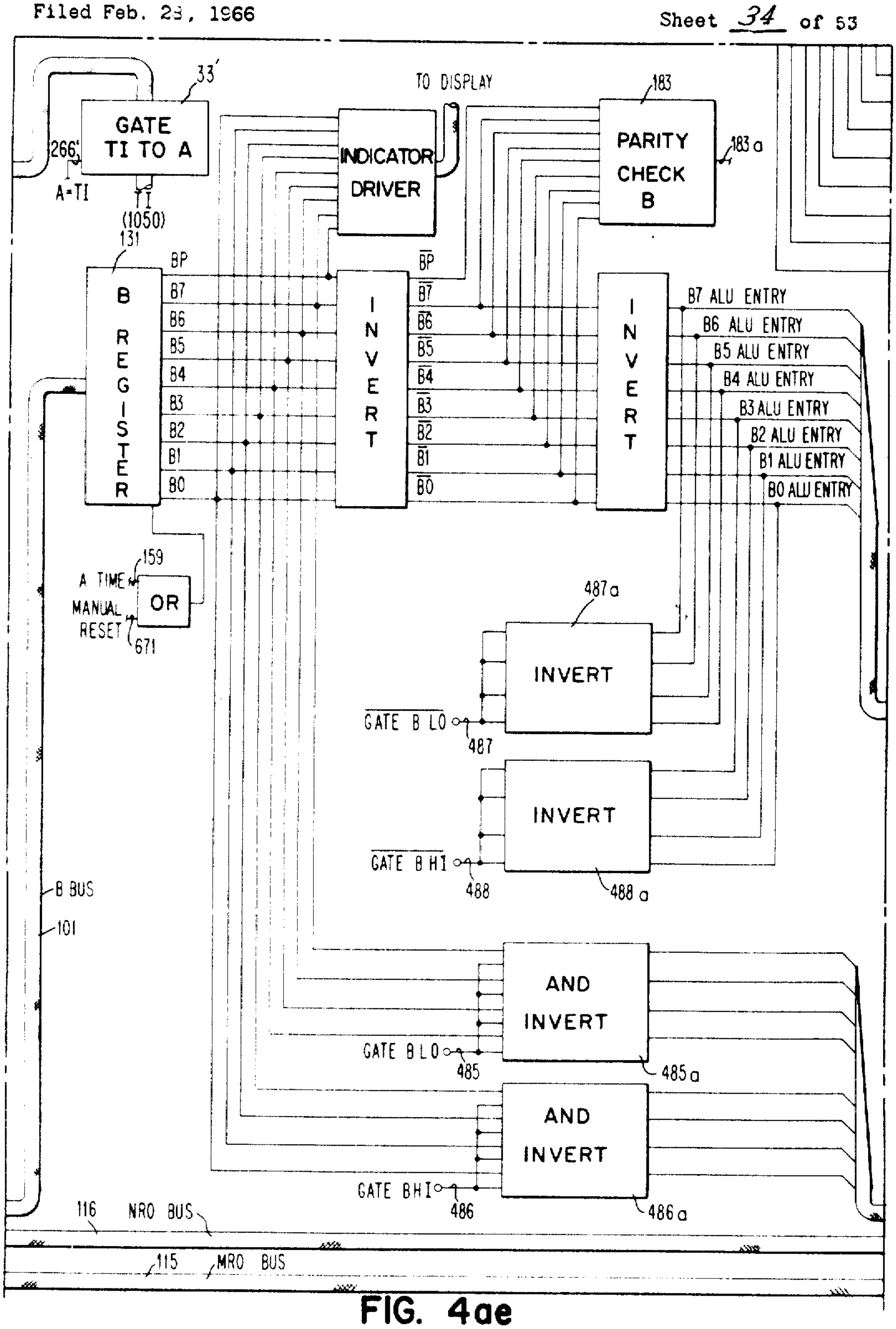
Figure 4A:
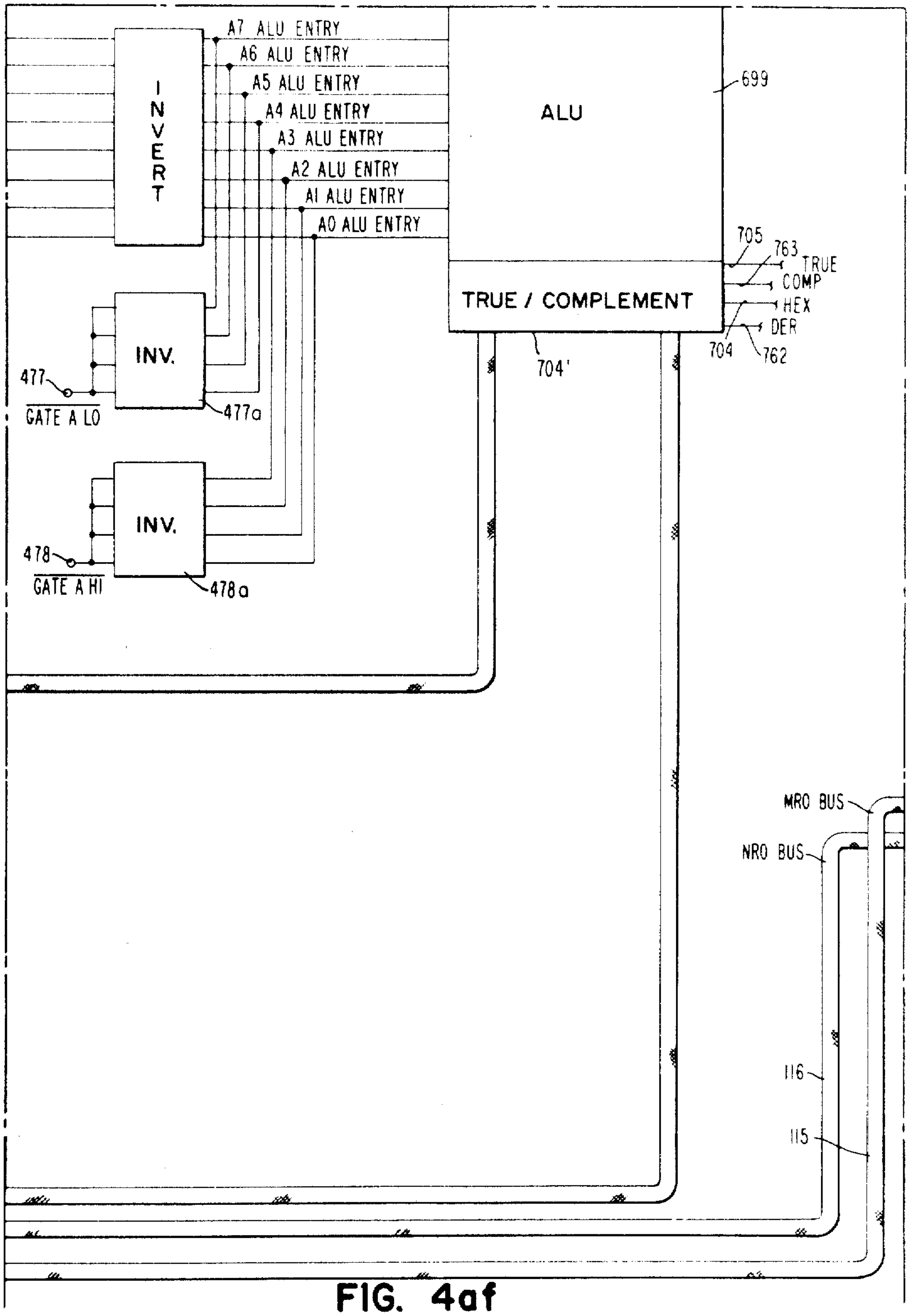
Figure 4A:
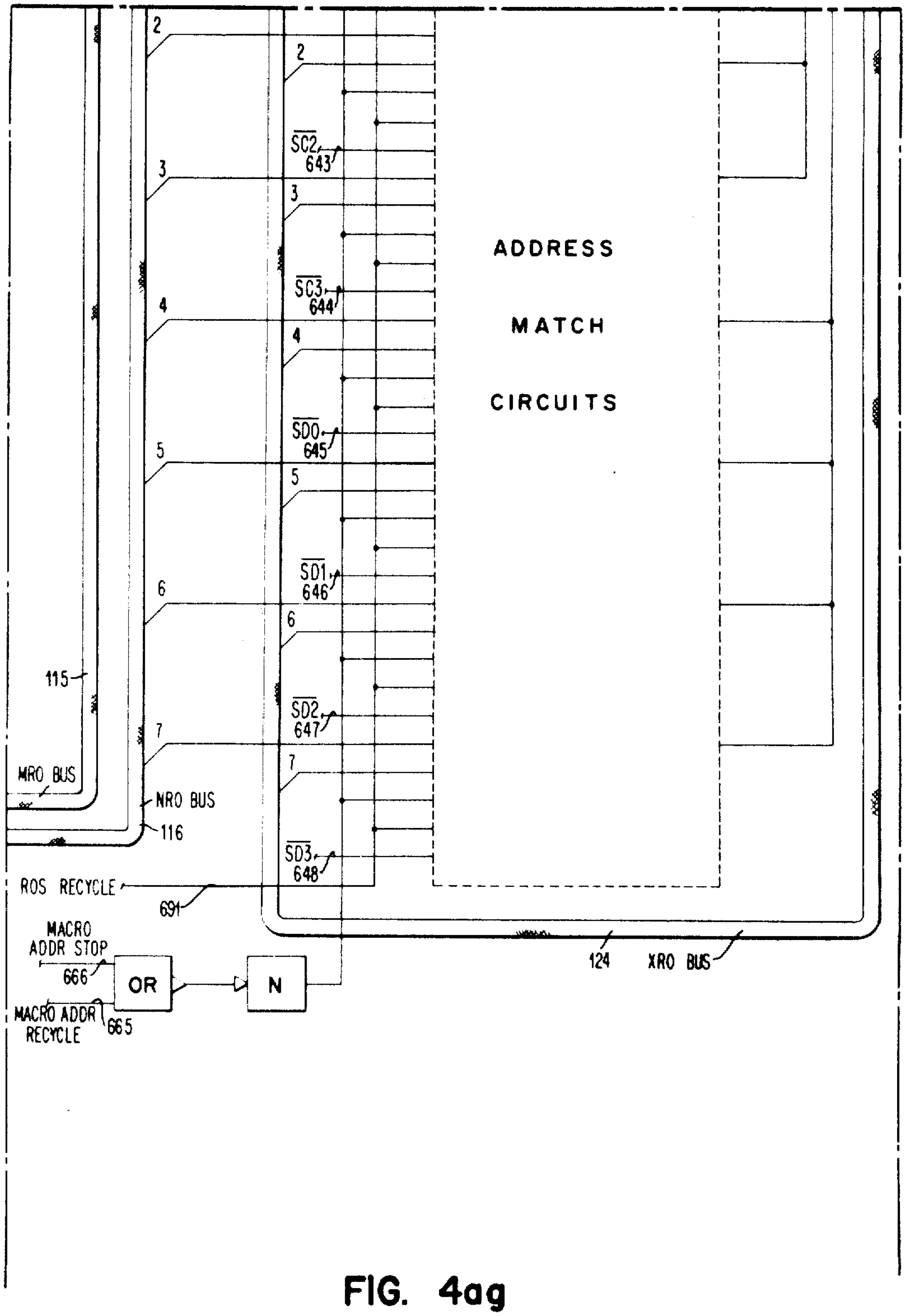
Figure 4A:
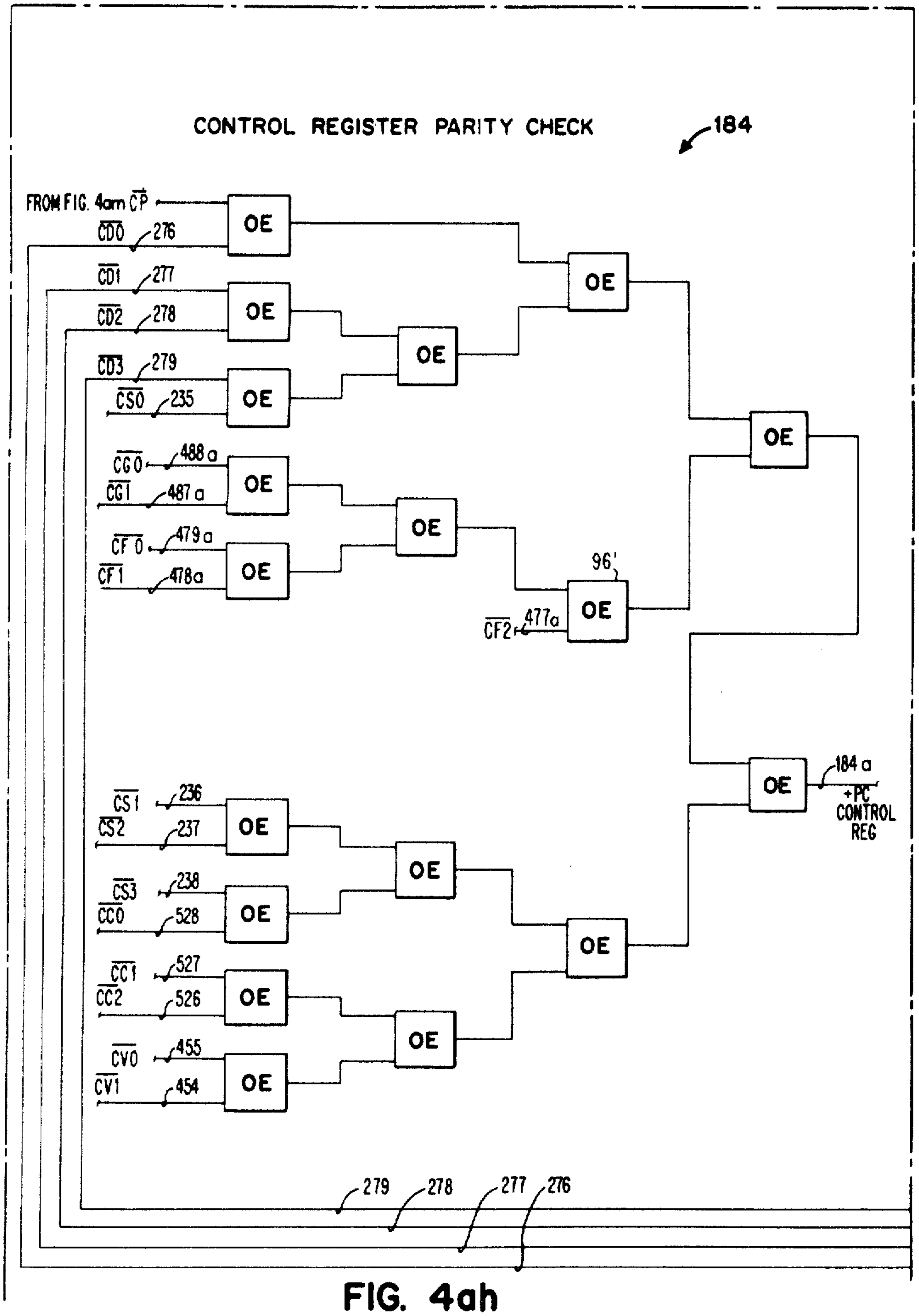
Figure 4A:
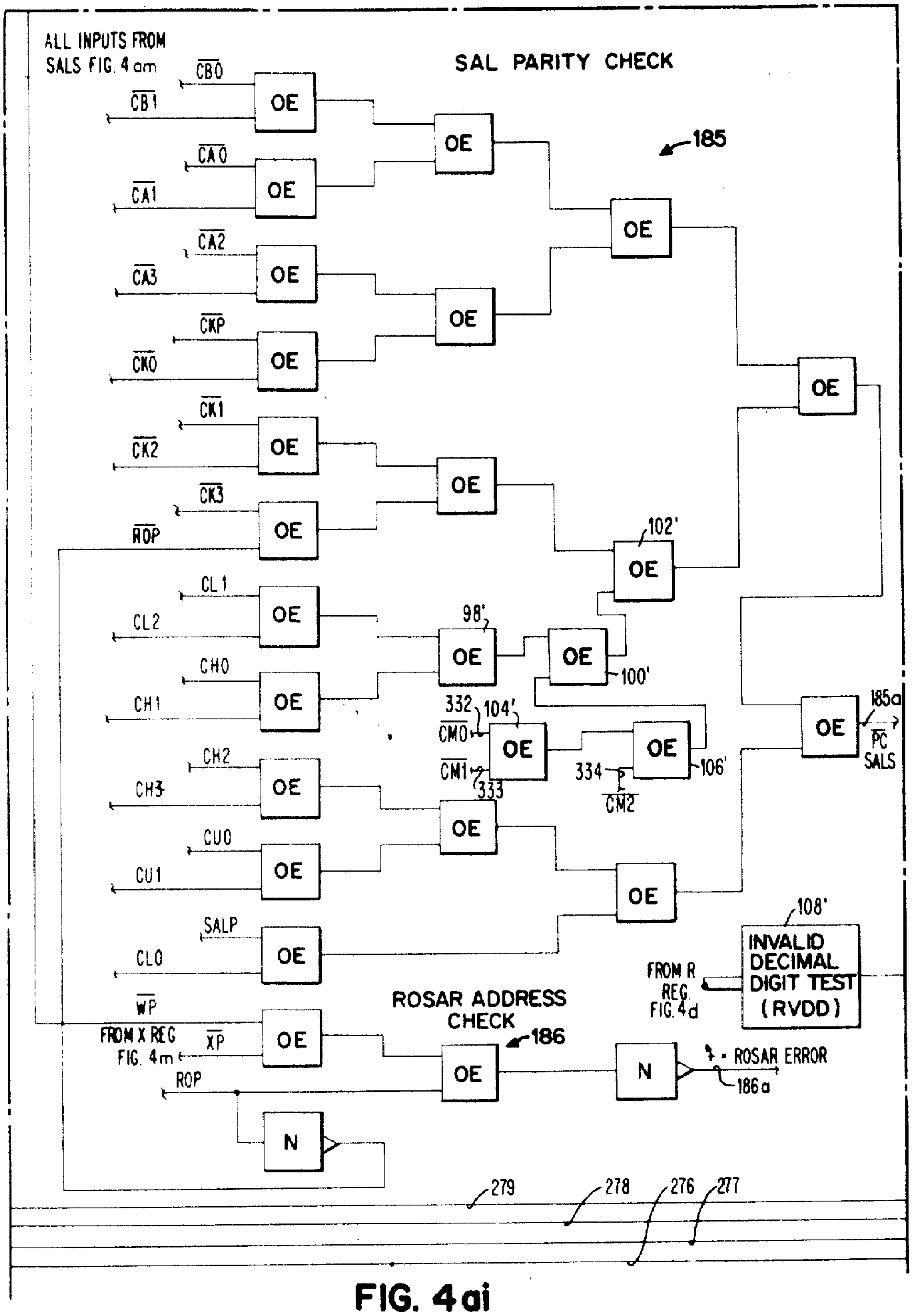
Figure 4A:
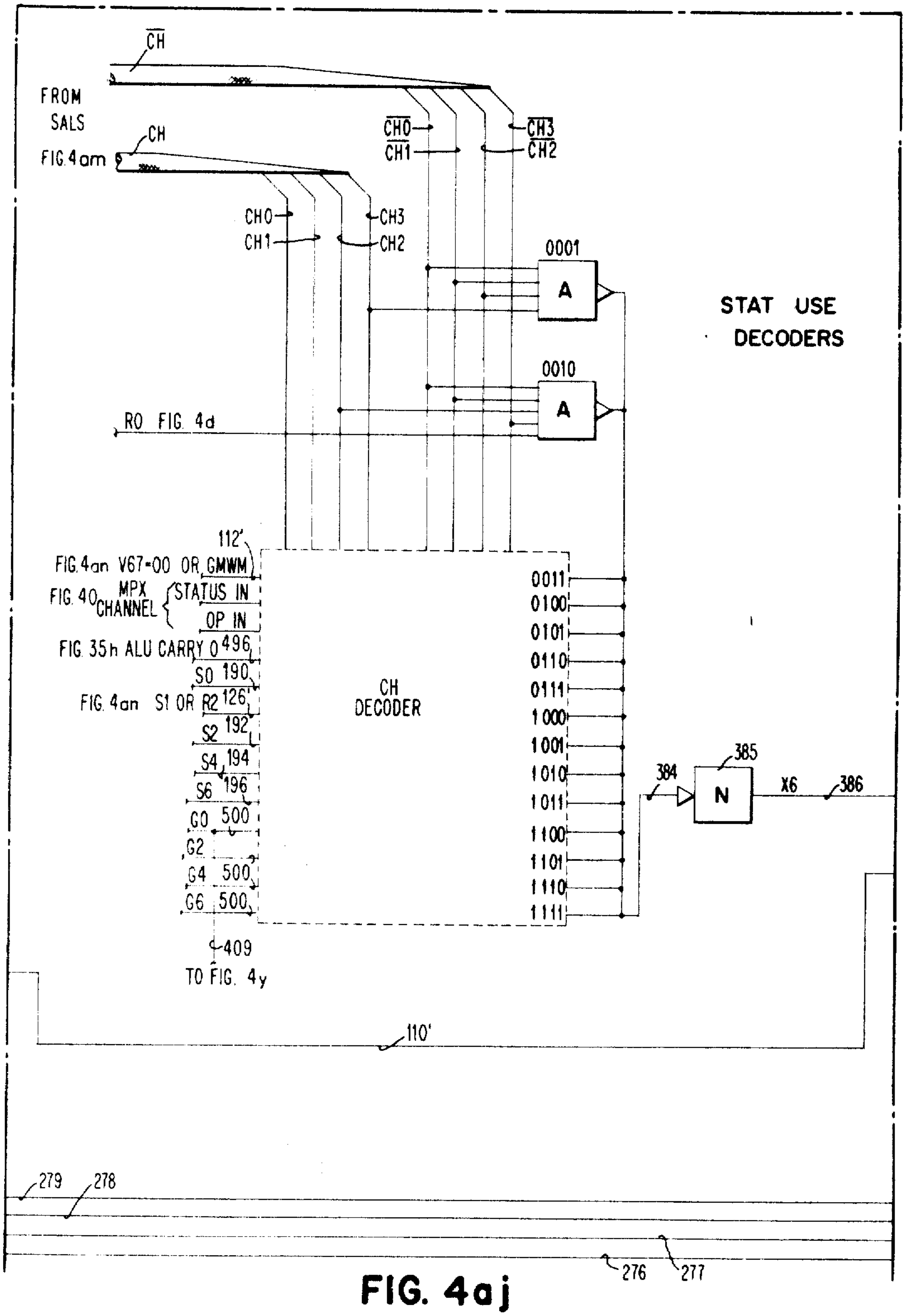
Figure 4A:
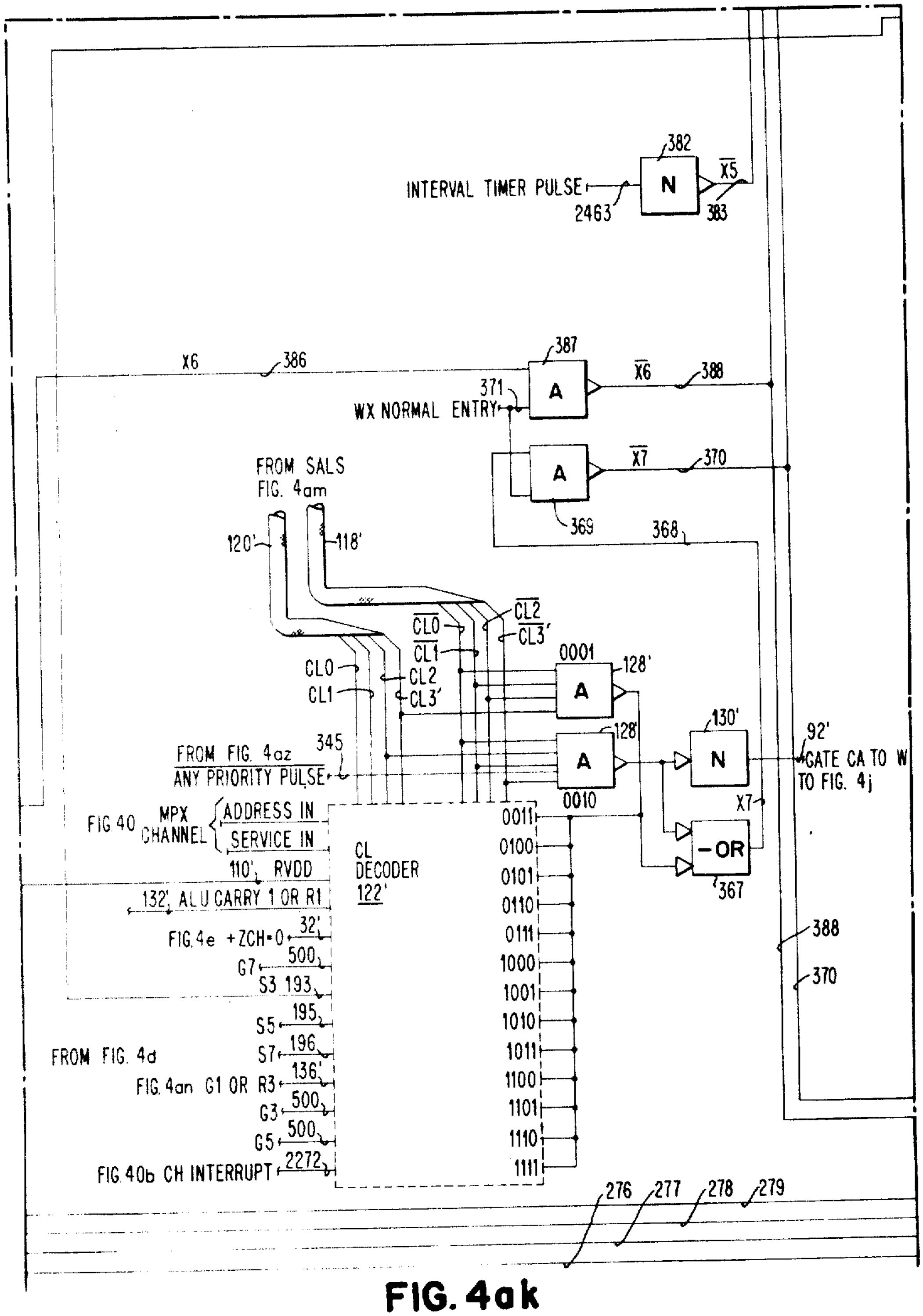
Figure 4A:
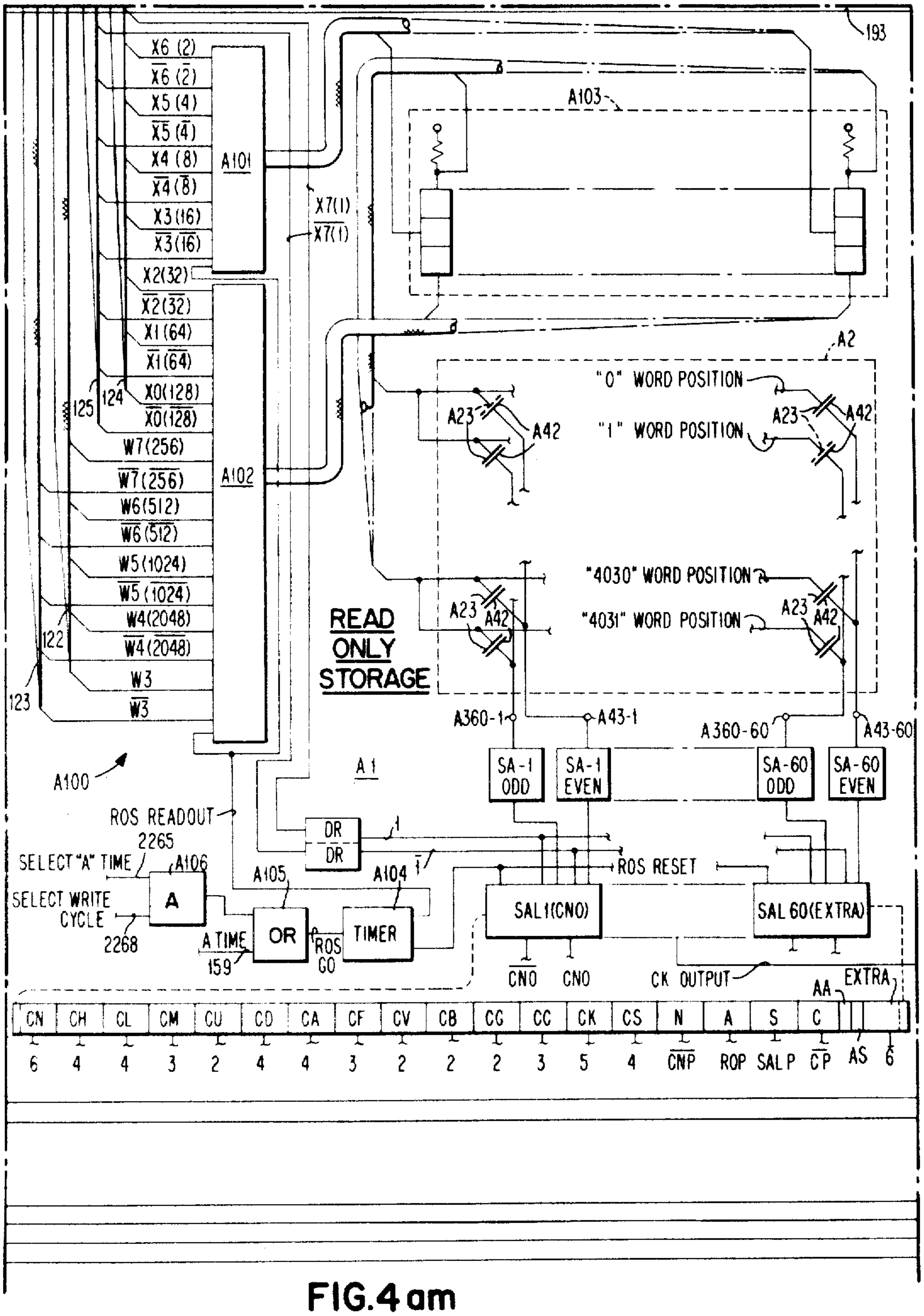
Figure 4A:
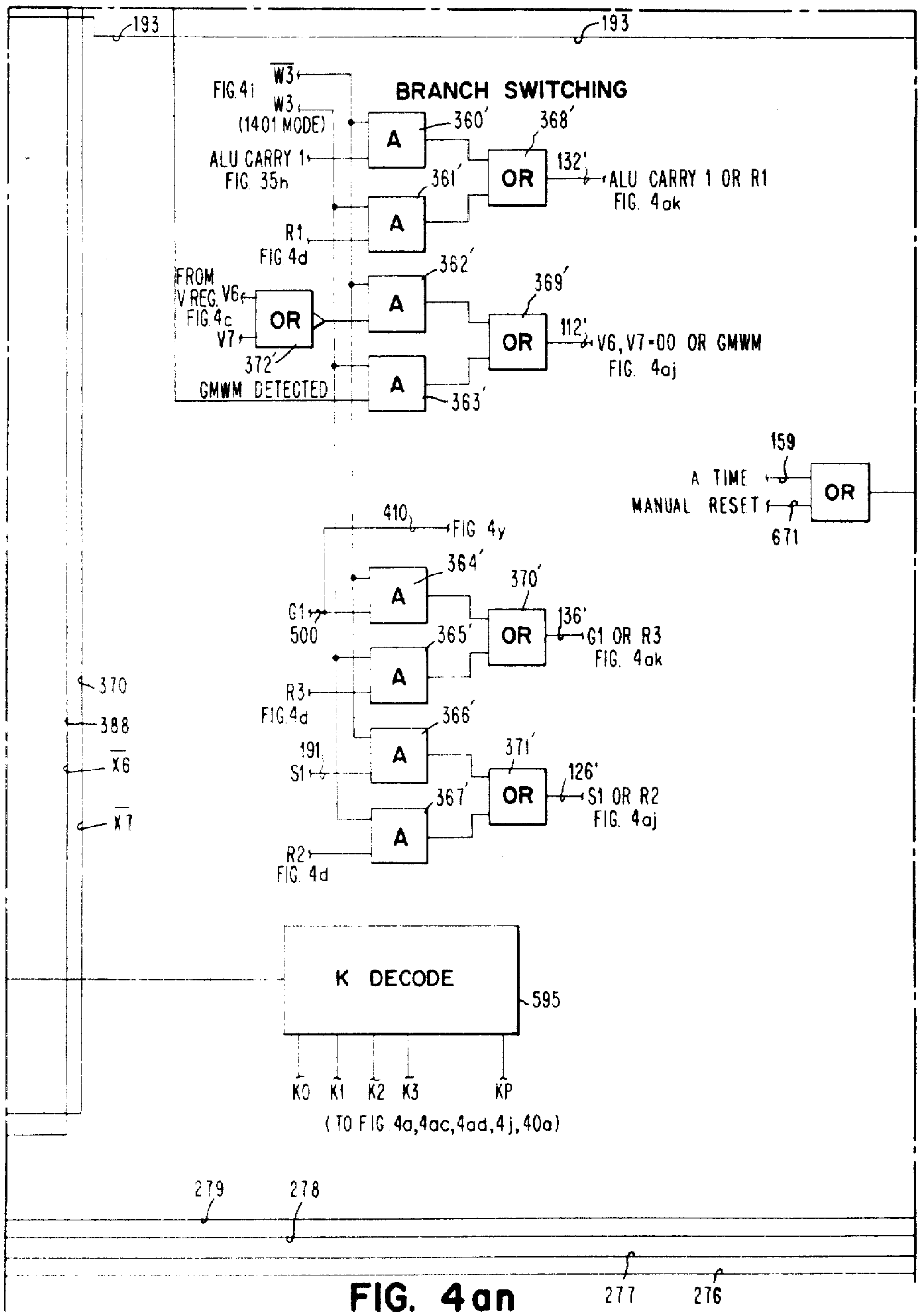
Figure 4A:
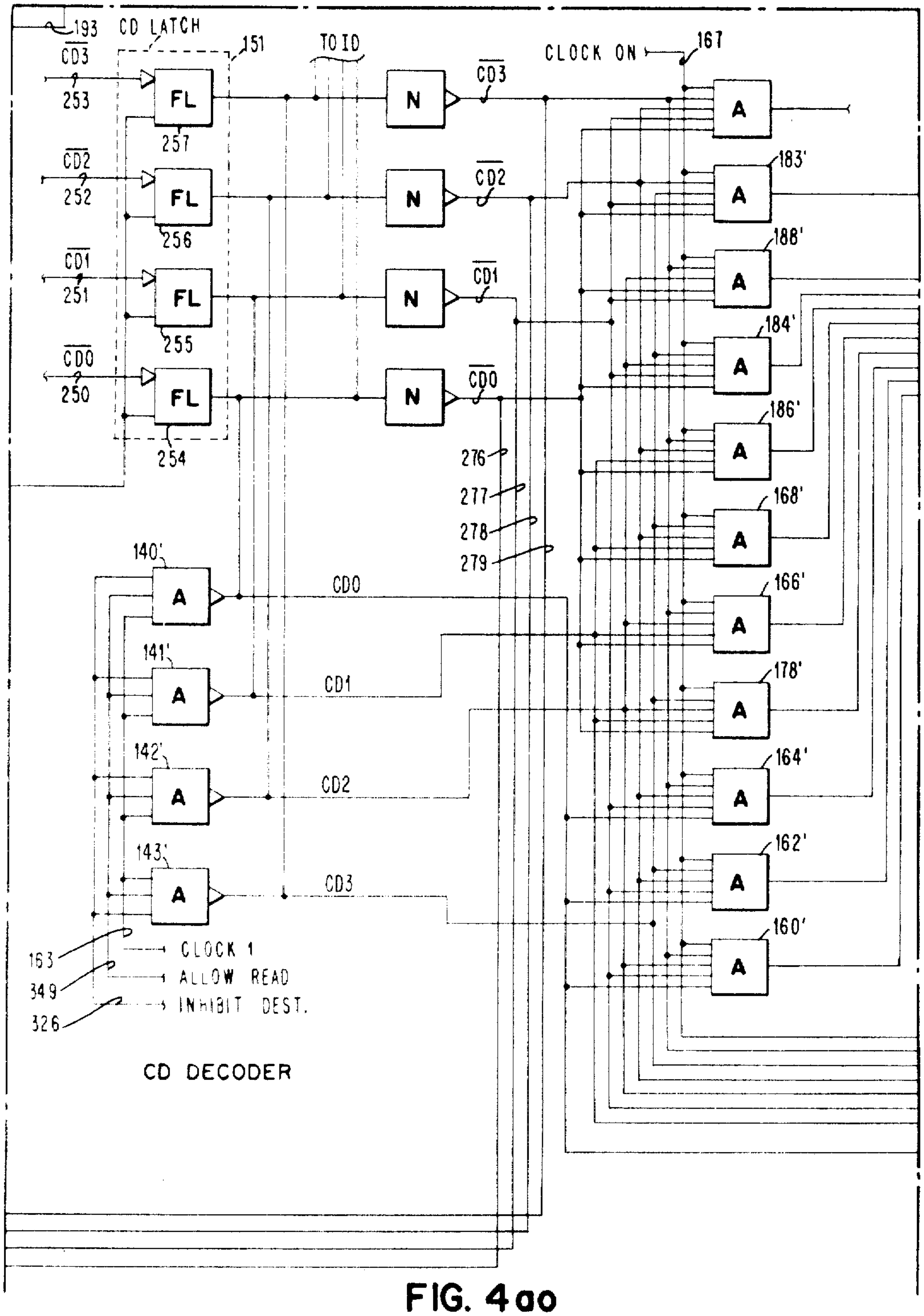
Figure 4A:
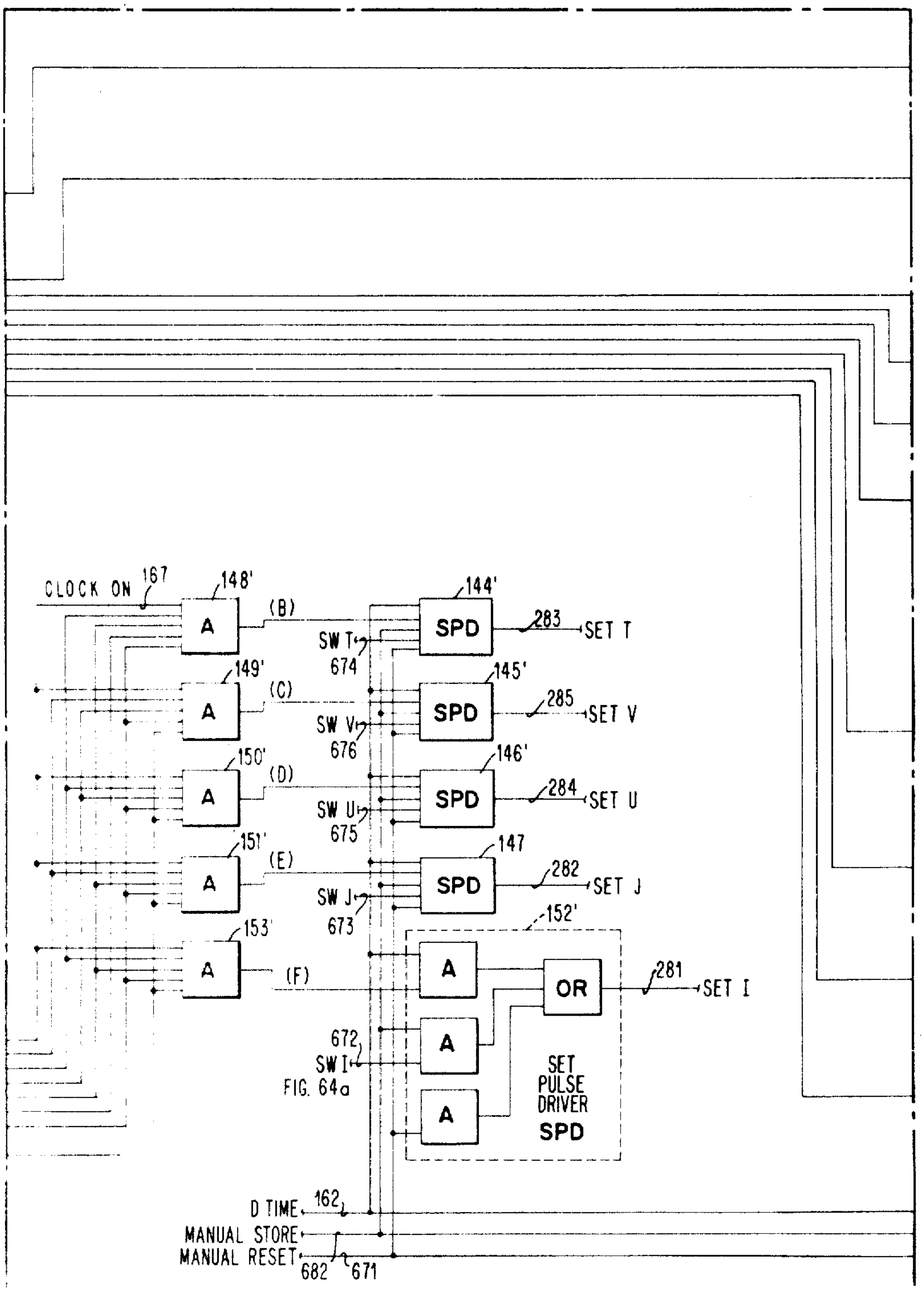
Figure 4A:
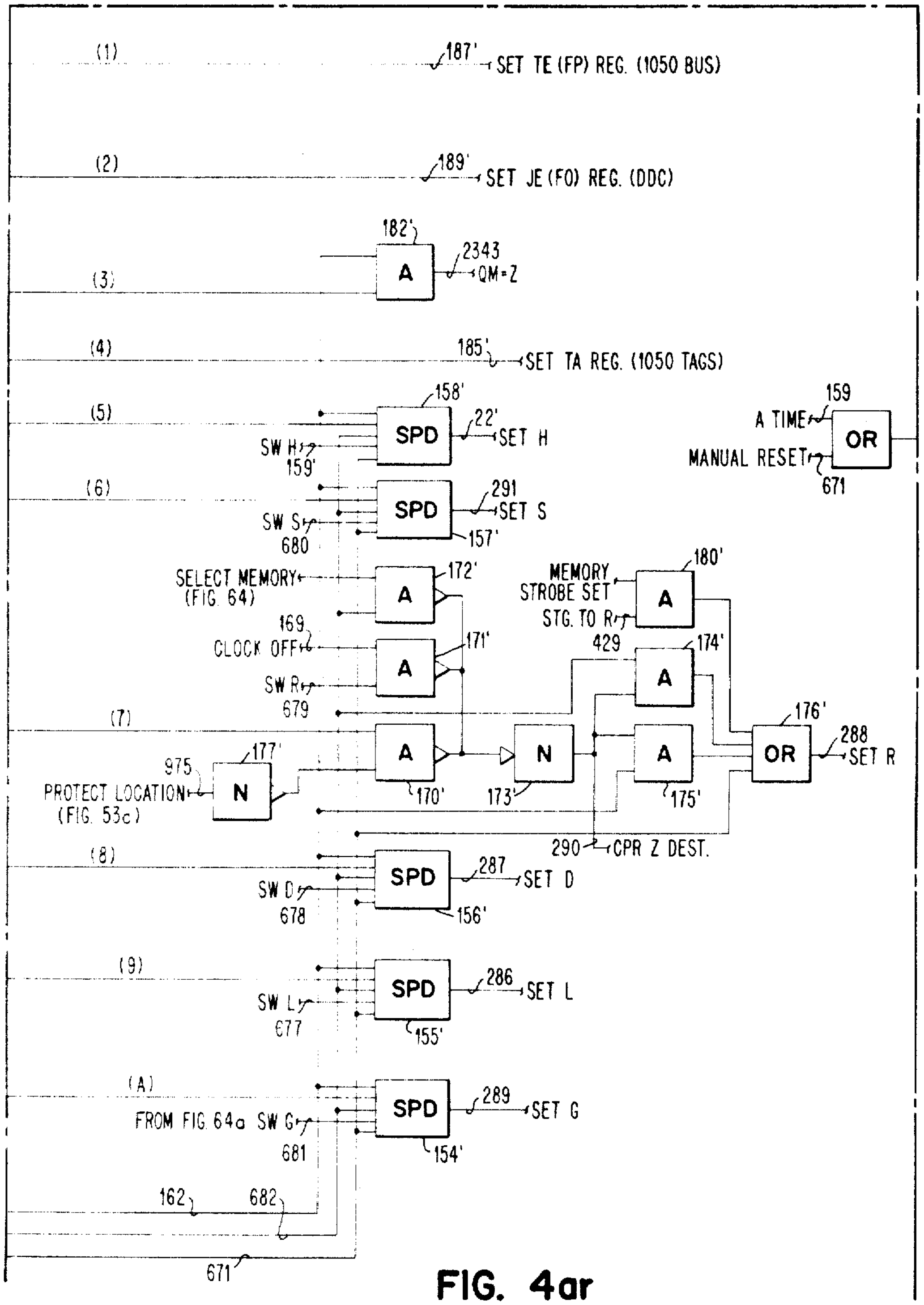
Figure 4A:
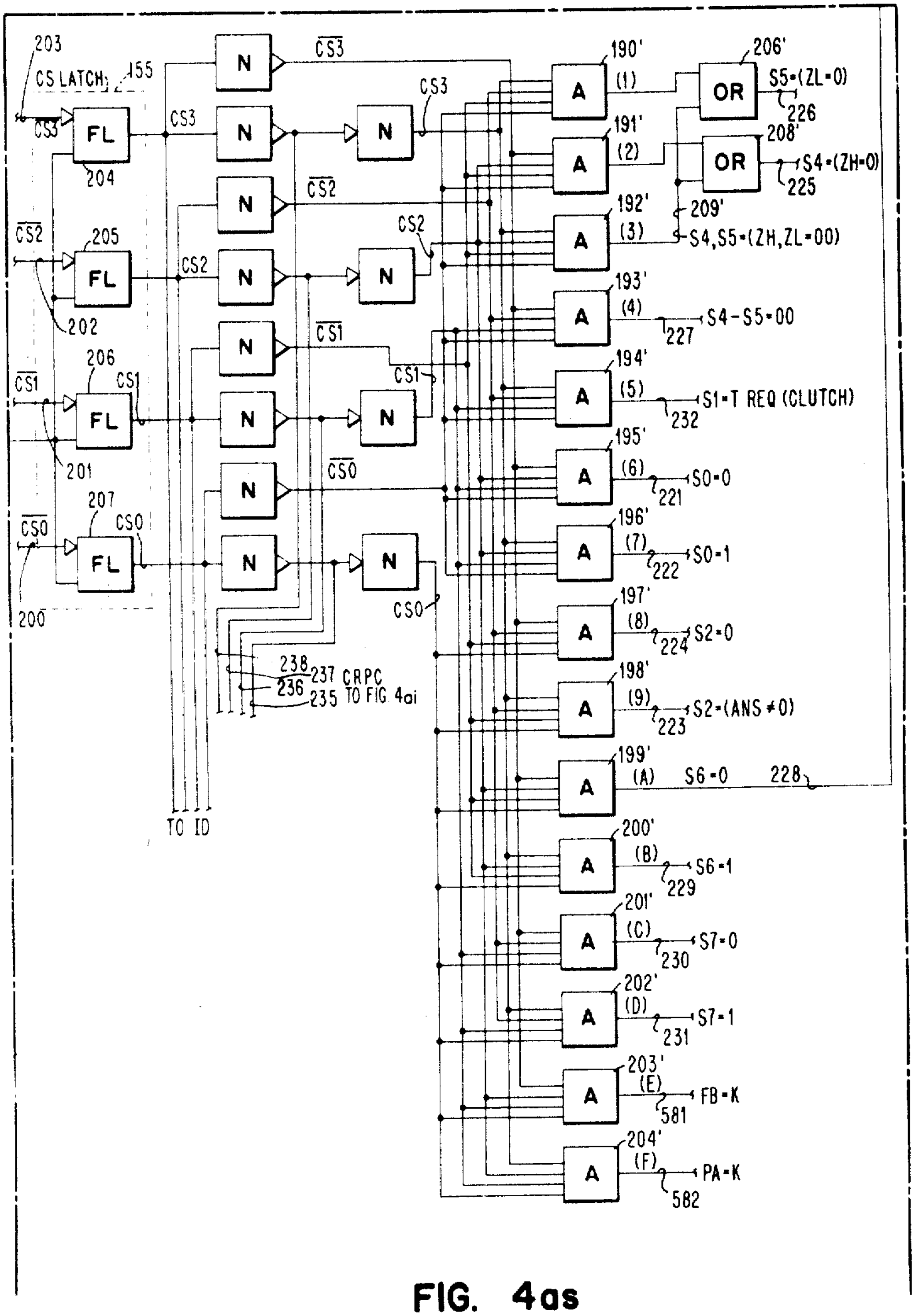
Figure 4A:
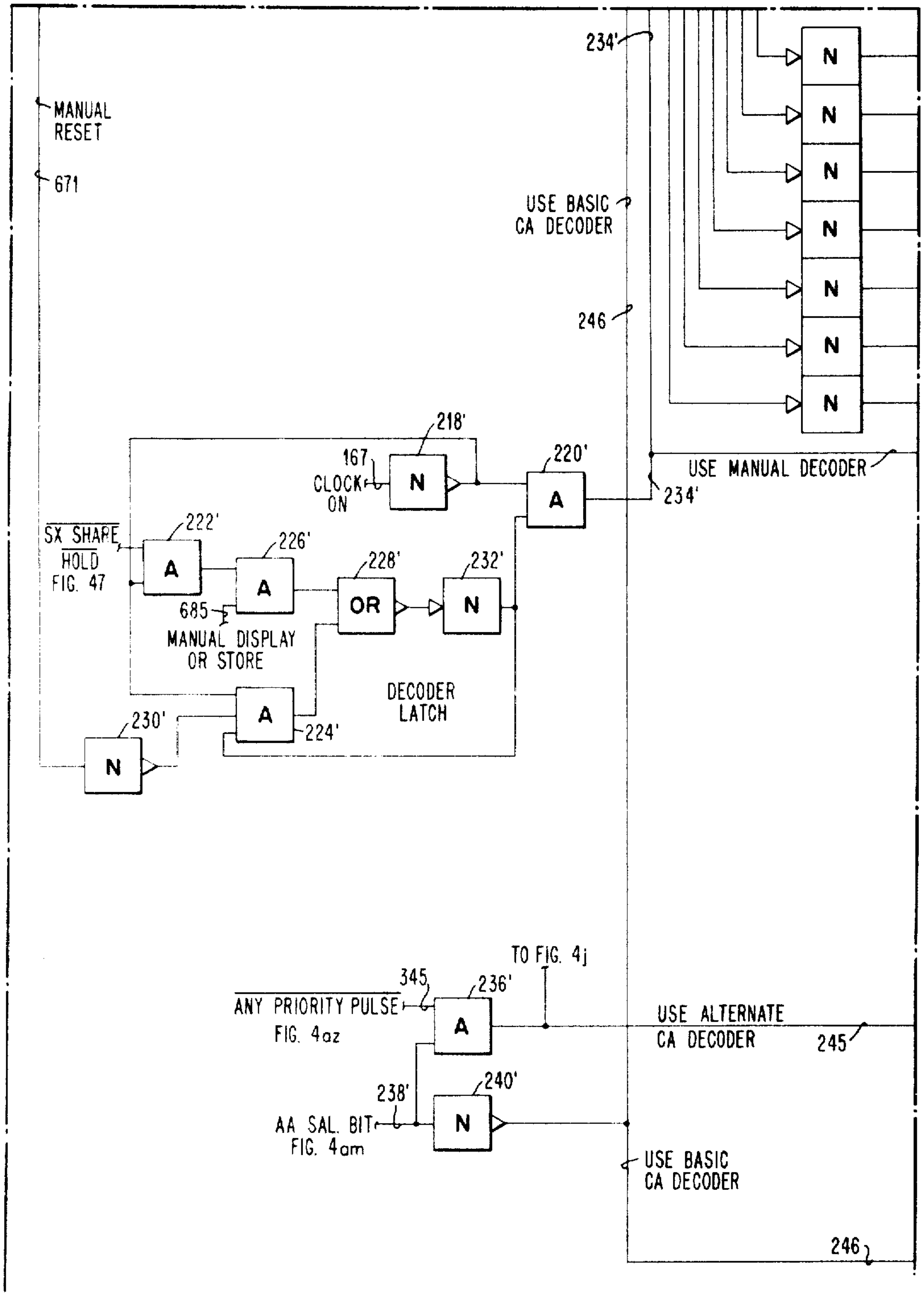
Figure 4A:
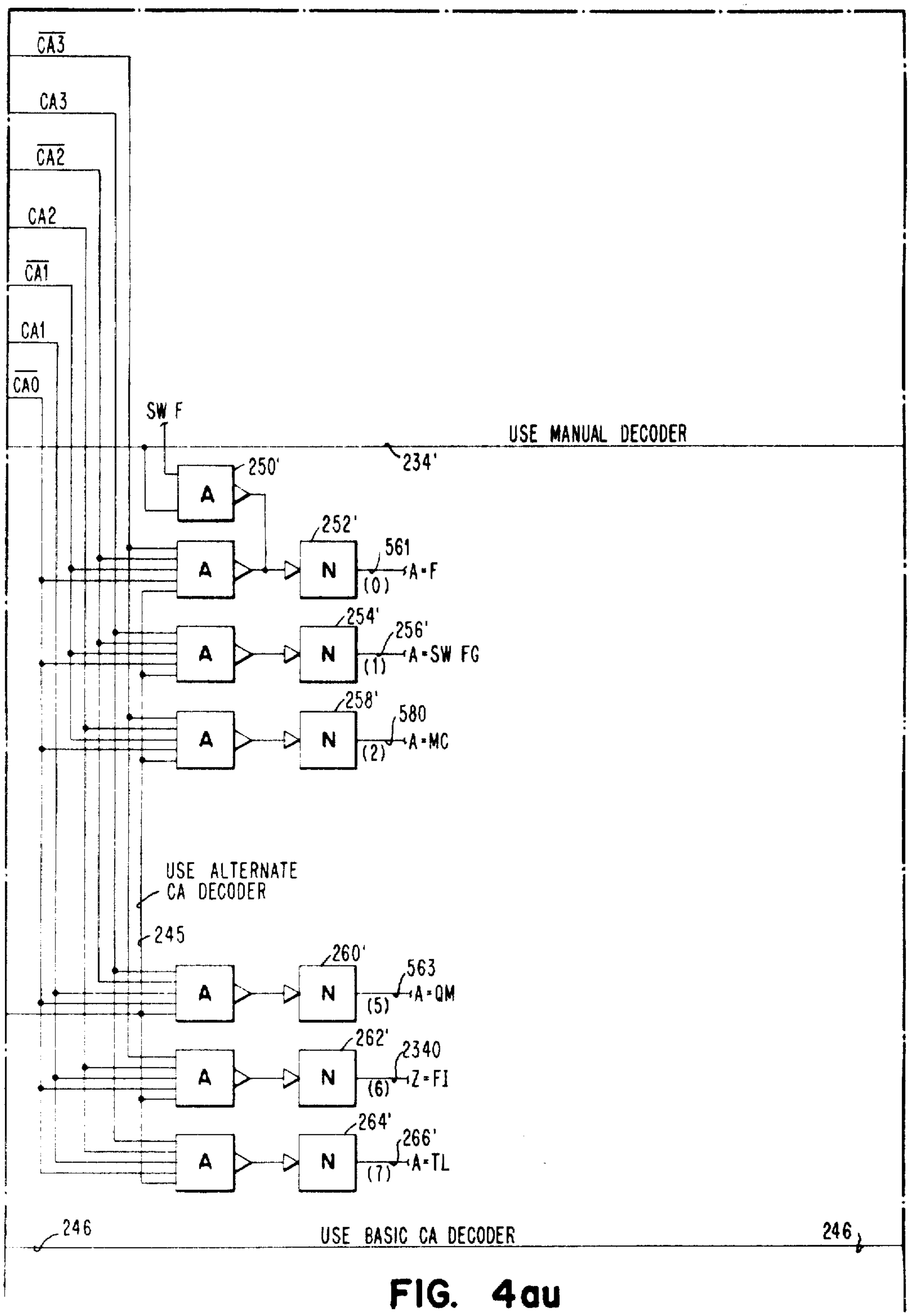
Figure 4A:
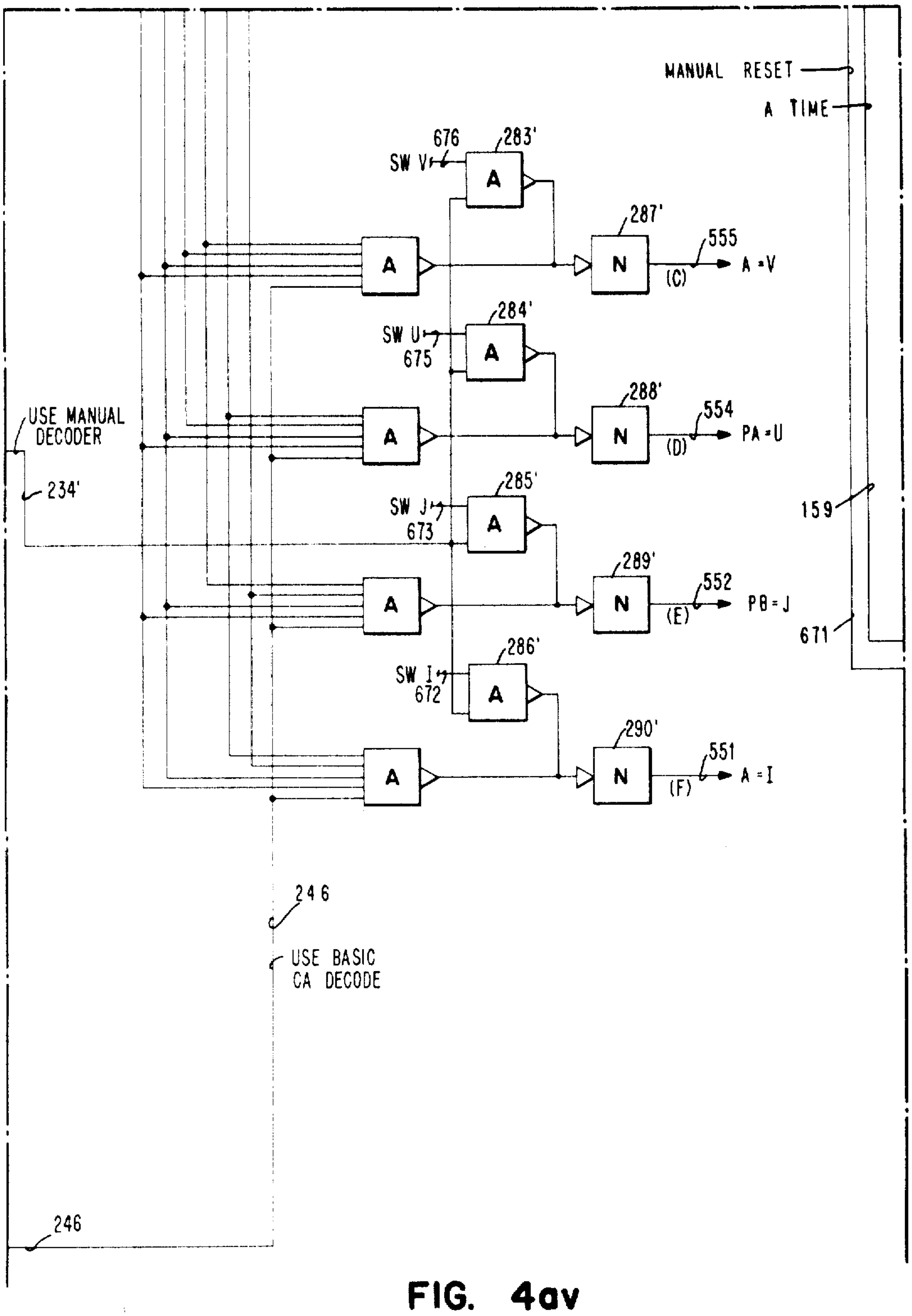
Figure 4A:
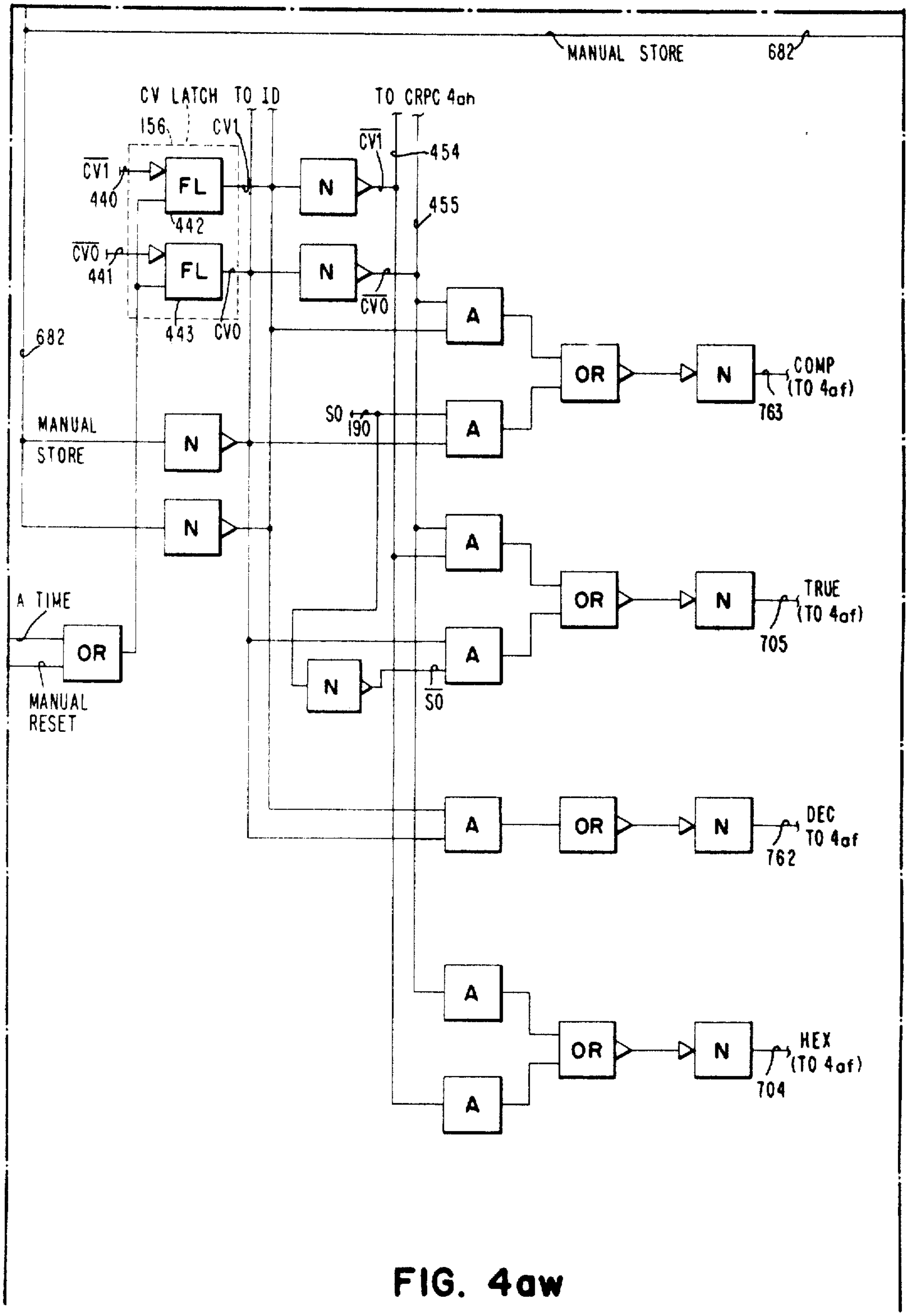
Figure 4A:
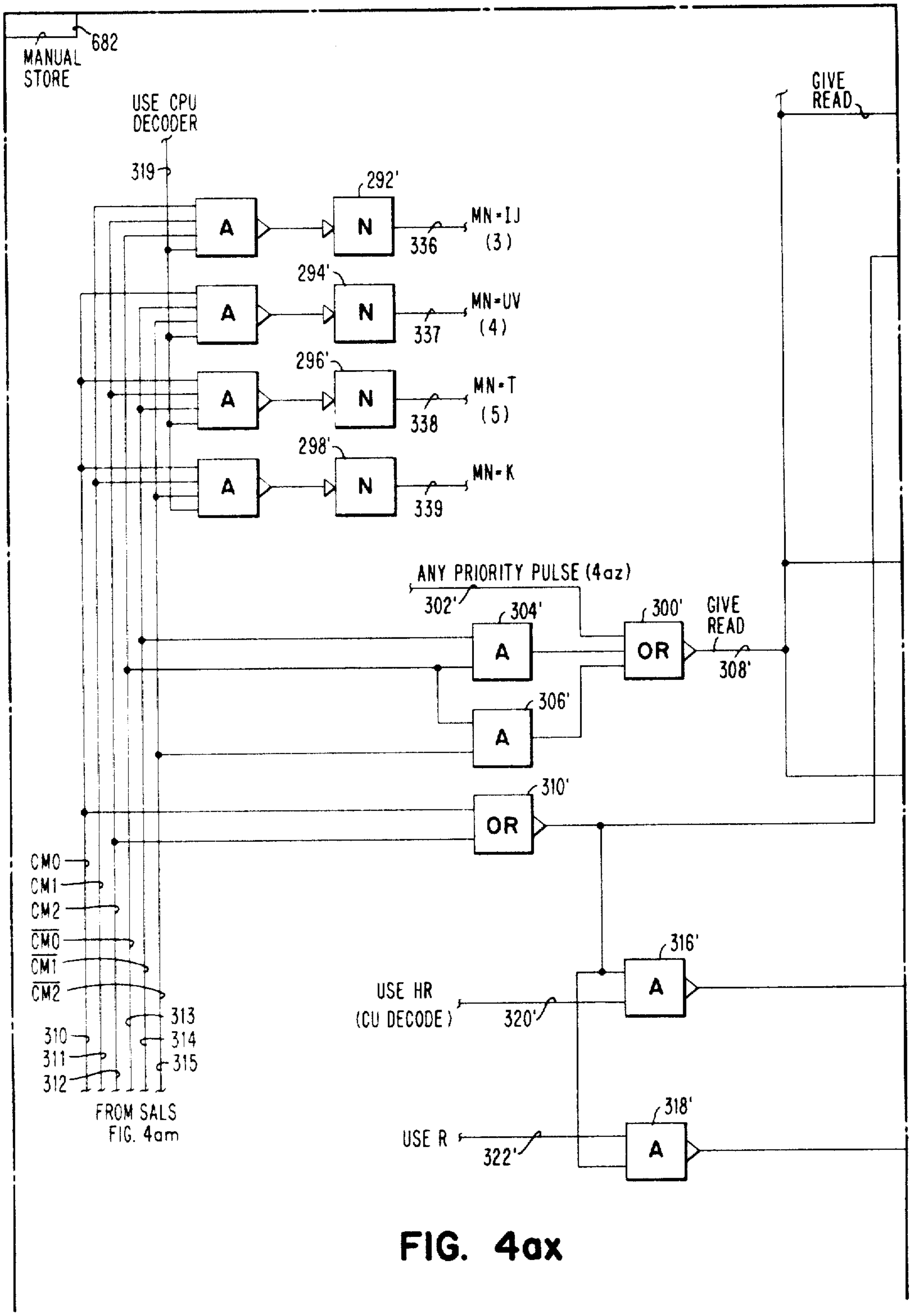
Figure 4A:
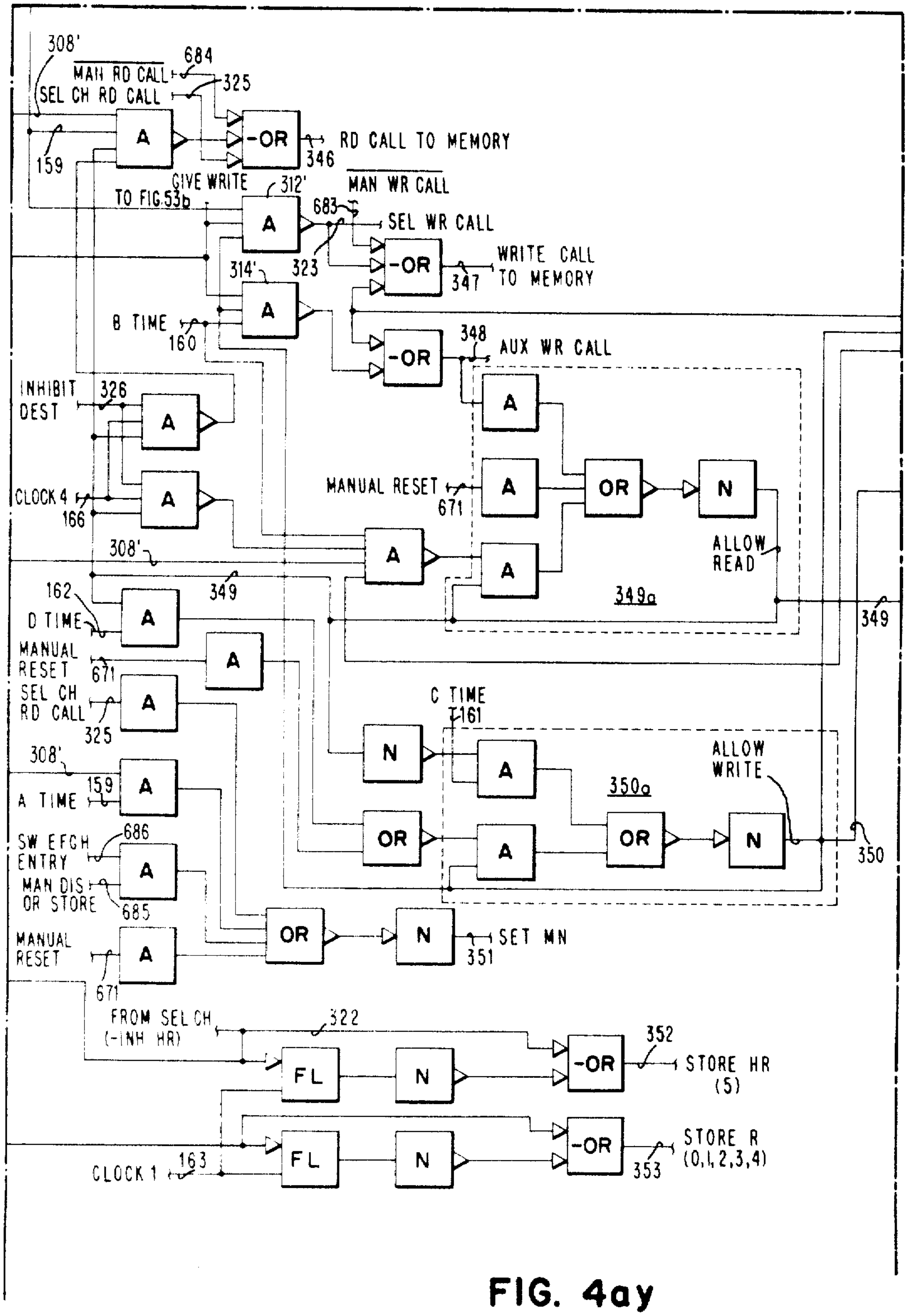
Figure 4A:
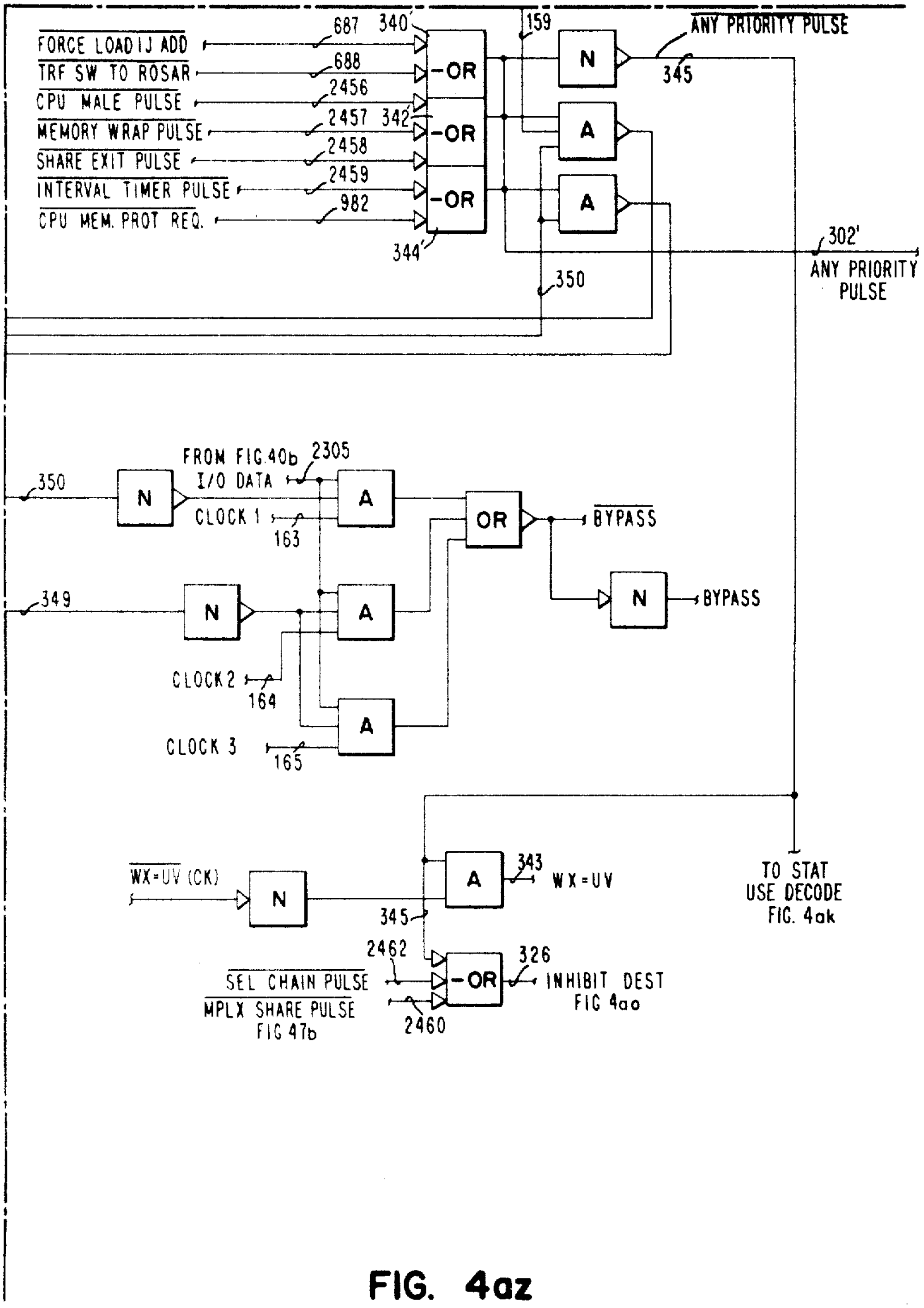

Referring to FIG. 4*z*, an inverter 334' has as its output signal the $B=R$ signal on the line 401, an inverter 336' has as its output the $B=K$ signal on the line 398.

Referring to FIG. 4*az*, the line 345 is now labeled to STAT used decode, FIG. 4*ak*. The common output signal of a plurality of MINUS OR gates 340', 342' and 344' is the ANY PRIORITY PULSE on the line 302'.

*Operating characteristics of changed figures decoding the fields of the control word*

The bit pattern constituting the CN field of the control word is entered into six CN amplifiers, shown in FIG. 4*am*. Each amplifier latch output is connected to corresponding positions; namely, 0, 1, 2, 3, 4, and 5 of the X register 145, FIG. 4*m*, by way of a switch called GATE X NORMAL. Entry of the CN signals into the X register 145, in the manner indicated, is gated under control of an A TIME-CLOCK signal impressed on line 159 connected via an OR circuit to the X register 145.

The CN control field provides the high-order six bits of the X register 145 with address information forming a portion of the next address which will access and read out the next control word in the read-only storage.

The bit pattern constituting the CH field of the control word is entered into four amplifier latches as seen in FIG. *4am*. Each such amplifier issues true and complement signals on a pair of output lines. The four amplifier latches provide four sets of output lines designated CH0, $\overline{\text{CH0}}$, CH1, $\overline{\text{CH1}}$, CH2 $\overline{\text{CH2}}$, CH3, $\overline{\text{CH3}}$. These sets of lines are shown connected to a CH decoder shown in FIG. *4aj*. The decoder comprises essentially sixteen AND circuits capable of providing sixteen coded combinations 0000 to 1111. Additionally, each AND gate is furnished a further input signal as set out in the graph below.

GRAPH A CH DECODER

| Binary Gate Number | Input Signal | Line Number |
|---|---|---|
| 0 (not shown) | 0 | N/A |
| 1 | 1 | N/A |
| 3 | V67=00 (GMWM) | 112′ |
| 4 | STATUS IN | MPX. Char. Fig. 40 |
| 5 | OP. IN | MPX. Char. Fig. 40 |
| 6 | ALU carry 0 | 496 |
| 7 | S0 | 190 |
| 8 | S1, R2 | 126′ |
| 9 | S2 | 192′ |
| 10 | S4 | 194 |
| 11 | S6 | 196 |
| 12 | G0 | 500 |
| 13 | G2 | 500 |
| 14 | G4 | 500 |
| 15 | G6 | 500 |

Depending on the binary number contained in the CH field, the corresponding further input signal is inverted in the inverter 385 and applied to an AND gate 387 shown in FIG. *4ak*. The AND gate 387 has a second input signal on the line 371, W NORMAL ENTRY. The output of the AND gate 387 sets the $\overline{\text{X6}}$ position of the register 145, shown in FIG. *4m*.

The bit pattern constituting the CL field of the control word is fed into four amplifier latches which in turn provide four sets of output lines; namely, CL0, $\overline{\text{CL0}}$; CL1, $\overline{\text{CL1}}$; CL2, $\overline{\text{CL2}}$; CL3, $\overline{\text{CL3}}$. These lines are applied to a CL decoder shown in FIG. *4ak* capable of providing binary coded combinations 0000 to 1111. Each of the possible binary combinations is decoded by a plurality of AND gates 128′. Each of the AND gates 128′ is furnished a further input signal as set out in the following graph.

GRAPH B CL DECODER

| Binary Gate Number | Input Signal | Line Number |
|---|---|---|
| 0 (not shown) | 0 | N/A |
| 1 | 1 | N/A |
| 2 | $\overline{\text{ANY PRIORITY PULSE}}$ | 345 |
| 3 | ADDRESS IN | MPX. Channel Fig. 40 |
| 4 | SERVICE IN | MPX. Channel Fig. 40 |
| 5 | RVDD | 110′ |
| 6 | ALU CARRY 1 or R1 | 132′ |
| 7 | +Z CH=0 | 32′ |
| 8 | G7 | 500 |
| 9 | S3 | 193 |
| 10 | S5 | 195 |
| 11 | S7 | 196 |
| 12 | G1 or R3 | 136′ |
| 13 | G3 | 500 |
| 14 | G5 | 500 |
| 15 | CH Interrupt | 2272 |

The outputs of all the AND gates 128′ are applied in common to an inverter 130′ and an —OR gate 367. The output of the inverter 130′ is the GATE CA to W signal on the line 92′, which signal is applied to a plurality of AND gates shown in FIG. *4j*. The output signal of the —OR gate 367 is applied to the AND gate 369, which gate has a second enabling signal applied thereto, WX NORMAL ENTRY signal on the line 371. The output of the AND gate 369 sets the $\overline{\text{X7}}$ position of the X register 145.

The bit pattern constituting the CS field of the control word is directed to SAL's bearing the same designation shown in FIG. *4am*. The SAL's provide signal lines which are eventually applied to a plurality of AND gates 190′ through 204′ in TRUE and COMPLEMENT manner. The AND gates combine in standard binary fashion the TRUE-COMPLEMENT signals into fifteen combinations, the zero cambination not being shown. Some of the outputs of the AND gates are used for setting the various positions, S0–S7 of the status register S, shown in FIGS. *4o*, *4p*, *4r* and *4s*. The output signals from the AND gates 203′ and 204′ participate in multiplex operations. The output signals from the AND gates 190′, 191′ and 192′ are combined in a pair of OR gates 206′ and 208′, whose output signals are substituted for the output signals from the AND gates 190′ and 191′ in setting portions of the status register. The following graph shows the distribution of the output signals of the CS decoder.

GRAPH C CS DECODER

| AND-OR Gate Number | Destination | Line Number |
|---|---|---|
| 206′ | S5=(ZL=0) | 226 |
| 208′ | S4=(ZH=0) | 225 |
| 192′ | S4–S5=(ZH,ZL=00) | 209′ |
| 193′ | S4–S5=00 | 227 |
| 194 | S1=TREQ | 232 |
| 195 | S0=0 | 221 |
| 196 | S0=1 | 222 |
| 197 | S2=0 | 224 |
| 198 | S2=(ANS=0) | 223 |
| 199 | S6=0 | 228 |
| 200 | S6=1 | 229 |
| 201 | S7=0 | 230 |
| 202 | S7=1 | 231 |
| 203 | PB=K | 581 |
| 204 | PA=K | 582 |

The four control fields just described are called branching control fields and are employed to provide an address for the next READ ONLY MEMORY (ROM) word to be executed.

A ROM address is a fifteen bit binary number. The W register 144 holds the high-order five bits, and the X register 145 contains the lower-order eight bits. Two positions are used for parity. One position is used for the W register 144, the other position is used for the X register 145. Normally, only the eight bits in the X register 145 are provided by the branch control fields. Of these eight bits, six bit positions (0–5) of the X register 145 are called next address bits, and their value is specified directly by the six-bit CN field in the ROM word. The two low-order bit positions of the X register 145, X6 and X7 are called the branch bits, and their settings are controlled by the CH and CL fields, respectively.

The CH and CL fields are decoded and switched against machine status conditions and/or the status of latches in the data flow registers G and S, to provide the two low-order bits of the address, X6 and X7.

The bit pattern of the CA field in the control word is entered into the appropriately identified SAL's in FIG.

4*am*, from which signal lines 530 through 537, respectively, designated CA0, $\overline{\text{CA0}}$; CA1, $\overline{\text{CA1}}$; CA2, $\overline{\text{CA2}}$; and CA3, $\overline{\text{CA3}}$, are connected by way of input inverters to a CA decoder, shown in FIGS. 4*t*, 4*u*, 4*v*, 4*at*, 4*au* and 4*av*. The four bits of the CA field are combined into a maximum of sixteen different binary combinations, each of these combinations being employed to gate a different signal into the A register 130. The capacity of the CA field can be extended by further combining the binary combinations with separate enabling signals. Two such further gating signals are employed; one of which is the USE ALTERNATE CA DECODER signal and the other of which is the USE BASIC CA DECODER signal. These last two mentioned gating signals coupled with the binary combinations furnished by the CA field automatically gate data into the A register 130. A still further combination of signals is employed to manually set data into the A register 130, the USE MANUAL DECODER signal on the line 234′ and the individual switch selected as the data source.

GRAPH D CA DECODER

Use Alternate Decoder Signal Group

| AND/INVERTER Gate Numbers | Line Numbers | Designation |
|---|---|---|
| 252′ | 561 | A=F |
| 254′ | 256′ | SWFG |
| 258′ | 580 | A=MC |
| 260′ | 563 | A=QM |
| 262′ | 2340 | Z=FI |
| 264′ | 266′ | A=TI |

GRAPH E CA DECODER

Use Basic CA Decoder Signal Group

| AND/INVERTER Gate Numbers | Line Numbers | Designation |
|---|---|---|
| 214′ | 579 | A=PT |
| 216′ | 564 | A=TT |
| 246′ | 559 | A=S |
| 245′ | 26′ | A=H |
| 248′ | 562 | A=PI |
| 249′ | 558 | A=R |
| 276′ | 557 | A=D |
| 278′ | 556 | A=L |
| 280′ | 560 | A=G |
| 282′ | 553 | A=T |
| 287′ | 555 | A=V |
| 288′ | 554 | PA=U |
| 289′ | 552 | PB=J |
| 290′ | 551 | A=I |

GRAPH F CA DECODER

Use Manual Decoder Signal Group

| AND/INVERTER Gate Numbers | Line Numbers | Designation |
|---|---|---|
| 210′, 214′ | 579 | A=PT |
| 242′, 246′ | 559 | A=S |
| 244′, 245′ | 26′ | A=H |
| 247′, 249′ | 558 | A=R |
| 268′, 276′ | 557 | A=D |
| 270′, 278′ | 556 | A=L |
| 272′, 280′ | 560 | A=G |
| 274′, 282′ | 553 | A=T |
| 283′, 287′ | 555 | A=V |
| 284′, 288′ | 554 | PA=U |
| 285′, 289′ | 552 | PB=J |
| 286′, 290′ | 551 | A=I |

In the above CA Decoder graphs, the equations under the DESIGNATION column are interpreted so that the character to the left of the equal sign designates the destination into which data is transferred from the register designated by the character to the right of the equal sign.

The bit pattern constituting the CB field of the control word is directed to the SAL's bearing the same designations shown in FIG. 4*am*. These SAL's have output lines 391, 392, 393 and 394 designated respectively $\overline{\text{CB1}}$, $\overline{\text{CB0}}$, CB1 and CB0. These lines are connected to a CB decoder network, shown in FIG. 4*z*, which network is also supplied with the A time signal line 159. The decoder provides four outputs on lines 398, designated *B=K;* line 399 designated *B=L;* line 400, designated *B=D;* and line 401 designated *B=R*. These designated statements control the transfer of the contents of a K constant and the contents of the CPU registers L, D, R to the B register 131 by the B bus 101 shown in FIG. 4*ae*.

The bit pattern constituting field CD of the control word is fed from the sense amplifiers in FIG. 4*am* by lines 250, 251, 252 and 253, carrying the following designations: $\overline{\text{CD0}}$, $\overline{\text{CD1}}$, $\overline{\text{CD2}}$ and $\overline{\text{CD3}}$ to a CD control register 151 shown in FIG. 4*ao*. This register comprises four latches 254, 255, 256 and 257. Outputs from these latches are ANDed with ALLOW READ signal, line 349, INHIBIT DESTINATION, line 326, CLOCK 1 signal, line 163, D TIME signal, line 162, MANUAL STORE signal, line 682, MANUAL RESET signal, line 671, to provide destination control signals for all of the registers fed by the Z bus. These destination control signals are issued from various outputs of the CD decoder circuit network shown in FIGS. 4*ap* and 4*ar*.

GRAPH G, CD DECODER

| Transmission Lines: | Destination |
|---|---|
| **283** | SET T |
| **285** | SET V |
| **284** | SET U |
| **282** | SET J |
| **281** | SET I |
| **187′** | SET TE |
| **189′** | SET JE |
| **2343** | QM=Z |
| **185′** | SET TA |
| **22′** | SET H |
| **291** | SET S |
| **288** | SET R |
| **290** | CPR Z Dest |
| **287** | SET D |
| **286** | SET L |
| **289** | SET G |

These destination control signals may also be activated by manual intervention at the control console by setting an appropriate one of the control console switches to the various register settings, each one of which supplies one of the following input lines to the decoder circuit network:

| Intput line: | Destination |
|---|---|
| **674** | SW T |
| **676** | SW V |
| **675** | SW U |
| **673** | SW J |
| **672** | SW I |
| **159′** | SW H |
| **680** | SWS |
| **679** | SWR |
| **678** | SWD |
| **677** | SWL |
| **681** | SWG |

The CM and CU fields work in conjunction with each other and their control is best described considering both fields together and some basic core-storage cycling. In the CPU there are four basic cycles for core storage; the first of which is a READ, WRITE; the second of which is a READ, COMPUTE, WRITE; the third of which is a READ, STORE; and the fourth of which is a READ, COMPUTE, STORE.

When a read call is given, the data from core storage is not ready for use until the beginning of the next ROM cycle. The next cycle then must be a write, a store, or a compute cycle. If the read cycle is followed by a write cycle, the data will be set in the storage data register (R) and sent back to core from R. If followed by a store cycle the output from core is not used but lost. The new information for core is the data already in R, and this data is gated back to core. If the read cycle is followed by a compute cycle, the output from core is taken to R and must be written back to core on the cycle following the compute cycle with either a write or store.

Referring to FIGS. 4*ax* and 4*ay*, the three bit CM field controls the operation to be performed. A read call is sent to core storage using one of the CM field combinations three through seven. A write call is specified by the codings 0 or 2. If the CM field is a combination 000 (write), 001, or 010 (store), the alternate coding for CU is used. A 001 allows the information to be set in R but it is not regenerated. Essentially, this is the compute cycle.

The two-bit CU field controls which area of core is addressed. Its alternate codings have the special uses shown in FIG. 4*y*.

*Description of FIG. 4*

The initiation of the program mode switching routine is begun by accessing a PROGRAM MODE SWITCH OP code while operating in the natural mode of operation (NMO). of the EDP. The PROGRAM MODE SWITCH OP code occurs not only at the end of a complete program executed in the NMO of the EDP, but also as the result of an error condition during the running of this program. In attempting to keep the EDP working, a program mode switching routine permits the EDP to execute a program written for its substituted mode of operation (SMO). A PROGRAM MODE SWITCH OP can exit from a NMO or a SMO to a SMO or a NMO respectively for the execution of a single OP code or a plurality of OP codes. Additional reasons can be added to those enumerated above for causing a program mode switching routine. However, it is within the scope of the present invention that upon recognizing one of these conditions the following sequence of operations is performed.

The normal INSTRUCTION CYCLE routine of the EDP decodes the PROGRAM MODE SWITCH OP code, selects the correct sequence of ROM control words and generally prepares the EDP to execute the PROGRAM MODE SWITCH OP code. The OP code or other input switching signals access a word in read only memory A1 which is read out into the sense amplifier latches SA–1 through SA–60 shown in FIG. 4*am*. The CA field is the specific part of the ROM control word which contains the switching indicia. The five bits in the CA field are applied in TRUE and COMPLEMENT form to a group of lines 530 through 537 shown in FIG. 4*t*. The signal from each line of the CA field is applied to the CA to W gates 85' through 90' shown in FIG. 4*j*. The high order CA bit associated with the AND gate 86' selects between the ROM 4 and the ROM 8 shown in FIG. 1. For the purposes of this description the W3 bit is the bit signal which initiates the switching from one mode to the second mode in conjunction with the high order bit for addressing purposes. The W3 signal is applied to a W3 latch in the W register 144 shown in FIG. 4*i*. The output of the latch is applied to an AND gate 44', shown in FIG. 4*h*, in conjunction with an output signal from the OR gate 34'. The output from the AND gate 44' is applied to the AND gate 48' which latches up the latch W3 in the W register 144. The output from the W register is applied to the W RO bus 123 by way of a plurality of inverters 64'. The W RO bus 123 provides one input to the addressing circuit A102 shown in FIG. 4*am*. The addressing circuit A102 is employed for addressing read only memory words stored in their read only memory locations A1. The previously mentioned OP code contains indicia which is transferred to the G register 133 shown in FIG. 4*d* for specifying between the various types of program mode switching which can occur. The type of mode switching is determined by the STAT use decoders CH and CL shown in FIGS. 4*aj* and 4*ak*. The output from the G register 133 is applied to the CH and CL decoders shown respectively in FIGS. 4*aj* and 4*ak*. The contents of the G register is thereby decoded and can alternatively alter the X6 bit on a line 386 and the X7 bit on a line 368. Both of these bits, X6 and X7, alter the contents of the address registers A101 and A102, shown in FIG. 4*am*, which registers address the contents of the read only storage A1. The type of mode switching selected for description herein is directed to that type of switching of the general class wherein the contents of the operating registers in one mode are stored away in particular storage locations prior to the initiation of the new operating condition.

A branch is made on the G2 bit in the G register previously mentioned. That is to say the G2 bit applied to the CH decoder on line 500–2 on FIG. 4*aj* causes the X6 bit to be in one of its two possible conditions. This setting of the X6 bit line directs the addressing circuits of the read only memory to access the next sequential ROM word. At this point a further branching operation is performed on the G0 bit of the G register 133. This G0 bit is applied to the CH decoder, shown in FIG. 4*aj*, on a line 500–0. The status of the G0 bit again alters or does not alter the X6 bit line directing the address circuits to the accessing of the next ROM word. These branching operations indicate that a PROGRAM MODE SWITCHING operation is to be performed and selects the corresponding series of ROM control words to carry it out.

A binary 4 is emitted from the CK field directly to the N register 138, shown in FIG. 4*ab*, by way of the gate 339A shown in FIG. 4*ac*. The remaining portion of the M and N registers 137 and 138 are set to contain address indicia under program control or machine forcing conditions for designating certain general areas of the CPU bump 2202 nd UCW bump 2203 and an additional auxiliary storage area identified as 390', shown in FIG. 1, for storing the indicia required when operating in the program mode switching mode of operation. The R register is also set to a 44. The setting of the R register to 44 is performed by emitting a binary 4 into the B register 131, shown in FIG. 4*al*, by a gate **398*a***, shown in FIG. 4*d*. The contents of the B register 131 are then transferred to the ACU 699 with both High and Low gating. A 44 is then placed onto the +Z but 102 and gated into the R register 139. The contents of the R register are written into the position described by the address held in the M and N registers 137 and 138.

Referring to FIG. 1, there can be seen a schematic view of one of the three parts of the K addressable area in the auxiliary storage area **12*a* employed for storing the later identified contents of certain registers therein. In this first storage operation the addressed location 4 stores the contents of the R register into the K addressable storage area 390'. The area 390' is similar to the bumps 2202 and 2203** shown in greater detail in appendices A and B respectively. However, since so little of the area is employed for storage, only a schematic showing is given in FIG. 1. A binary 0 is emitted from the K field and a CNO of 1 on a line CNO in FIG. 4*ac* is applied to the N register 132 by the gate **334*a* to address K addressable location 16 of the area 390'. The R register is set to 00 in the same manner as described above. The CNO signal specifies the lower portion of the storage area and the binary zero does not increment the first location 16 in the address. The address in the M and N registers stores the 00 held in the R register. A binary one is emitted into the N register 138 and increments the address to the binary 17 location. The contents of the I register are transferred into the R register and the 0 bit of the S register is set to a 1. The contents of the R register are stored into location 17 designated by the M and N registers. A binary 2 is emitted into the N register, and the contents of the J register are transferred to the R register. The contents of the R register are stored into the auxiliary storage area 18 designated by the M and N register and a branch is performed on the G3 bit in the G register. The branching operation on G3 is carried out in a manner as previously described with reference to the G0, 1 and 2 bits. However, the G3 bit operation is performed by the CL decoder 122′** shown in FIG. 4*ak*. The output of the decoder 122′ effects the X7 bit signal on the line 368. The altering of the X7 line causes the addressing circuitry A101 and A102 of the read only memory A1, shown in FIG. 4*am*, to access the next read only memory control word.

The next generalized functional requirement to be performed by the program mode switching apparatus is to obtain the offset value specifying the storage position in which the substituted macroprogram 7*a* through 7*e* is stored. This operation is begun by emitting an address constant 2 from the K decode circuit 595 shown in FIG. 4*am* to the gate K to B circuit 398A shown in FIG. 4*d*. The binary 2 is loaded into both positions of the B register 131, while a binary zero is effectively produced by gating techniques in the A register 130. A sum is taken between the contents of the B register and the contents of the A register with H*i* switching on the B register only and the resulting number 20 is placed in the T register 141 shown in FIG. 4*c*. The contents of the T register comprise a binary 0 in the low order position and a binary 2 in the high order position. The next control cycle causes the transfer of the contents of the T register to the N register by gates T to N 338*a* shown in FIG. 4*ac*.

The contents of the M and N registers are used in conjunction with a signal on a line 426, shown in FIG. 4*ac*, to access the low portion of the address at which the substituted program begins. Referring to the appendix A the address 20 retrieves a value of 60. The value of 60 is read out into the R register. The contents of the R register are decremented by one through the use of the ALU and are stored in the D register 132 shown in FIG. 4*c*. During this decrementing operation a carry propagation signal is set. The same control cycle utilizes the address stored in M and N registers 137 and 138 plus an additional enabling signal on a line 427, shown in FIG. 4*ac*, to access the high order portion of the address value for storage into the R register 139. Referring to appendix B, the address 20 now retrieves a value of 30. The high order address value of the storage offset position just interrogated is restored to the storage area and is applied to the ALU 699 for propagating any carry during the last previous decrementing portion of the low order portion of the address value. The output of the ALU 699 is placed in the L register 136, shown in FIG. 4*c*.

The contents of the D register 132 are transferred by the way of the ALU 699 into the T register 141. The purpose for this transfer is to make available the offset address of 3060 in registers having direct access to the addressing circuits, M and N registers, of the auxiliary storage area. An 8F is forced into the R register 139 in preparation for storage into the address 3060 minus one to detect storage errors on the low address side of the substituted program area. The manner of forcing is described herein as including the forcing of a binary 7 into both portions of the B register 131 and using the ALU 699 to inhibit gating of the low order position of the B register. The resultant factor is inverted and added to a forced 00 on the A register 130 input to the ALU. This results in an 8F being placed in the R register 139.

A binary 15 is emitted into the N register 138 by the gate K to N circuit 339A shown in FIG. 4*az*. The identified portion of the CPU bump, appendix A address 9F is read out and stored into the R register 139. The contents of the R register now indicate whether the program will allow interruptions from I/O gear during the running of the 1401 program in the emulator mode. More specifically, most of the I/O gear is programmed to operate in the normal mode. Since the processor is now set up to operate in the substituted mode, it would cause a malfunction to combine these two modes of operation without any additional mode switching back to the normal mode. Branching on the I/O traps bit is performed by the Z decode circuit shown in FIG. 4*e*. An output on line 32 indicates all zeros, interrupts are not allowed. However, since bit position five is a binary 1, I/O interrupts are allowed.

Now for a moment assuming that the Z decode circuit did not indicate that the allowed traps bit was on and therefore action must be taken to prevent I/O interruptions from occurring, a POLE CONTROL signal on a line 2301 in FIG. 40 is turned on in the multiplexor channel. The turning on of the POLE CONTROL signal in the multiplexor channel prevents I/O interruptions from occurring and prevents I/O units from attempting to take data cycles from the EDP machine. The next ROM control word turns on bits 5 and 6 of the H register which prevents the 2030 machine from responding to an I/O call for data cycles.

The *FB=K* signal shown in FIG. 4*as* sets the machine system masks according to the contents of the R register which effectively prevents I/O interrupts. At this point, the EDP is prepared to execute the program written for the substituted mode of operation of the processor.

The next major functional operation to be performed is the restoring of critical substituted, 1401 MODE, operating indicia into designated hardware registers from portions of the auxiliary storage area, thereby restoring the previous operating conditions of the substituted program.

A binary 0 is emitted into the N register in the usual manner, and the contents of the CPU auxiliary storage area 0 reserved for PROGRAM MODE SWITCHING operations are read out into the R register 139. The 0 area is further identified in appendix A as row and column address 88′. The contents of the R register are transferred to the I register 134 and restored to the auxiliary storage area. After each read out into the R register, the signals read out are restored to the auxiliary storage area.

A binary 1 is now emitted into the N register and the contents of the 1 storage area are transferred to the R register 139. The contents of the R register are transferred to the J register 135. The F and J registers now contain the address of the next sequential OP code to be executed in the substituted mode of operation. Upon the beginning of an entire program, the address would be 3060 as shown in 7*a* in FIG. 1, or when returning to the substituted mode of operation after an I/O interrupt, the address would be 3078 as in 7*d* in FIG. 1. A binary 2 is emitted into the N register 138 and the contents of the storage area are transferred to the R register 139. The next operation transfers the contents of the R register to the U register. A binary 3 is now emitted into the N register and the contents of the auxiliary storage area at address 8B′ in appendix A are read out into the R register 139. The contents of the R register are transferred to the V register 143. The contents of the U and V registers 142 and 143 respectively represent a first address identifying one numeral. A binary 6 is emitted into the N register 138 for addressing CPU local storage 2202 and the contents located therein are transferred to the R register 139. The contents of the R register are transferred to the G register 133 shown in FIG. 4*d*. The contents of the G register represent the last OP code executed by the EDP in its substituted mode of operation. A binary 5 is now emitted into the N register and the contents read out into the R register 139. The contents of the R register are transferred to the T register 141 shown in FIG. 4*c*. A binary 4 is now emitted into the N register and the contents contained therein are transferred to the R register. The contents of the R register are transferred to the L register 136 shown in FIG. 4*c*. The contents of the L and T registers 136 and 141 respectively represent a second address identifying a second numeral. As determined by the OP code held in the G register 133, the two numerals are combined in any standard arithmetic fashion. A binary 14 is emitted into the N register 138 and the contents transferred to the R register. The contents of the R register are transferred to the D register. The contents of the D register represent an OP code modifier which further subdivides the operation specified by the contents of the G register 133. A binary 7 is emitted into the N register and the contents of the auxiliary storage area at row and column address 87', shown in appendix A, the contents of the R register are transferred to the S register 140 shown in FIG. *4d*. The contents of the S register represent the status modifier concerned with the currently specified portion in the substituted program. With the contents of all the 360 registers filled with the data required for running of the 1401 program, the 360 now branches into the normal I cycles of the substituted mode as controlled by ROM 8 shown in FIG. 1.

The next functional explanation is related to the program mode switching from the substituted mode of operation back to the normal mode of operation. The status of the processor at this point is that the EDP has decoded a halt instruction situated in the substituted macroprogram, 7*e* of FIG. 1. This halt instruction has been distributed to the various registers to be decoded and one of these is the S register. A branch is made on S0 to determine if this is indeed a halt instruction. The low four bits of the S register are loaded into the low bits of the R register and a binary 15 is loaded into the high four bits of the R register. A binary 0 is emitted into the N register and the contents of the R register, the halt code, are now stored into the binary 0 K addressable location, shown in appendix B. When the EDP operating in compatibility mode is switching back to NMO, a mode switch control byte is taken from K addressable storage location 12 by the operating system of the EDP. A binary 12 is therefore emitted into the N register and the contents (XX) of the binary 12 position, located at row and column address 9C' in the CPU storage area 12 are transferred into the R register. The contents of the R register are transferred to the S register 140. A branch on bits 6 and 7 of the S register 140 is now performed. In review, the 6 and 7 bits of the S register have been set to 0 by their previous read only control words. This setting of the 6 and 7 bits of the S register defines the halt instruction. The high portion of the R register is set to a binary 15 while a binary 1 is set in the low position. Additionally, a branch of the S5 bit is performed and a 1 there indicates that a mode switch on a halt instruction is to be performed. A binary number 24 comprising the CNO signal and binary eight is placed into the N store the contents of the R register into the auxiliary register and the next control cycle uses the binary 24 to storage area 2202. This additionally sets the S register to 0 except for the S0 bit which is set to a 1. Now the setting S0 to 1 is employed to indicate that a mode switch is in progress.

The next generalized group of operations is directed to storing the contents of the hardware registers to their back up locations in auxiliary storage, shown in appendix A. The contents of the D register are set into the R register and the K field of the read only memory control word admits a binary 14 into the CPU addressing circuitry of the bump 2202. The contents of the R register are stored into the address thus furnished. The contents of the L register are transferred to the R register. A binary 4 is emitted into the addressing circuit 2207 and the contents of the R register are stored in the identified position auxiliary storage area. The contents of the T register are now transferred to the R register, and a binary 5 is emitted into the auxiliary storage addressing circuitry 2207. The contents of the R register are stored into the K5 addressable storage area.

A binary 0 is emitted into the auxiliary storage addressing circuits 2207. The contents of the I register are transferred into the R register and then stored into the addressed location in the auxiliary storage area. A binary 1 is now emitted into the auxiliary storage addressing circuits 2207; the contents of the J register are transferred into the R register. The contents of the R register are stored into the addressed location of the auxiliary storage. The next control cycle emits a binary 3 into the auxiliary storage addressing circuit and transfers the contents of the V register into the R register. The contents of the R register are now stored into the addressed location of auxiliary storage area. The next control cycle emits a binary 6 into the CPU auxiliary storage addressing circuit and transfers the contents of the G register to the R register and performs a branch on S0 and stores G into K6 address storage area, as the branch on S0 indicates whether the machine is undergoing a mode switching or the machine is going through a stop routine. Since S0 is 1, indicating a mode switch is in process, a branch is made to the mode switch routine which transfers control back to 360 operation.

The next functional operation to be performed is to determine what type of mode switching the machine is undergoing. As previously mentioned, there could be three different types of interrupts causing the mode switching, one of which is an OP code in the substituted program calling for the program mode switching operation. This type of interrupt is satisfied with the supervisory call type solution. An additional type of interrupt is an I/O interrupt and external interrupt. However, since the next control word branches on the S6 and S7 bits and since the machine is undergoing a true program mode switching interrupt, the next control cycle emits a binary 24 into the UCW auxiliary storage area addressing circuitry to retrieve the interrupt code F1 previously stored therein, and places it in the R register. The next control cycle restores the byte to the addressed location in the auxiliary storage area and transfers the contents of the R register to the L register. The next control cycle decrements the IC, the instruction counter of the 1400 instruction program by one. The IC counter is held in the I and J registers. The next control cycle uses the contents of the I and J registers to access the main storage area 2201 and read out the contents of the addressed location into the R register. If there was a carry from the decrementing of the J register, it is propagated into the I register during this control cycle also. The next control cycle restores the contents of the addressed location and branches on the R1 bit locations looking for a word mark. If the word mark is not located, the routine repeats itself by decrementing the contents of the I and J registers until a word mark is located. The next control cycle emits a binary 18, a CNO signal and a binary two, into the auxiliary storage addressing portion of the main memory and transfers the contents of the J register to the R register. The next control cycle stores the contents of R into the addressed location of auxiliary storage 390'. The next control cycle generates a binary 17, a CNO signal and a binary one, for the auxiliary storage area 390' and transfers the contents of the I register into the R register, where it is stored into the addressed location of the auxiliary storage area on the next control cycle. The next control cycle emits a binary 4 into the high four bits of the R register and forces on the R1 bit indicating that the instruction address has been stored in the PSW. The next control word restores the contents of the R register to the addressed location of auxiliary storage and forces the W3 bit to 0 which causes a switching back into the normal mode of operation supervisor call. This also branches into the normal mode interrupt routine. In the immediately preceding steps the instruction address causing the interrupt has been set into the storage area 390'.

Each time a program mode switching OP code is identified, the EDP stores away the pertinent descriptive indicia related to the current program and retrieves other indicia descriptive of the new program. This switching operation always maintains sufficient entry control over both programs that one can be entered from the other.

APPENDIX A

| Line | 0′ | 1′ | 2′ | 3′ | 4′ | 5′ | 6′ | 7′ | 8′ | 9′ | A′ | B′ | C′ | D′ | E′ | F′ |
|---|---|---|---|---|---|---|---|---|---|---|---|---|---|---|---|---|
| Local storage: | | | | | | | | | | | | | | | | |
| Units: | | | | | | | | | | | | | | | | |
| 0X′ | 00 | 01 | 02 | 03 | 04 | 05 | 06 | 07 | 08 | 09 | F0 | F3 | F4 | F5 | F6 | F7 |
| Tens: | | | | | | | | | | | | | | | | |
| 1X′ | 00 | (0A)X | (14)X | (1E)X | (28)X | (32)X | 3C)X | (46)X | (50)X | (5A)X | 10 | 10 | 10 | 10 | 10 | 10 |
| Hunds-Lo: | | | | | | | | | | | | | | | | |
| 2X′ | (60)X | (60+ 64)X | (60+ C8)X | (60+ 2C)X | (60+ 90)X | (60+ F4)X | (60+ 58)X | (60+ BC)X | (60+ 20)X | (60+ 84)X | 10 | 10 | 10 | 10 | 10 | 10 |
| BIN DEC: | | | | | | | | | | | | | | | | |
| 3X′ | 00 | 56 | 12 | 68 | 24 | 80 | 36 | 92 | 48 | 04 | 60 | 16 | 72 | 28 | 84 | 40 |
| BCD to EBCDI: | | | | | | | | | | | | | | | | |
| 4X′ | 40 | F1 | F2 | F3 | F4 | F5 | F6 | F7 | F8 | F9 | F0 | 7B | 7C | 7D | 7E | 7F |
| 5X′ | 7A | 61 | E2 | E3 | E4 | E5 | E6 | E7 | E8 | E9 | E0 | 6B | 6C | 6D | 6E | 6F |
| 6X′ | 60 | D1 | D2 | D3 | D4 | D5 | D6 | D7 | D8 | D9 | D0 | 5B | 5C | 5D | 5E | 5F |
| 7X′ | 50 | C1 | C2 | C3 | C4 | C5 | C6 | C7 | C8 | C9 | C0 | 4B | 4C | 4D | 4E | 4F |
| Tape: | | | | | | | | | | | | | | | | |
| 8X′ | | | | | | | | | 0 (I) | 1 (J) | 2 (U) | 3 (V) | 4 (L) | 5 (T) | 6 (G) | 7 (S) |
| 9X′ | | | | | | | | | 8 | 9 | 10 | 11 | 12 (XX) | 13 | 14 (D) | 15 (00000X00) |
| Working Storage: | | | | | | | | | | | | | | | | |
| AX′ | | | | | | | | | 16 | 17 | 18 | 19 | 20 | 21 | 22 | 23 |
| BX′ | 00 | 96 | 92 | 88 | | | | | 24 | 25 | 26 | 27 | 28 | 29 | 30 | 31 |
| OP Code Table: | | | | | | | | | | | | | | | | |
| CX′ | ?)1C | A)18 | B)08 | C)1F | D)12 | E)16 | F)2A | 34 | H)B1 | 34 | 34 | ·)02 | △)15 | 34 | 34 | 34 |
| DX′ | 1)1D | 34 | K)29 | L)90 | M)80 | N)06 | 34 | P)1E | Q)F1 | 34 | 34 | 34 | 34 | 34 | 34 | 34 |
| EX′ | 34 | /)05 | S)19 | 34 | U)20 | V)3A | W)3B | 34 | Y)13 | Z)17 | 34 | ')04 | %)1B | 34 | 34 | 34 |
| FX′ | 34 | 1)21 | 2)22 | 3)23 | 4)24 | 5)25 | 6)26 | 7)27 | 8)06 | 9)06 | 34 | #)14 | @)1A | 34 | 34 | 34 |

APPENDIX B

| | 0′ | 1′ | 2′ | 3′ | 4′ | 5′ | 6′ | 7′ | 8′ | 9′ | A′ | B′ | C′ | D′ | E′ | F′ |
|---|---|---|---|---|---|---|---|---|---|---|---|---|---|---|---|---|
| MPX 1 Storage: | | | | | | | | | | | | | | | | |
| 0X′ | 00 | 05 | 01 | 06 | 02 | 07 | 03 | 08 | 04 | 09 | | | | | | |
| 1X′ | | | | | | | | | | | | | | | | |
| Hunds-Hi: | | | | | | | | | | | | | | | | |
| 2X′ | 30 | 30+01 | 31+00 | 30+01 | 30+01 | 30+01 | 30+02 | 30+02 | 30+03 | 30+03 | | | | | | |
| 3X′ | | | | | | | | | | | | | | | | |
| EBCDI to BCD: | | | | | | | | | | | | | | | | |
| 4X′ | 00 | 40 | 40 | 6B | 6C | 6D | 6E | F6 | 80 | 60 | 40 | 3B | 3C | 3D | 3E | 3F |
| 5X′ | 30 | 40 | 40 | 5B | 5C | 5D | 5E | 5F | 40 | 40 | 40 | 2B | 2C | 2D | 2E | 2F |
| 6X′ | 20 | 11 | 40 | 4B | 4C | 4D | 4E | 4F | 90 | 50 | 40 | 1B | 1C | 1D | 1E | 1F |
| 7X′ | 40 | 40 | 7A | 7B | 7C | 7D | 7E | 7F | 40 | 40 | 10 | 0B | 0C | 0D | 0E | 0F |
| 8X′ | | | | | | | | | 0 (F0) | 1 | 2 | 3 | 4 | 5 | 6 | 7 |
| Disk storage OPS: | | | | | | | | | | | | | | | | |
| 9X′ | File Unit 0 Adder | Unit 0 Cyl | File Unit 1 Addr | Unit 1 Cyl | File Unit 2 Addr | Unit Cyl | File Unit 3 Addr | Unit 3 Cyl | 8 | 9 | 10 | 11 | 12 | 13 | 14 | 15 |
| AX′ | Cyl# 00 | Cyl# 32 | Cyl# 0A | Cyl# 3C | Cyl# 14 | Cyl# 46 | Cyl# 1E | Cyl# 50 | 16 | 17 | 18 | 19 | 20 | 21 | 22 | 23 |
| BX′ | H | R | 00 | DL | DL | | | | 24 (F1) | 25 | 26 | 27 | 28 | 29 | 30 | 31 |
| EBCDI to BCD: | | | | | | | | | | | | | | | | |
| CX′ | 3A | 31 | 32 | 33 | 34 | 35 | 36 | 37 | 38 | 39 | E0 | 40 | 40 | 40 | 45 | 5C |
| DX′ | 2A | 21 | 22 | 23 | 24 | 25 | 26 | 27 | 28 | 29 | D0 | 40 | 40 | 40 | 46 | 5D |
| EX′ | 1A | 40 | 12 | 13 | 14 | 15 | 16 | 17 | 18 | 19 | C0 | 40 | 40 | 40 | 4F | 56 |
| FX′ | 0A | 01 | 02 | 03 | 04 | 05 | 06 | 07 | 08 | 09 | F0 | 40 | 40 | 40 | 44 | 5F |

While the invention has been particularly shown and described with reference to a preferred embodiment thereof, it will be understood by those skilled in the art that various changes in form and details may be made therein without departing from the spirit and scope of the invention.

What is claimed is:

1. In a data processing system, a program mode switching circuit for switching between two modes of operation of the data processing system, a normal mode and a substituted mode, comprising:

storage means having a plurality of individually addressable locations for storing a first program in certain of said addressable locations and a second program in certain other of said addressable locations and program location indicia specifying the location address of said first and second programs, said first program being associated with one mode of operation of the data processing system and said second program being associated with the other mode of operation of the data processing system, said first program comprising a plurality of operation codes of a first machine language, a specific operation code of said first machine language being employed to specify a mode switching operation, said second program comprising a plurality of operation codes of a second machine language, a specific operation code of said second machine language being employed to specify a mode switching operation, first means responsive to said specific operation code of said first and second machine languages for selecting between said first program and said second program, a plurality of temporary storage circuit means for storing descriptive indicia describing the operating characteristics of the data processing system in response to said specific operation code of said first and second machine language, and second means responsive to said specific operation code of said first and second machine languages for storing said descriptive indicia in said storage means and for retrieving said program location indicia whereby control of the data processing system is transferred from one mode of operation to the other mode of operation while maintaining descriptive indicia for reentering the program operating in the original mode of operation.

2. A mode switching circuit as recited in claim 1, wherein said first means comprises:

a first storage unit for storing a first plurality of control signals, a second storage unit for storing a second plurality of control signals, and addressing means responsive to said specific operation code of said first and second machine language for selecting between said first storage unit and said second storage unit.

3. A mode switching circuit as recited in claim 2, wherein said second means comprises:

an auxiliary storage area having a plurality of individually addressable locations, said control signals in said second storage unit including address indicia constants, fourth means responsive to said address indicia constants for addressing each of said addressable locations in said auxiliary storage area, and fifth means responsive to said temporary storage circuit means for transferring said descriptive indicia to and from said addressable locations in said auxiliary storage area.

4. In a data processing system, a program mode switching circuit for switching between two modes of operation of the data processing system, a normal mode and a substituted mode, comprising:

first storage means having a plurality of individually addressable locations for storing a first program in certain of said locations and a second program in certain other of said locations, said first program comprising a plurality of operation codes of a first machine language, a specific operation code of said first machine language being employed to specify a mode of switching operation, said second program comprising a plurality of operation codes of a second machine language, a specific operation code of said second machine language being employed to specify a mode switching operation, a second storage unit for storing a plurality of control signals responsive to said operation codes of said first machine language to direct the data processing system in the natural mode of operation, a third storage unit for storing a plurality of control signals responsive to said operation codes of said second machine language to direct the data processing system in the substitute mode of operation, and first addressing means responsive to said specific operation code of said first and second machine language for selecting between said second storage unit and said third storage unit to direct the operation of the data processing system.

5. A program mode switching circuit as recited in claim 4 and further including:

a plurality of temporary storage circuit means for storing descriptive indicia describing the operating characteristics of the data processing system in response to said specific operation code of said first and second machine languages , auxiliary storage means having a plurality of individually addressable locations for storing program identification indicia in certain of said addressable locations to identify said first and second program locations in said first storage means, and first means including said second and third storage units, said first means being responsive to said specific operation code of said first and second machine languages for storing said descriptive indicia in said auxiliary storage means and for retrieving said program location indicia whereby, control of the data processing system is transferred from one mode of operation to the other mode of operation while maintaining descriptive indicia for reentering the program operating in the original mode of operation.

6. A program mode switching circuit as recited in claim 5 wherein said identification indicia comprises address indicia for specifying the address at which said first and second programs are to be entered.

7. A program mode switching circuit as recited in claim 5 wherein said identification indicia comprises a plurality of address indicia for specifying the address at which said first and second programs are to be entered and the address of data presently being processed and the operation code under which said addressed data is processed.

8. A program mode switching circuit as recited in claim 4, wherein said first addressing means comprises:

an address decoder circuit connected to said second storage unit and said third storage unit for selecting a single one of said control signals, an address register having a plurality of stages, a first plurality of said plurality of stages being employed to select one control signal in said second storage unit and one control signal in said third storage unit, a second plurality of said plurality of stages being employed to select between said second storage unit and said third storage unit, and said second plurality of said plurality of stages being set in response to said specific operation code of said first and second machine language.

9. In a data processing system, a program mode switching circuit for switching between two modes of operation of the data processing system, a normal mode and a substituted mode, comprising:

first storage means having a plurality of individually addressable locations for storing a first program in certain of said addressable locations and a second program in certain other of said addressable locations, said first program comprising a plurality of operation codes of a first machine language, a specific operation code of said first machine language being employed to specify a mode switching operation, a second program comprising a plurality of operation codes of a second machine language, a specific operation code of said second machine language being employed to specify a mode switching operation, a second storage unit for storing a plurality of control signals responsive to said operation codes of said first machine language to direct the data processing system in the natural mode of operation, a third storage unit for storing a plurality of control signals having a plurality of address constants responsive to said operation codes of said second machine language to direct the data processing system in the substituted mode of operation, first addressing means responsive to said specific operation code of said first and second machine language for selecting between said second storage unit and said third storage unit, a temporary storage circuit means for storing address indicia indicating the address location in said first storage means corresponding to the next successive operation code to said specific operation code in said first program, auxiliary storage means having a plurality of individually addressable locations for storing program identification indicia in certain of said addressable locations to identify said second program location in said first storage means, first means including said third storage unit responsive to said address constants for storing said address indicia in said temporary storage circuit means and for retrieving said program identification indicia for said second program from said auxiliary storage means whereby, control of the data processing system is transferred to said second program while maintaining descriptive indicia for reentering said first program.

10. A program mode switching circuit as recited in claim 9, and further including:

a plurality of registers responsive to said first means for storing said program identification indicia of said second program, and means including said third storage unit and responsive to the output of said plurality of registers for directing the operation of the data processing system in response to said second program.

References Cited

UNITED STATES PATENTS

| | | | |
|---|---|---|---|
| 3,061,192 | 10/1962 | Terzian | 235—157 |
| 3,297,999 | 1/1967 | Shimabukuro | 340—172.5 |
| 3,359,544 | 12/1967 | Macon et al. | 340—172.5 |

PAUL J. HENON, *Primary Examiner.*

J. P. VANDENBURG, *Assistant Examiner.*